US012184010B2

(12) United States Patent
Kolak et al.

(10) Patent No.: US 12,184,010 B2
(45) Date of Patent: Dec. 31, 2024

(54) SHIELDED CONNECTOR ASSEMBLIES WITH TEMPERATURE AND ALIGNMENT CONTROLS

(71) Applicant: Molex, LLC, Lisle, IL (US)

(72) Inventors: Andrew Kolak, Villa Park, IL (US); Dominic Steier, Naperville, IL (US); Li Zhuang, Long Grove, IL (US); Scott Sommers, Naperville, IL (US); Hazelton P. Avery, Batavia, IL (US); Pu Xie, Naperville, IL (US); Chia Hung Mou, Taipei (TW); Jerry Shubert, Batavia, IL (US); Daniel Wenzel, Hoffman Estates, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/144,268

(22) Filed: May 8, 2023

(65) Prior Publication Data

US 2023/0275372 A1 Aug. 31, 2023

Related U.S. Application Data

(63) Continuation of application No. 17/229,933, filed on Apr. 14, 2021, now Pat. No. 11,682,864.
(Continued)

(51) Int. Cl.
*H01R 13/6471* (2011.01)
*H01R 12/70* (2011.01)
(Continued)

(52) U.S. Cl.
CPC ....... *H01R 13/6471* (2013.01); *H01R 12/707* (2013.01); *H01R 12/71* (2013.01);
(Continued)

(58) Field of Classification Search
CPC .............. H01R 13/6471; H01R 12/707; H01R 12/71; H01R 13/502; H01R 13/629;
(Continued)

(56) References Cited

U.S. PATENT DOCUMENTS 6,431,914 B1 8/2002 Billman
8,821,195 B2 9/2014 Ao et al.
(Continued)

FOREIGN PATENT DOCUMENTS

JP 2009508730 A 3/2009
JP 3176488 U 6/2012
(Continued)

OTHER PUBLICATIONS

International Search Report and Written Opinion received for PCT Application No. PCT/US2021/027377, mailed on Aug. 2, 2021, 8 pages.
(Continued)

*Primary Examiner* — Abdullah A Riyami
*Assistant Examiner* — Justin M Kratt

(57) ABSTRACT

Examples of connectors, connector assemblies, and wafer assemblies for improved shielding and thermal performance are described. In one example, a wafer assembly includes a ground path assembly and a row of conductors. The ground path assembly includes a first ground shield and a second ground shield. The row of conductors includes a plurality of communication signal conductors and a plurality of ground conductors arranged in the row of conductors. The first ground shield extends along a first pair of communication signal conductors among the plurality of communication signal conductors and the second ground shield extends along a second pair of the communication signal conductors among the plurality of communication signal conductors.

21 Claims, 44 Drawing Sheets

Related U.S. Application Data

(60) Provisional application No. 63/116,648, filed on Nov. 20, 2020, provisional application No. 63/010,061, filed on Apr. 15, 2020.

(51) Int. Cl.

| | |
|---|---|
| ***H01R 12/71*** | (2011.01) |
| ***H01R 13/502*** | (2006.01) |
| ***H01R 13/629*** | (2006.01) |
| ***H01R 13/6583*** | (2011.01) |
| ***H01R 13/6587*** | (2011.01) |
| ***H01R 43/24*** | (2006.01) |
| *H01R 12/72* | (2011.01) |
| *H01R 13/504* | (2006.01) |
| *H01R 13/506* | (2006.01) |
| *H01R 13/514* | (2006.01) |
| *H01R 13/646* | (2011.01) |
| *H01R 13/6461* | (2011.01) |
| *H01R 13/658* | (2011.01) |
| *H01R 13/6581* | (2011.01) |
| *H01R 13/659* | (2011.01) |

(52) U.S. Cl.

CPC ......... *H01R 13/502* (2013.01); *H01R 13/629* (2013.01); *H01R 13/6583* (2013.01); *H01R 13/6587* (2013.01); *H01R 43/24* (2013.01); *H01R 12/7011* (2013.01); *H01R 12/7064* (2013.01); *H01R 12/72* (2013.01); *H01R 12/721* (2013.01); *H01R 12/727* (2013.01); *H01R 13/504* (2013.01); *H01R 13/506* (2013.01); *H01R 13/514* (2013.01); *H01R 13/646* (2013.01); *H01R 13/6461* (2013.01); *H01R 13/658* (2013.01); *H01R 13/6581* (2013.01); *H01R 13/659* (2013.01)

(58) Field of Classification Search

CPC ............ H01R 13/6583; H01R 13/6587; H01R 43/24; H01R 12/7011; H01R 12/7064; H01R 12/72; H01R 12/721; H01R 12/727; H01R 13/504; H01R 13/506; H01R 13/514; H01R 13/646; H01R 13/6461; H01R 13/658; H01R 13/6581; H01R 13/659; H01R 12/724; H01R 13/6271

See application file for complete search history.

(56) References Cited

U.S. PATENT DOCUMENTS

| | | | | |
|---|---|---|---|---|
| 10,062,984 | B2 | 8/2018 | Regnier | |
| 10,135,211 | B2 | 11/2018 | Lloyd et al. | |
| 10,574,002 | B1 | 2/2020 | Henry et al. | |
| 10,720,732 | B2 * | 7/2020 | Zhao | H01R 13/6594 |
| 11,177,592 | B2 | 11/2021 | Scholeno et al. | |
| 11,189,943 | B2 | 11/2021 | Zerebilov et al. | |
| 11,444,404 | B2 * | 9/2022 | Si | H01R 13/46 |
| 2011/0300757 | A1 | 12/2011 | Regnier et al. | |
| 2013/0017733 | A1 | 1/2013 | Kirk et al. | |
| 2016/0336692 | A1 | 11/2016 | Champion et al. | |
| 2018/0358751 | A1 | 12/2018 | Laurx et al. | |
| 2019/0036263 | A1 | 1/2019 | Avery et al. | |

FOREIGN PATENT DOCUMENTS

| | | | |
|---|---|---|---|
| JP | 2014056655 | A | 3/2014 |
| JP | 2018142553 | A | 9/2018 |
| JP | 2019505400 | A | 2/2019 |
| JP | 2019511826 | A | 4/2019 |
| JP | 2020022458 | A | 2/2020 |
| TW | 450460 | U | 8/2001 |
| TW | M359100 | U | 6/2009 |
| WO | 2019139882 | A1 | 7/2019 |

OTHER PUBLICATIONS

Non-Final Rejection received for U.S. Appl. No. 17/229,918, mailed on Jun. 23, 2023, 8 Pages.

Ex-Parte Quayle Action received for U.S. Appl. No. 17/229,933, mailed on Oct. 14, 2022, 8 Pages.

Notice of Allowance received for U.S. Appl. No. 17/229,933, mailed on Feb. 7, 2023, 8 Pages.

* cited by examiner

SHIELDED CONNECTOR ASSEMBLIES WITH TEMPERATURE AND ALIGNMENT CONTROLS

RELATED APPLICATIONS

This application is a continuation of Ser. No. 17/229,933, filed Apr. 14, 2021 which claims priority to U.S. Provisional Application 63/010,061, filed Apr. 15, 2020 and to U.S. Provisional Application 63/116,648, filed Nov. 20, 2020, all of which are incorporated herein by reference in their entireties.

TECHNICAL FIELD

This disclosure relates to the field of connector assemblies, more specifically to connector assemblies and their components suitable for use in high-speed data rate applications (e.g., at least 100 Gigabits per second (Gbps)).

INTRODUCTION

This section introduces aspects that may help facilitate a better understanding of the inventions. Accordingly, the statements of this section are to be read in this light and are not to be understood as admissions about what is prior art or what is not prior art.

To date, it has been challenging for high-speed data connector assemblies to control the temperatures produced by, for example, electronic circuits within plug-modules that are connected to the assemblies while at the same time maintaining the alignment of conductors within the assemblies and reducing the effects of potentially deleterious, electromagnetic interference (EMI), among other things. In particular, it is challenging to control the temperatures reached within receptacle cages of an assembly.

Accordingly, it is desirable to provide solutions to these challenges.

SUMMARY

The inventors describe various configurations of exemplary compact, high-speed multi-level, multi-port connector assemblies and their components. The inventive assemblies and components are configured to control temperatures and/or alignment while reducing EMI, among other things.

In one embodiment an inventive connector assembly may comprise: an internal housing having a first side and a second side opposite the first side; and first and second supporting side plates connected to the first and second sides of the internal housing, respectively, each side plate configured to fix the positions of tail portions of wafers within the internal housing with respect to one another and to align tail edges of terminals of each tail portion within the same geometrical plane.

In an embodiment, both of the side plates may comprise metal side-plates and the internal housing may comprise a plastic, such as a Liquid Crystal Polymer (LCP). Further, each of the side plates may be configured to receive wafer protrusions in one or more apertures of each side plate to hold the tail portions and to align the tail edges of the terminals of each tail portion within the same geometrical plane, for example.

It should be understood that the inventive connector assembly may also include a plurality of wafers within the internal housing (both top port wafers and bottom port wafers), where each of the plurality of wafers may comprise terminals overmolded with a plastic, or a plated plastic.

The exemplary, inventive connector assembly may further comprise a top port tail alignment and support structure comprising one or more tail alignment and support structure protrusions, and a bottom port tail alignment and support structure comprising one or more tail alignment and support structure protrusions.

In an embodiment, the top port tail alignment and support structure may be composed of a non-conductive material, while the bottom port tail alignment and support structure may be composed of a conductive material, for example.

Still further, the exemplary top port tail alignment and support structure may comprise one or more attachment structures to attach the top port tail alignment and support structure to a printed circuit board (PCB), wherein the one or more attachment structures may comprise (i) a non-conductive plastic covered with a glue, or (ii) a solderable, plated, non-conductive plastic or a metal that may be soldered to the PCB or (iii) a combination of the non-conductive plastic covered with the glue and the solderable, plated, non-conductive plastic or a metal soldered to the PCB.

In an alternative embodiment, each of the side plates may comprise one or more inwardly or outwardly bent or configured hook-like tabs connected to a PCB, and may also comprise integral, one or more solder nails to secure each side plate to a PCB, for example.

Another embodiment of the invention is directed at a component of a connector assembly, in particular a side plate. In one embodiment, an inventive side plate may be connected to a side of an internal housing, where the side plate may be configured to receive protrusions of a tail alignment and support structure and wafer protrusions to, among other things, hold tail portions of each of a plurality of wafers and to align tail edges of terminals of each tail portion within the same geometrical plane. Such a side plate may also comprise one or more inwardly or outwardly bent or configured hook-like tabs connected to a PCB or integral and/or one or more solder nails to secure each side plate to the PCB.

In addition to inventive connector assemblies and components, the inventors provide related inventive methods that parallel the inventive connector assemblies and components. For example, a method for fixing a position of wafers within a connector assembly may comprise: fixing the position of the wafers within an internal housing of the connector assembly, with respect to one another, using first and second supporting side plates connected to first and second sides of the internal housing; and receiving protrusions of a non-conductive, top port tail alignment and support structure, protrusions of a conductive, bottom port tail alignment and support structures and wafer protrusions within apertures of the first and second side plates to hold tail portions of each of the wafers and to align tail edges of terminals of each tail portion within the same geometrical plane.

BRIEF DESCRIPTION OF THE DRAWINGS

The present invention is illustrated by way of example and is not limited by the accompanying figures in which like reference numerals indicate similar elements and in which.

Figure 1A:
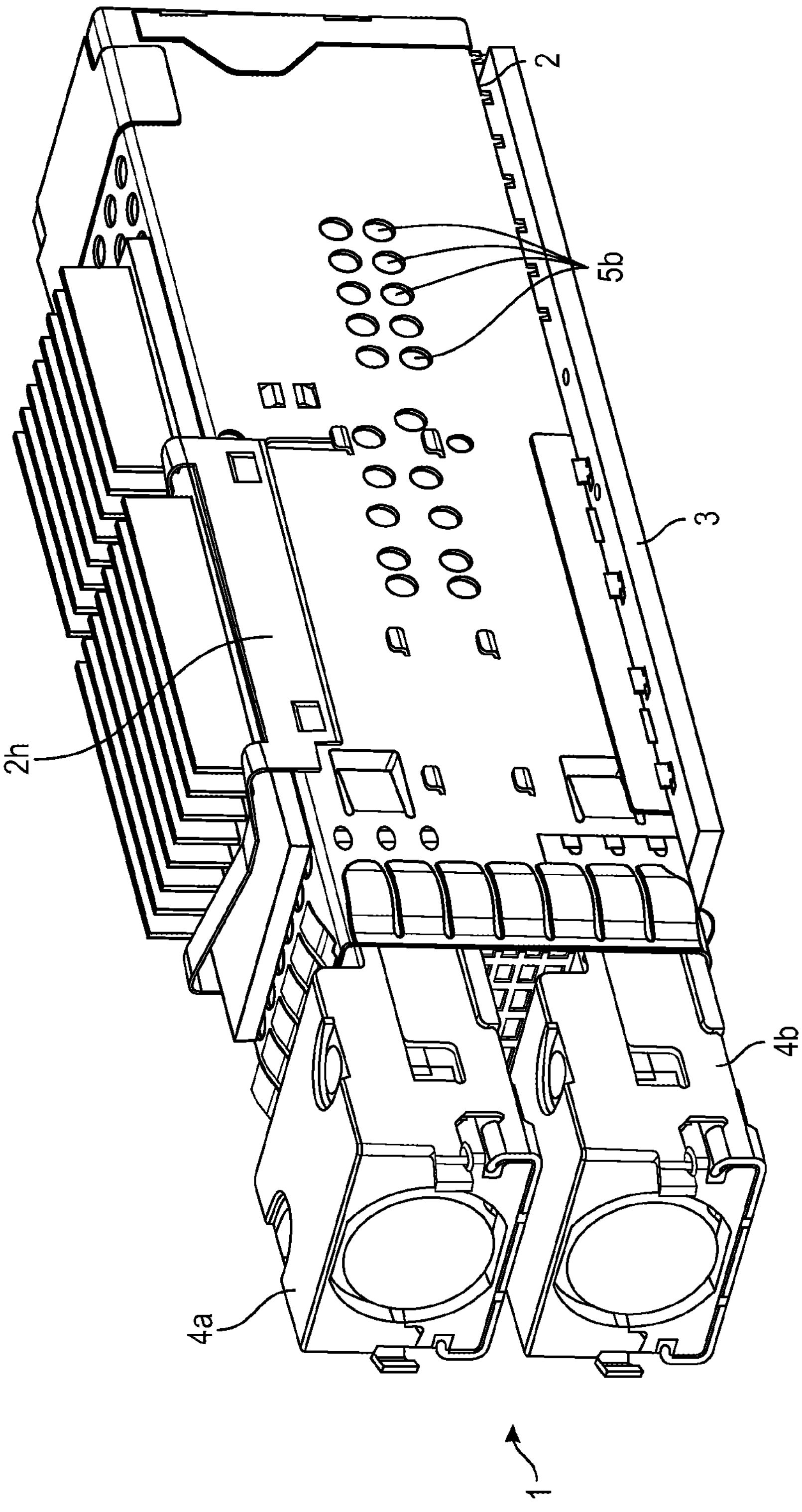
FIG. 1A depicts a perspective view of an exemplary, inventive connector assembly according to an embodiment of the invention.

Specific embodiments of the present invention are disclosed below with reference to various figures and sketches. Both the description and the illustrations have been drafted with the intent to enhance understanding. For example, the dimensions of some of the elements in the figures may be exaggerated relative to other elements, and well-known elements that are beneficial or even necessary to a commercially successful implementation may not be depicted so that a less obstructed and a more clear presentation of embodiments may be achieved.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

As used herein and in the appended claims, the terms "comprises," "comprising," or any other variation thereof and "includes" or "including" and any variation thereof are intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

As used herein the terms "a" or "an" mean one or more than one. As used herein, the term "plurality" means two or more than two. As used herein the term "another" means at least a second or more.

Unless otherwise indicated herein, the use of relational terms, if any, such as "first" and "second", "top" and "bottom", "left" or "right" and the like are used solely to distinguish one element, component, entity or action from another element, component, entity or action without necessarily requiring or implying any actual such relationship, order or importance between such elements, components, entities or actions.

The terms "including" and/or "having", as used herein, are defined as comprising (i.e., open language). The term "coupled", as used herein, is defined as connected, although not necessarily directly, and not necessarily mechanically. The use of "or" or "and/or" herein is defined to be inclusive (A, B or C means any one or any two or all three letters) and not exclusive (unless explicitly indicated to be exclusive); thus, the use of "and/or" in some instances is not to be interpreted to imply that the use of "or" somewhere else means that use of "or" is exclusive. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

As used herein the phrases "high-speed", "high-speed signal", "high-speed data", "high-speed data signal" and the like are meant to be synonymous unless the context or knowledge of one skilled in the art indicates otherwise. One example of a high-speed data signal may be at least 100 Gbps signal.

Similarly, the phrases "low-speed", "low speed signal", low-speed data", "low-speed data signal" and the like are meant to be synonymous unless the context or knowledge of one skilled in the art indicates otherwise. Generally, low-speed signals may be considered signals that are associated with control and system maintenance as opposed to signals associated with information transfer. Further, a non-limiting low speed signal may be associated with a data transmission rate below 1-Gbps and typically does not require specialized signal conveyance structures, such as ground supported waveguides. For the sake of brevity, reference to "low-speed terminals" may sometimes include power terminals depending on the context.

As used herein the phrase "configured to" or "operable to" means "functions to" unless the context or knowledge of one skilled in the art indicates otherwise.

As used herein the phrase "a to n" indicates a first element "a" and a last element "n". For example, one or more apertures, where "a" is a first aperture and "n" is a last aperture. Further, the letters "n" or "nn" indicate one exemplary element among a number of similar elements, e.g., aperture 11*n*.

As used herein the terms "exemplary" and "embodiment" mean one or more non-limiting examples of an inventive connector assembly, inventive component or element, inventive process or part of an inventive process.

As used herein the words "terminal" and "conductor" may be used synonymously unless the context or knowledge of those skilled in the art dictate differently.

As used herein the words "hold" and "fix" may be used synonymously unless the context or knowledge of those skilled in the art dictate differently.

Figure 1B:
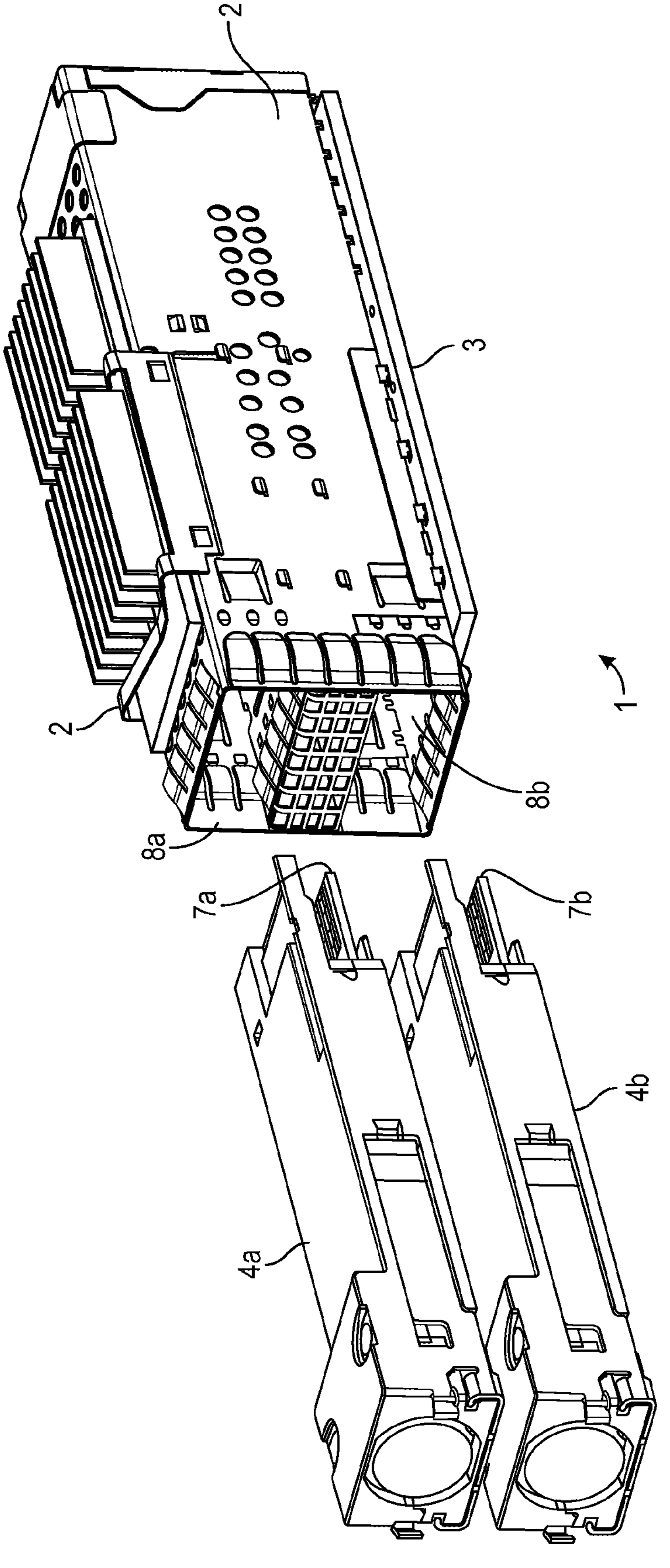
FIG. 1B illustrates a partially exploded view of the embodiment depicted in FIG. 1A.

Referring now to FIG. 1A, there is depicted a view of an exemplary, inventive shielded, high-speed, multi-level, multi-port connector assembly 1. As shown, the assembly 1 may comprise an electromagnetic shielding cage 2 that can be configured to protect a number of different connectors, each of which may have a top port and a bottom port (both hidden from view), and may be connected to a main, electronic printed circuit board 3 (PCB) according to one embodiment of the invention. Also shown are pluggable module assemblies 4*a*, 4*b* that may include PCB sub-assemblies, where one of the pluggable module assemblies 4*a* may be connected to the top port via a card slot (not shown) in the top port and the other assembly 4*b* may be connected to the bottom port via a card slot in the bottom port. FIG. 1B depicts the two assemblies 4*a*, 4*b* prior to connection with the top and bottom ports 8*a*, 8*b*.

In more detail, the cage 2 may be positioned over portions of the top and bottom ports 8*a*, 8*b* of a connector to provide shielding for at least the connector and other components within the cage 2 from a range of electromagnetic interference (EMI).

Figure 2:
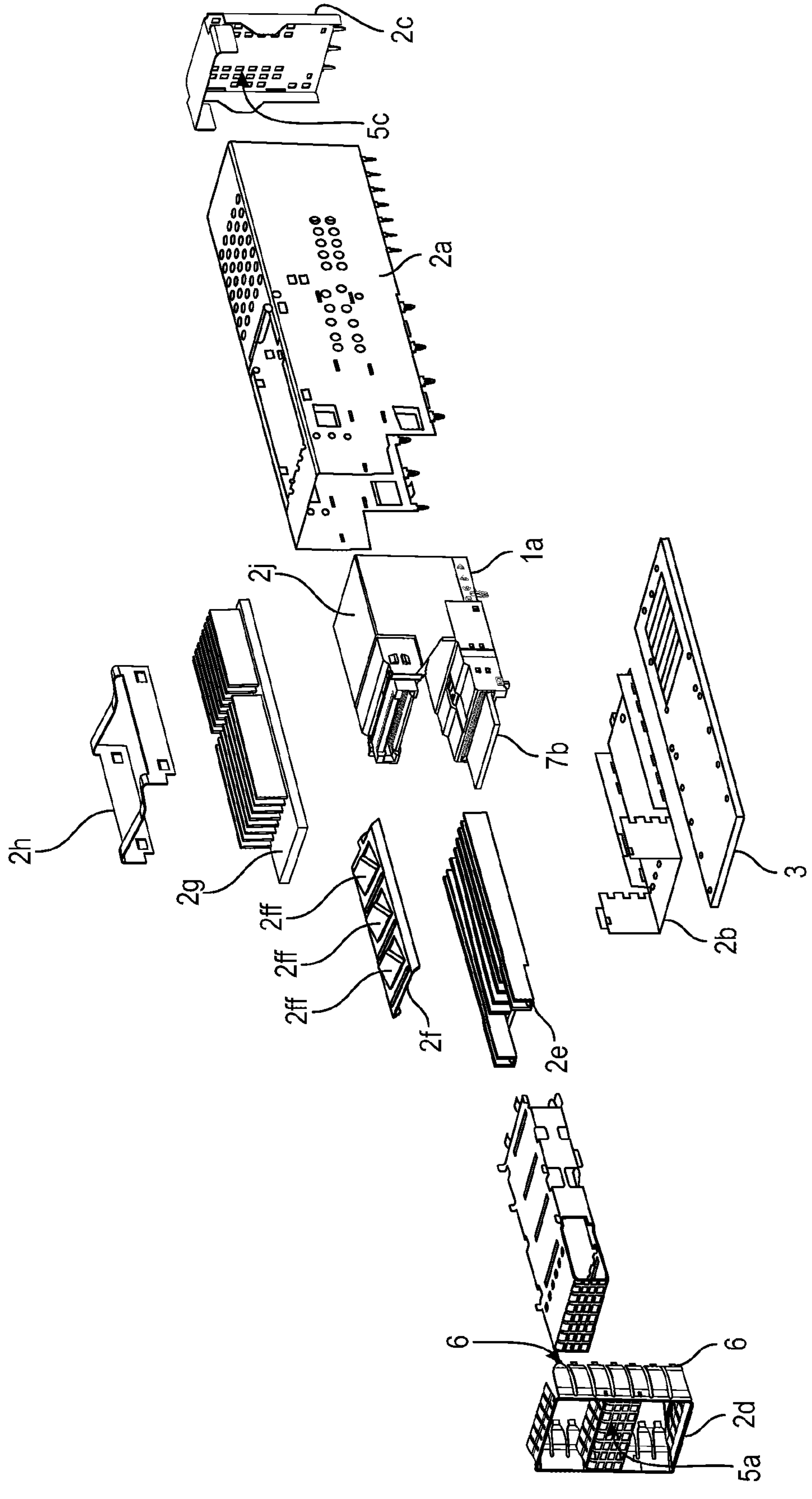
FIG. 2 depicts an exploded view of an exemplary, inventive connector assembly according to an embodiment of the invention.

Referring now to FIG. 2 there is shown an "exploded" view of exemplary components that may be used to construct the exemplary connector assembly 1. As depicted, cage 2 may comprise a three-sided, conductive cover 2*a* (e.g., a top and two sides) with a cage base 2*b*, a shielded back plate 2*c* and a front end-shield 2*d*. Each of these components 2*a*, 2*b*, 2*c* and 2*d* may be operable to shield components that they respectively cover, such as the connector 1*a*, from EMI. So positioned, the cage 2 may be operable to shield the connector 1*a* from a range of EMI (e.g., nominally covering 10 MHz to 50 GHz).

In an embodiment, the components 2$a$, 2$b$, 2$c$ and 2$d$ may be composed of a sufficiently conductive metal or conductive plated plastic, for example, though these are just two of the types of conductive materials that may be used. Further, these shielded, component structures may be comprised of one or more differently configured perforated and/or non-perforated apertures to allow air flow and contribute to the control of the temperature of components making up the assembly 1. Such apertures may also be configured to reduce the effects of EMI.

In more detail, the front end-shield 2$d$ may comprise one or more associated openings, apertures or vents 5$a$ (collectively "apertures") that are operable to allow air to flow through into, and/or out of, the interior of the cage 2 in order to reduce the temperature of components enclosed by the cage 2, such as the connector 1$a$. Further, the front end-shield 2$d$ may further comprise a plurality of conductive, deformable structures or elements 6 that may be formed around part, or substantially all, of the perimeter of the shield 2$d$. In an embodiment, another device (e.g., paddle card, see component 7$b$) having corresponding, opposed deformable structures or elements (not shown) may be pushed onto and positioned over elements 6 such that the other device can be said to be "plugged into" port 8$b$ of the connector 1$a$ via a card slot in port 8$b$. The opposing forces of the two opposing sets of deformable elements along with one or more latches (e.g., one latch usually located on each side of the cage 2, near the front, described elsewhere herein) secures the other device to port 8$b$ of the connector 1$a$. Yet further, in an embodiment, such a "plugged in" configuration forms a continuous EMI shielding seal. Further, because the elements 6 are conductive an electrical ground path may be established.

Continuing, the assembly 1 may further comprise a top heat sink 2$g$ and second fastening clip 2$h$ and an internal, unitary (e.g., one-piece) central housing 2$j$ enclosing the bottom and top port 8$a$, 8$b$, where a paddle card 7$b$ is illustrated as being inserted into the bottom port 8$b$.

Optionally, the assembly 1 may further comprise a cage midsection that comprises an internal heat sink 2$e$ and fastening clip 2$f$.

In an embodiment, a top heat sink 2$g$ may extend substantially the full length of the cage 2 while the internal central housing 2$j$ is within the cage 2.

While FIG. 2 depicts assembly 1 as including all of the just described components, it should be understood that other connector assembly embodiments are envisioned that include only a subset of such components. Yet further, additional embodiments may include: (i) additional components that are not shown in FIG. 2; (2) fewer components (i.e., a subset of the components shown in FIG. 2); and/or (iii) a subset of the components shown in FIG. 2 with additional components that are not shown in FIG. 2, for example.

Continuing, the first fastening clip 2$f$ may comprise one or more deformable elements 2$ff$ that are operable to apply a spring-like force on the internal heat sink 2$e$ which is within the sides of the cage 2. As a result of such a force the heat sink 2$e$ may make contact with components within the cage 2, such as the top port. Turning to the second fastening clip 2$h$, in an embodiment the clip 2$h$ may be operable to apply a force to the top heat sink 2$g$ so that the heat sink 2$g$ makes contact with components enclosed by, and within, the cage 2, such as optical-to-electrical (O/E) and/or electrical-to-optical (E/O) conversion circuitry, active devices and/or retiming circuitry (not shown), for example.

In embodiments of the invention, the inventive assembly 1 may comprise additional components other than the front end-shield 2$d$ that are operable to reduce the temperature of components of the assembly 1. For example, the cage 2 and shielded back plate 2$c$ may also comprise one or more correspondingly associated apertures 5$b$, 5$c$, respectively, that are configured to allow air to flow through to the interior of the cage 2 in order to reduce the temperature of components enclosed by the cage 2 (see FIGS. 1A and 2). In an embodiment, when connected the assembly 1$a$, plugged-in paddle card 7$b$ and PCB 3 form a fully functional connection that allows for transport of up to at least 100 Gbps, for example.

Depending on the embodiment, one or more of each of the above described apertures may be shaped as a hexagon. Alternatively, one or more of each of the above described apertures may be shaped as a circle to name just two of the many different types of aperture shapes that may be utilized and still allow the apertures to function as temperature controls to reduce the temperature of components of an inventive assembly. Further, a given set of associated apertures may include a subset of hexagonal shaped apertures and a subset of circular shaped apertures, for example. In embodiments, a surface area and/or structure of a component of an inventive assembly (e.g., components 2$a$, 2$c$ and 2$d$) may allow inclusion of more hexagon-shaped apertures than circular-shaped apertures due to the dimensions of the component and aperture (i.e., more hexagon-shaped apertures may be formed in a component than circular-shaped apertures).

Further, each aperture may be configured to have a width to reduce the effects of EMI on components within an interior of the assembly 1 depending on the frequency or frequencies sought to be attenuated and may be configured to have an extruded depth to reduce the effects of EMI on interior components depending on the amount of attenuation (e.g., in dB) desired. For example, the smaller the width of the aperture the higher the upper cutoff frequency that can be attenuated while a deeper in extruded depth aperture can attenuate more of a given signal at a given frequency (i.e., reduce the decibel level of a signal). In an embodiment, an aperture used as a part of an inventive assembly may have a width and extruded depth (i.e., may be sized) that corresponds to an amount of attenuation desired.

Further, in embodiments a given sized aperture within a group of apertures may be repeated aperiodically to avoid aperture to aperture enhancement or "gain" at a given frequency or band of frequencies. Still further, exemplary apertures may each have the same width and, therefore, may attenuate signals at substantially the same range of frequencies. However, by changing the extruded depth of a given aperture such an apertures would attenuate a given signal at a given frequency more than an aperture with a lesser (shorter) extruded depth (i.e., an apertures with a greater extruded depth may reduce the decibel level of a signal more than an aperture with a shorter extruded depth).

In an embodiment, the thickness and composition of the cover 2$a$ of the cage 2 may be set to achieve a desirable EMI, attenuation level. For example, a thin thickness composed of a given material may attenuate unwanted frequencies less than a thicker thickness of the same given material. Still further, the cover 2$a$ of the cage 2 may be comprised of multiple layers of the same, or different, attenuating materials (e.g., layers can be composed of metallic material while others can be composed of other conductive materials, such as plated plastics).

Figure 3A:
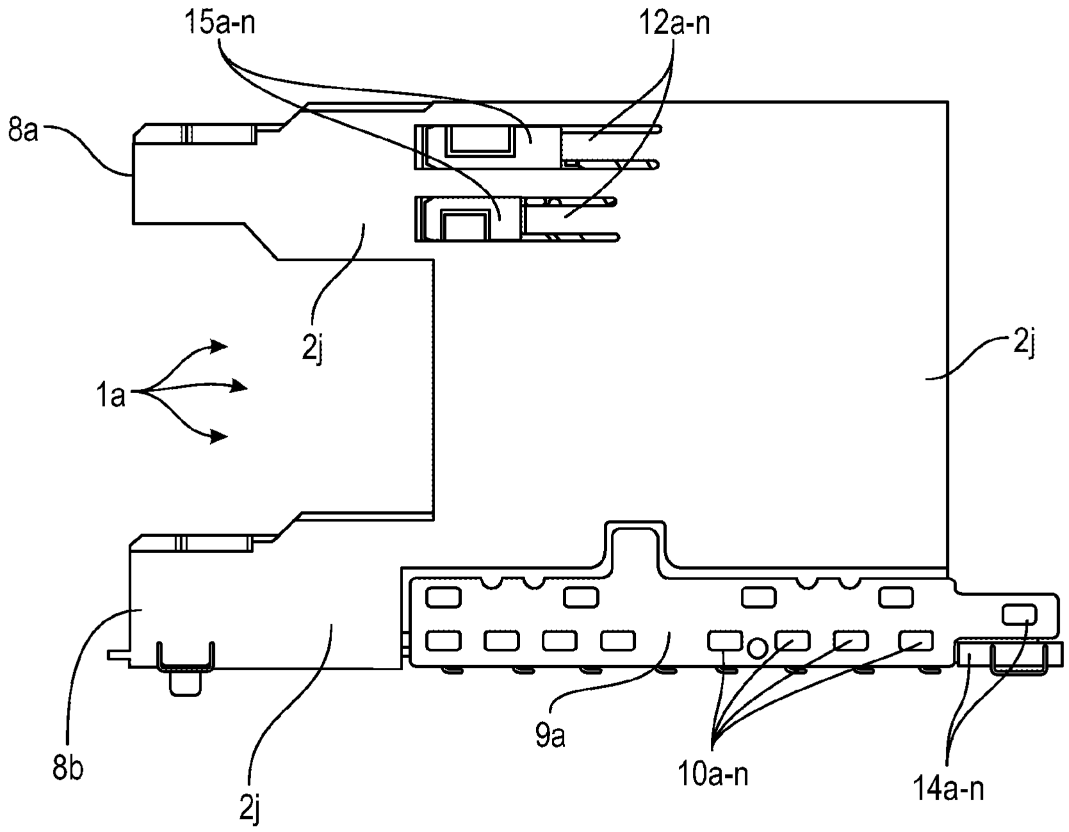
FIG. 3A depicts an elevated side view of an exemplary, inventive connector according to an embodiment of the invention.
Figure 3B:
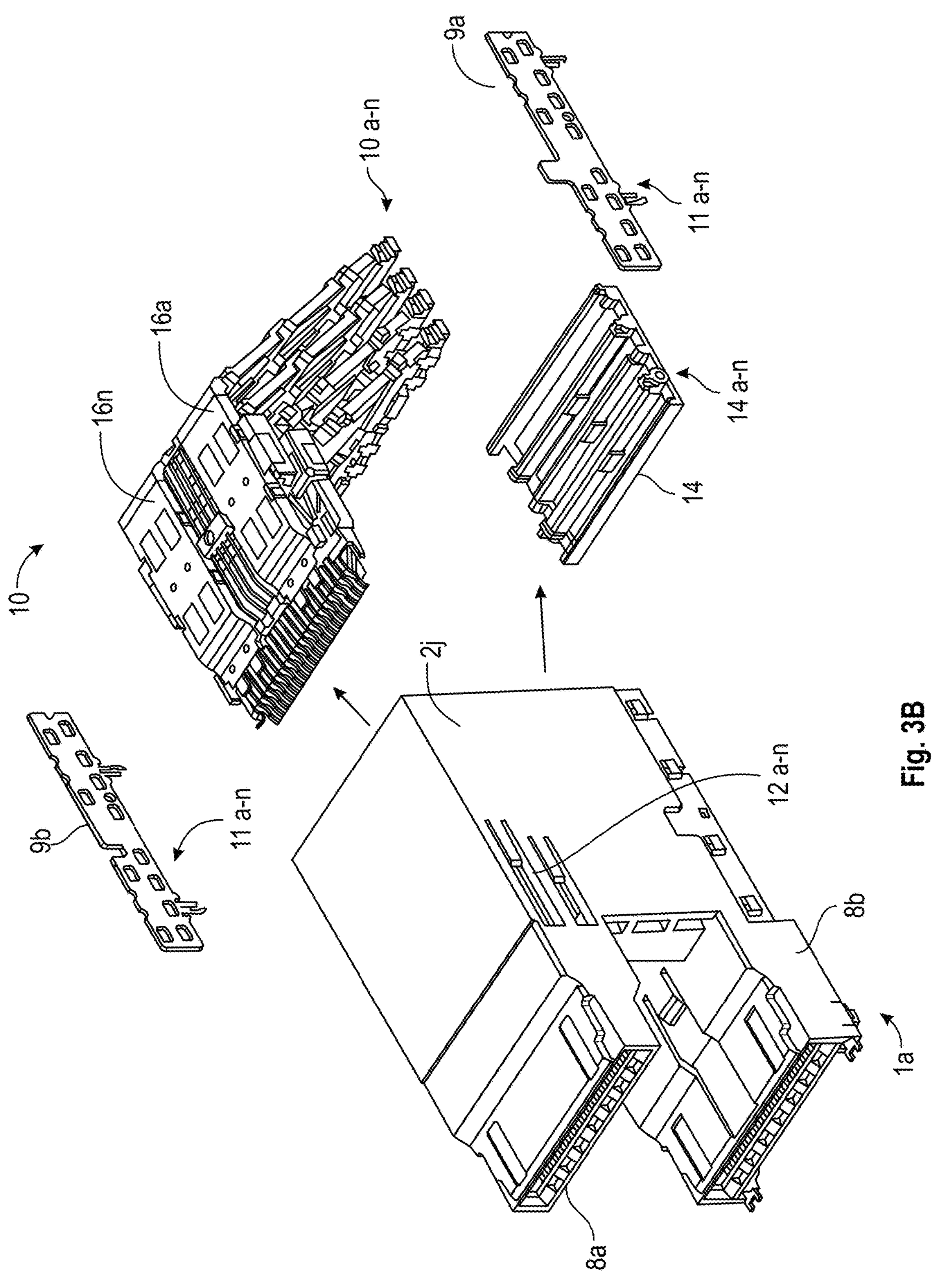
FIG. 3B depicts a partially exploded perspective view of the connector depicted in FIG. 3A.
Figure 3C:
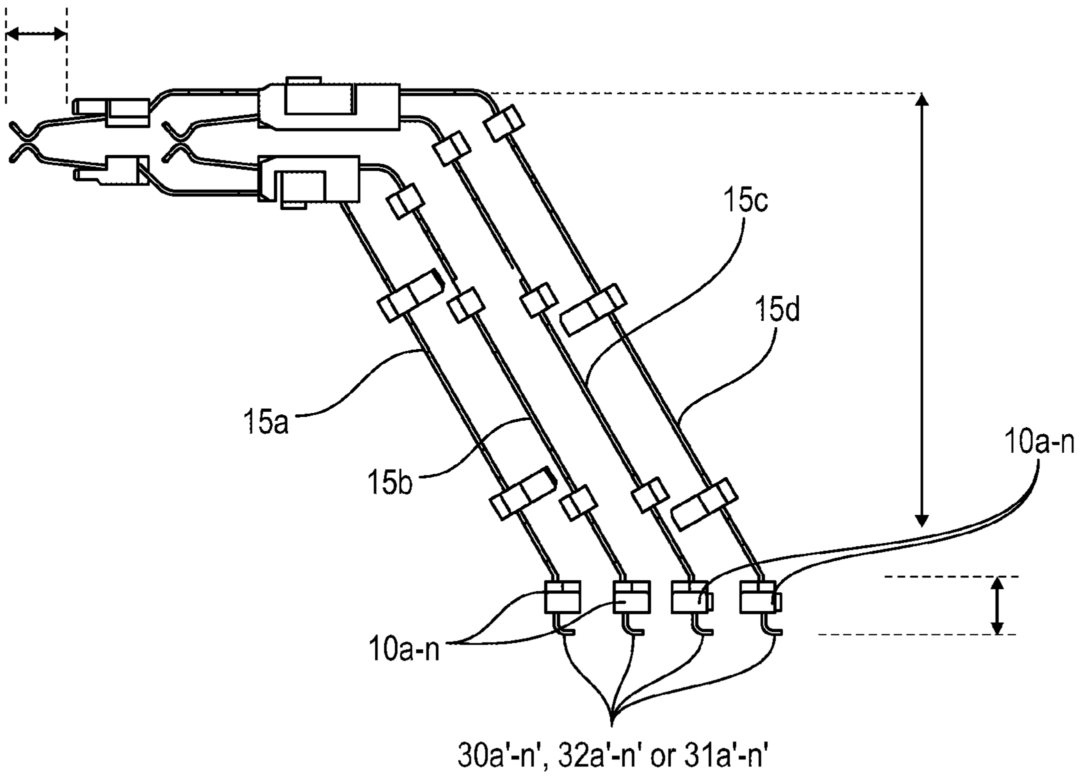
FIG. 3C depicts an elevated side view of an exemplary, inventive wafer according to an embodiment of the invention.
Figure 3D:
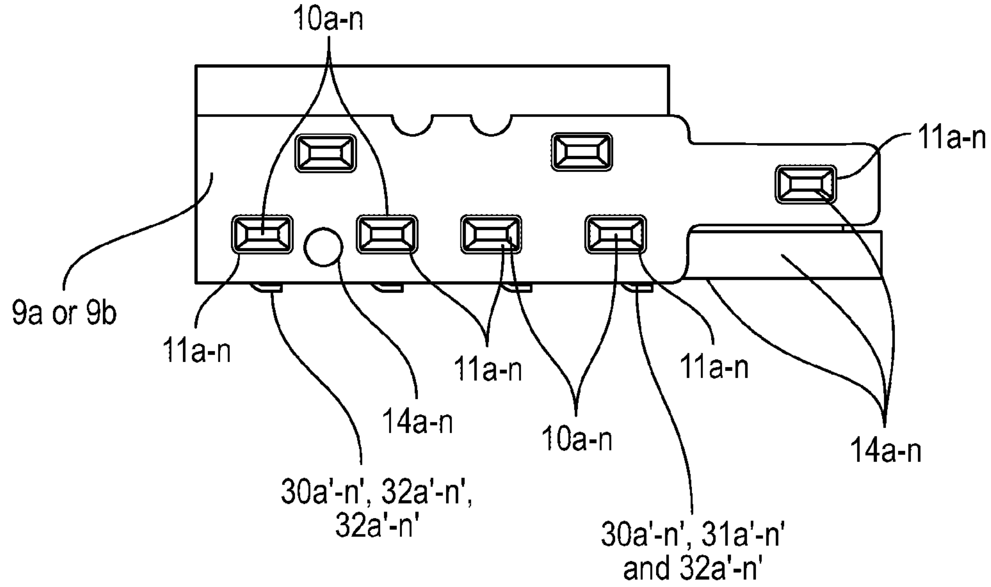
FIG. 3D depicts an elevated side view of an embodiment of an inventive alignment control feature according to an embodiment of the invention.
Figure 3E:
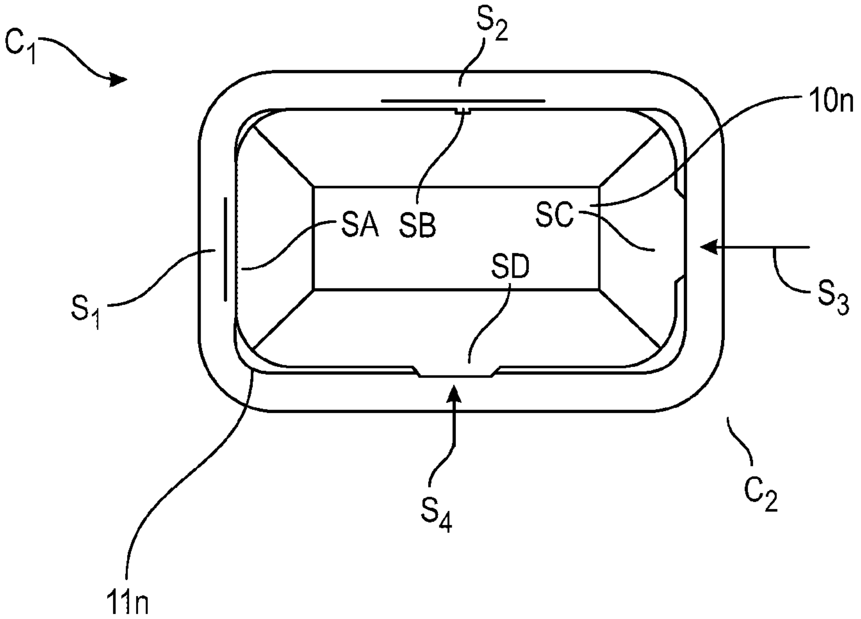
FIG. 3E depicts an embodiment of an inventive alignment control feature according to an embodiment of the invention.
Figure 3F:
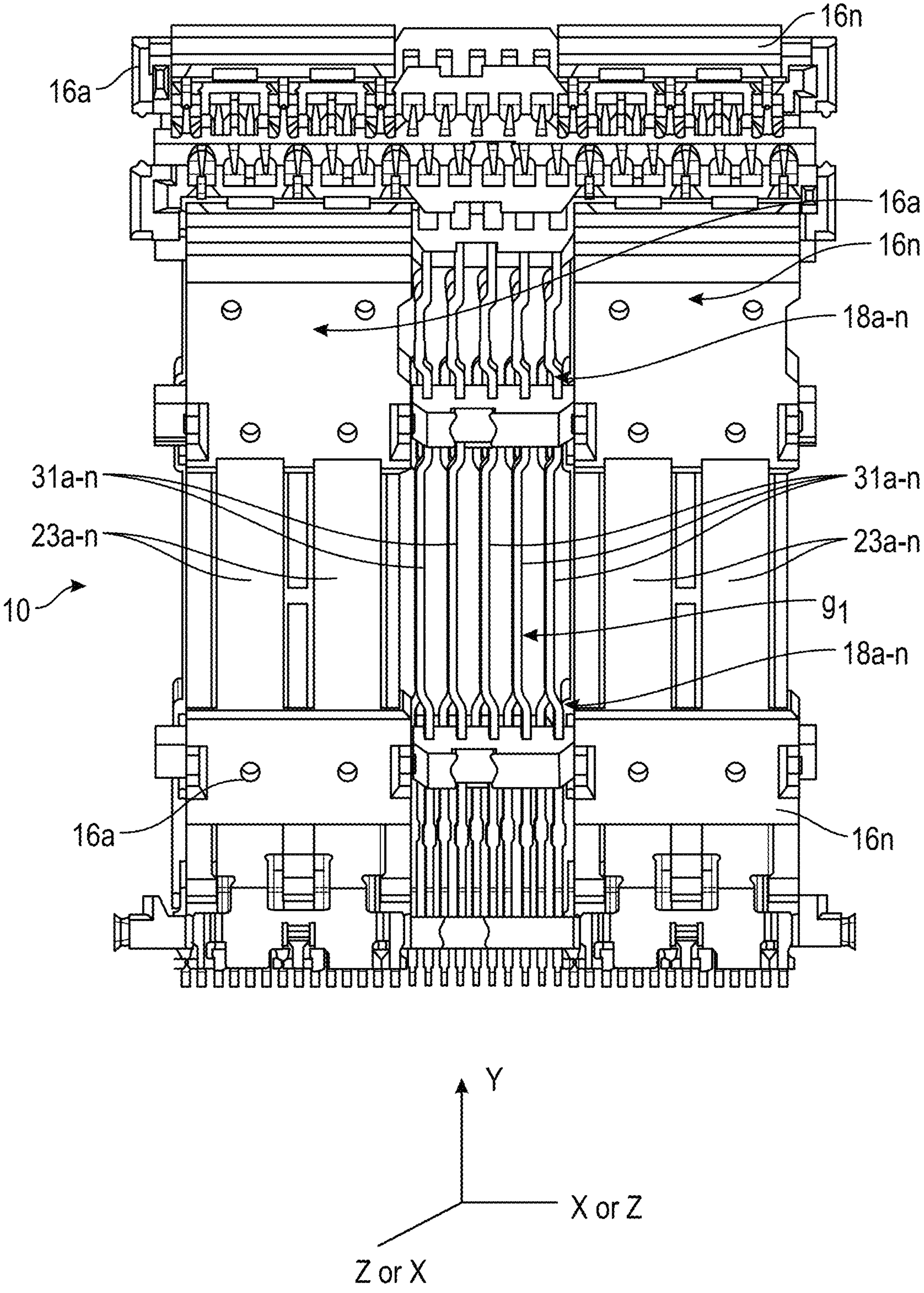
FIG. 3F depicts an embodiment of an inventive conductive ground shield according to an embodiment of the invention.
Figure 3G:
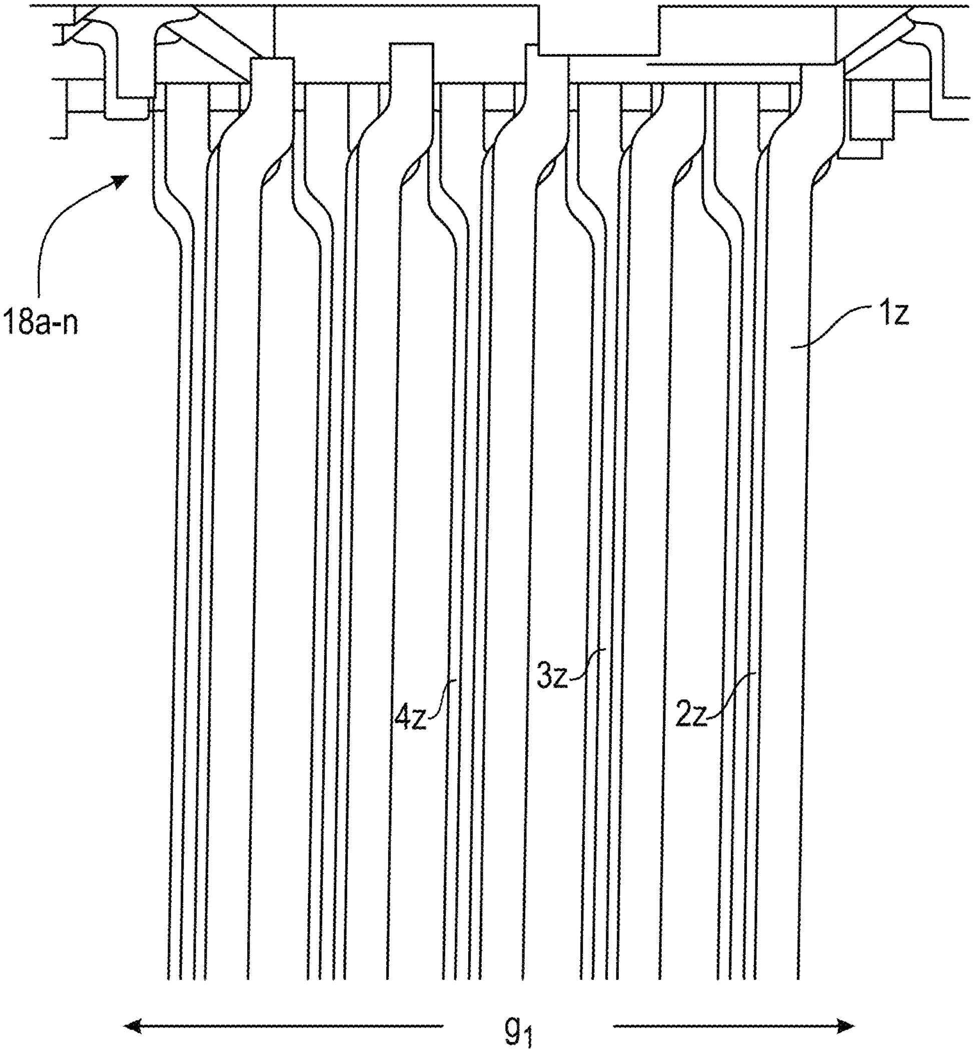
FIG. 3G depicts an enlarged view of exemplary inventive temperature control features according to an embodiment of the invention.
Figure 3H:
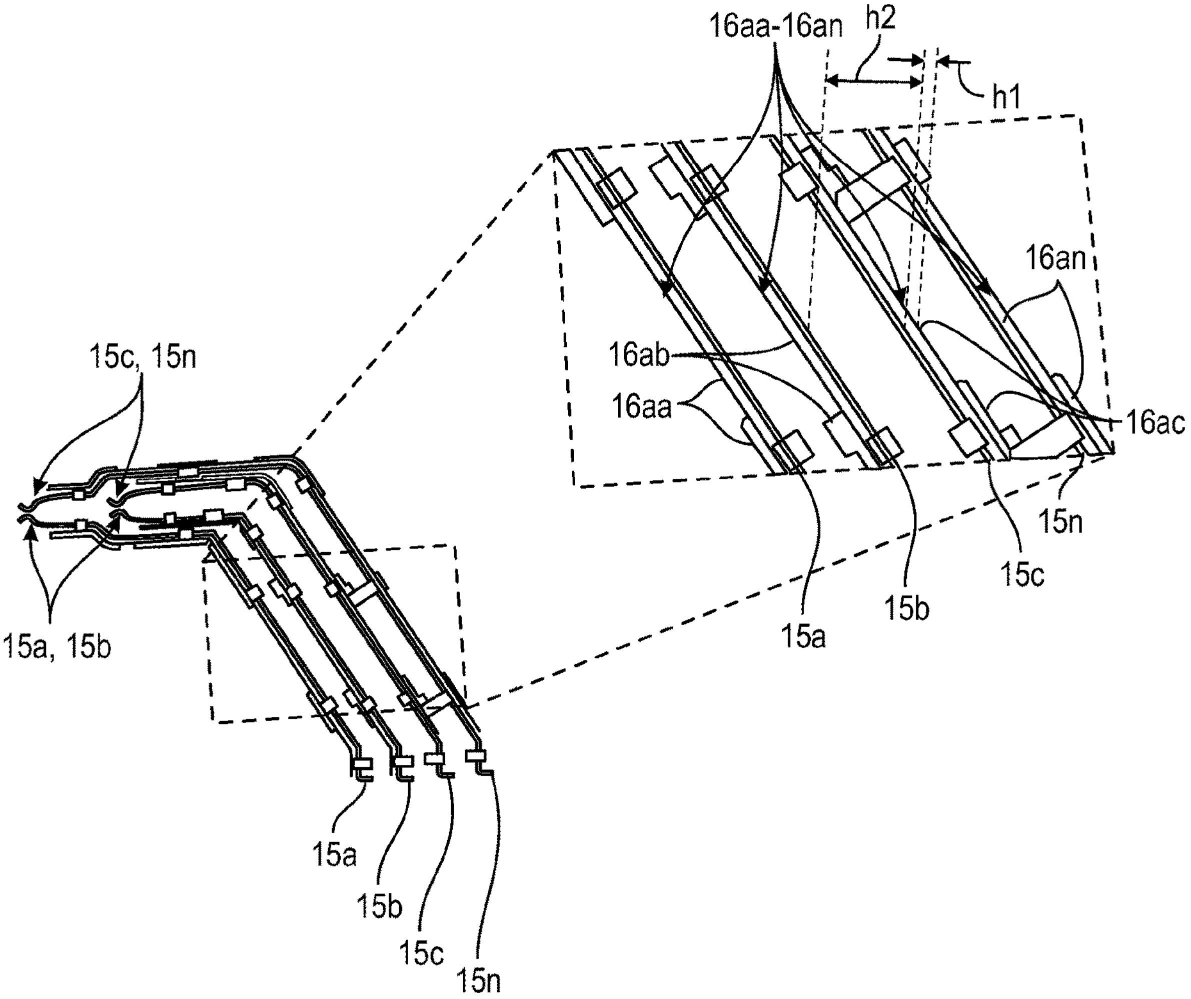
FIG. 3H depicts an embodiment of an inventive wafer according to an embodiment of the invention.
Figure 3I:
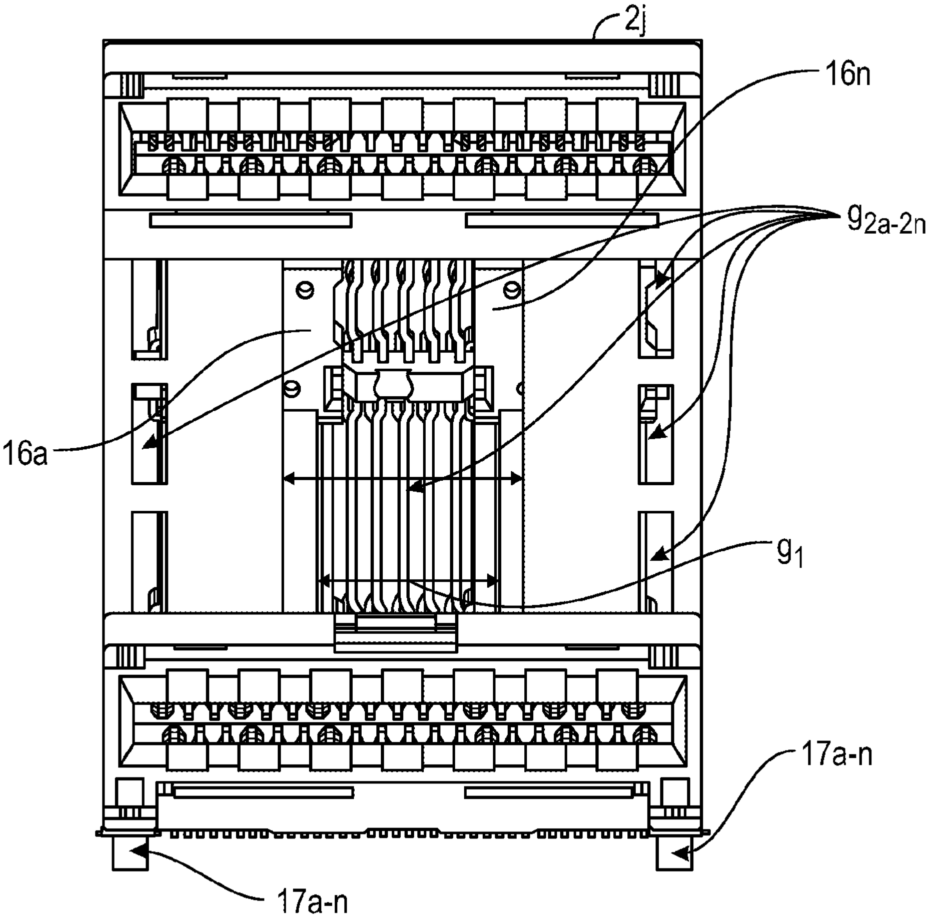
FIG. 3I depicts additional exemplary inventive temperature control features according to embodiments of the invention.
Figure 3J:
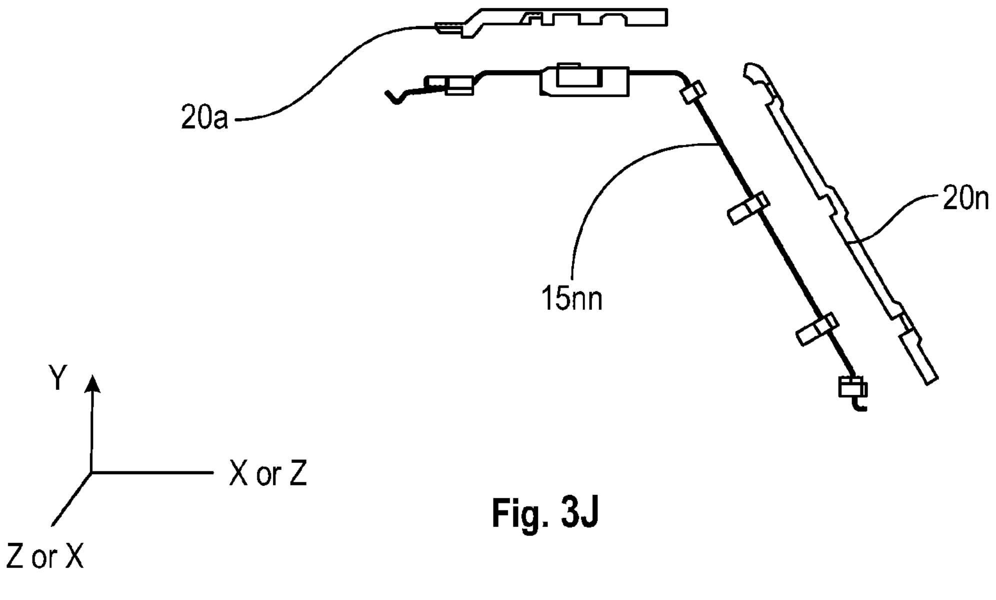
FIG. 3J depicts an exemplary inventive conductive ground shield according to an embodiment of the invention.
Figure 3K:
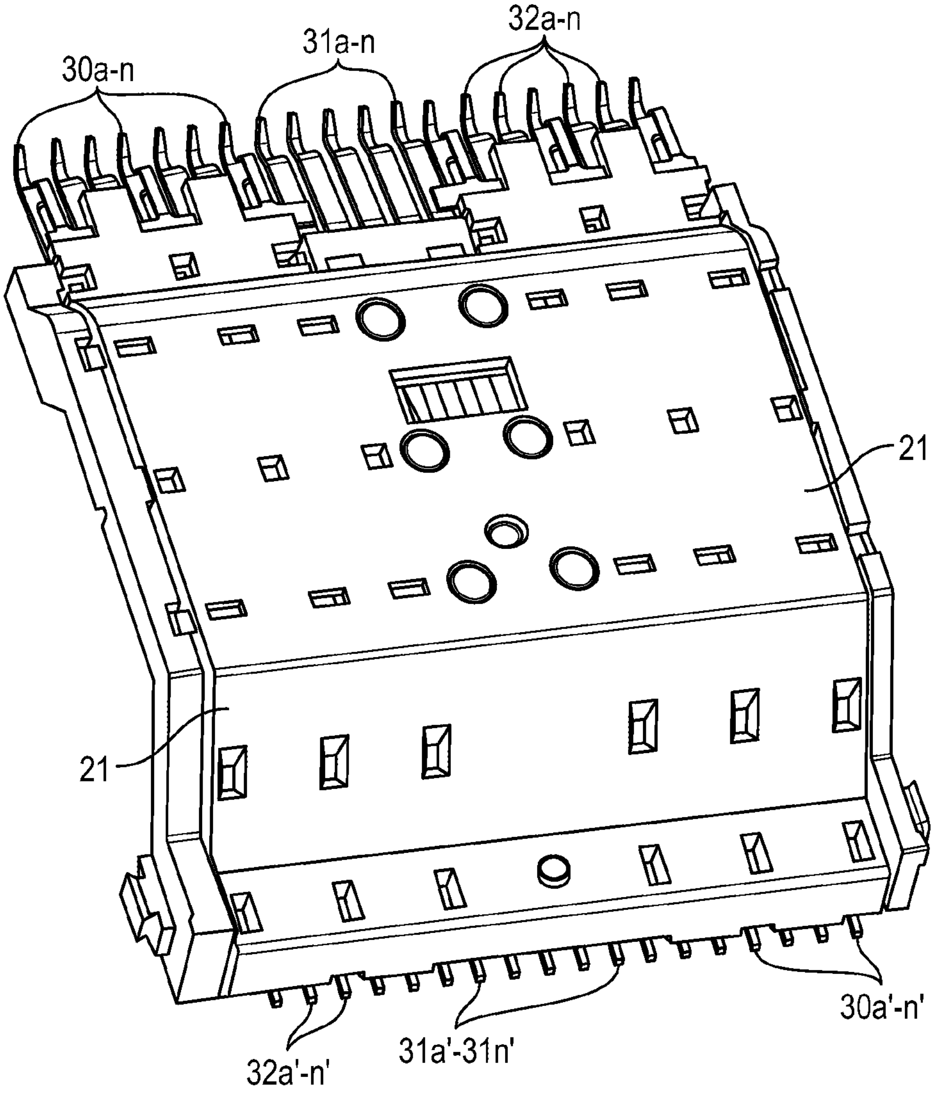
FIG. 3K depicts an embodiment of an inventive conductive ground shield accordingly to an embodiment of the invention.
Figure 3L:
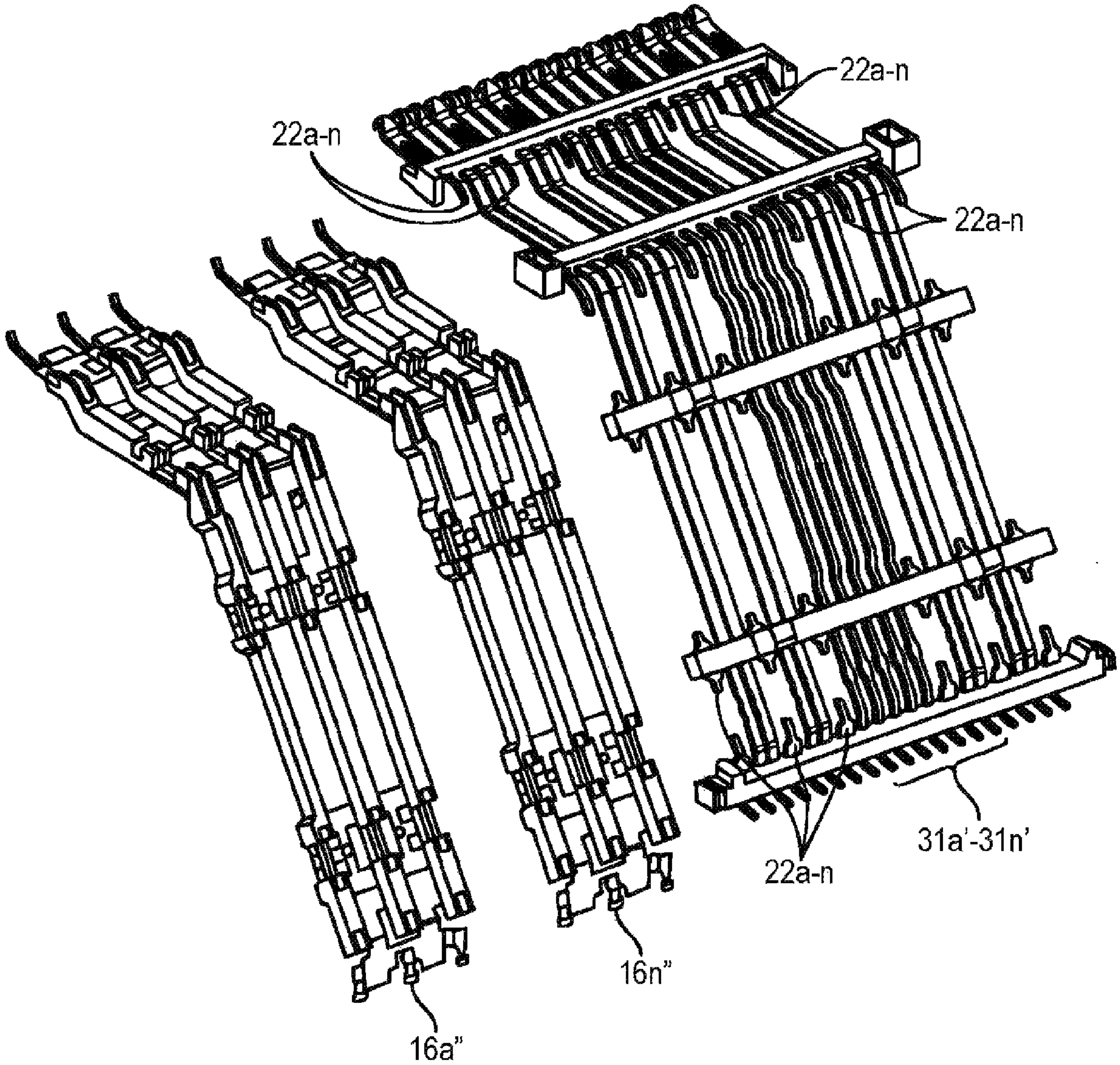
FIG. 3L illustrates an exemplary, inventive stitching of ground terminals to conductive ground shields according to an embodiment of the invention.
Figure 3M:
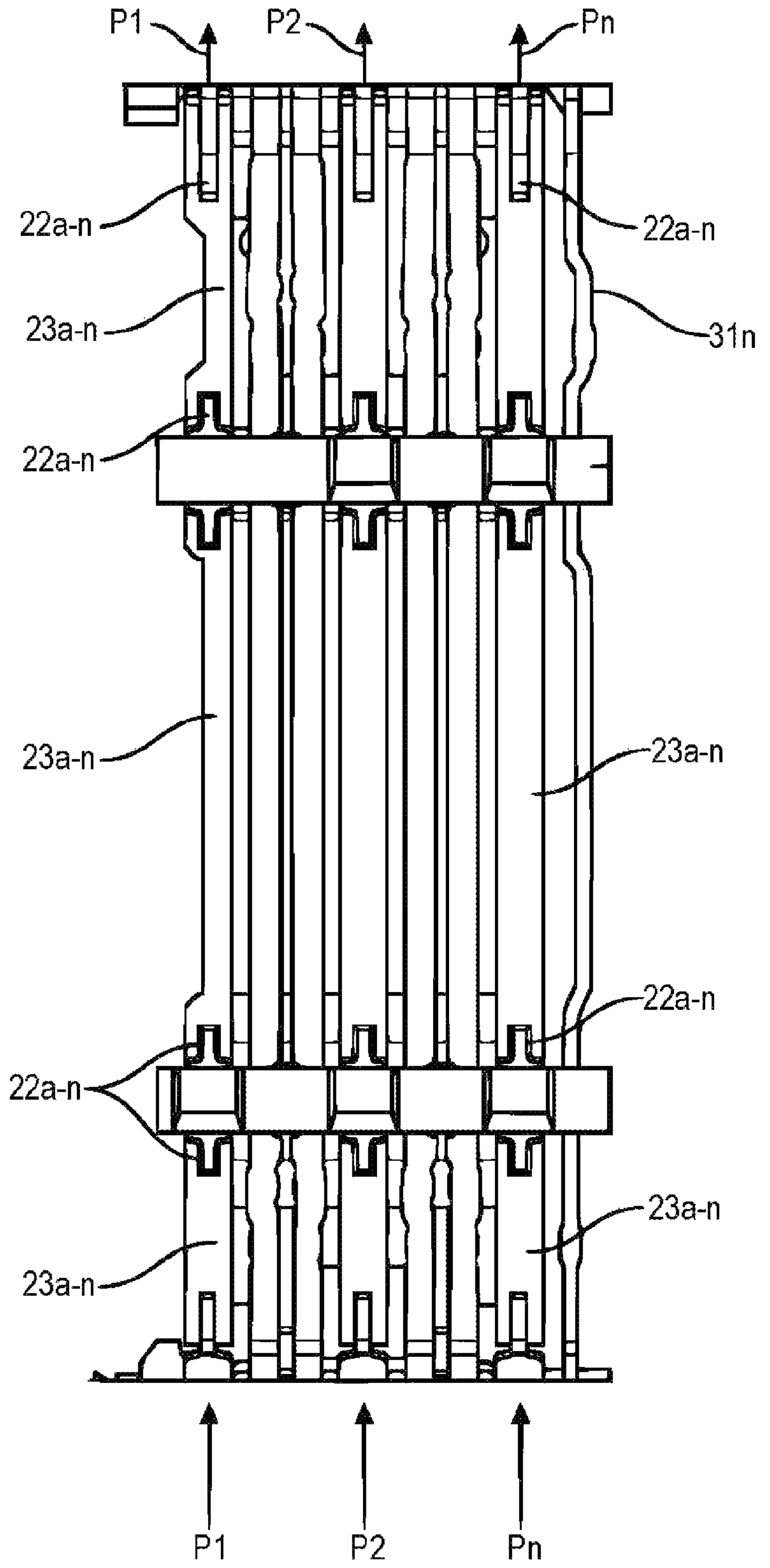
FIG. 3M illustrates another exemplary, inventive stitching of ground terminals to conductive ground shields according to an embodiment of the invention.
Figure 3N:
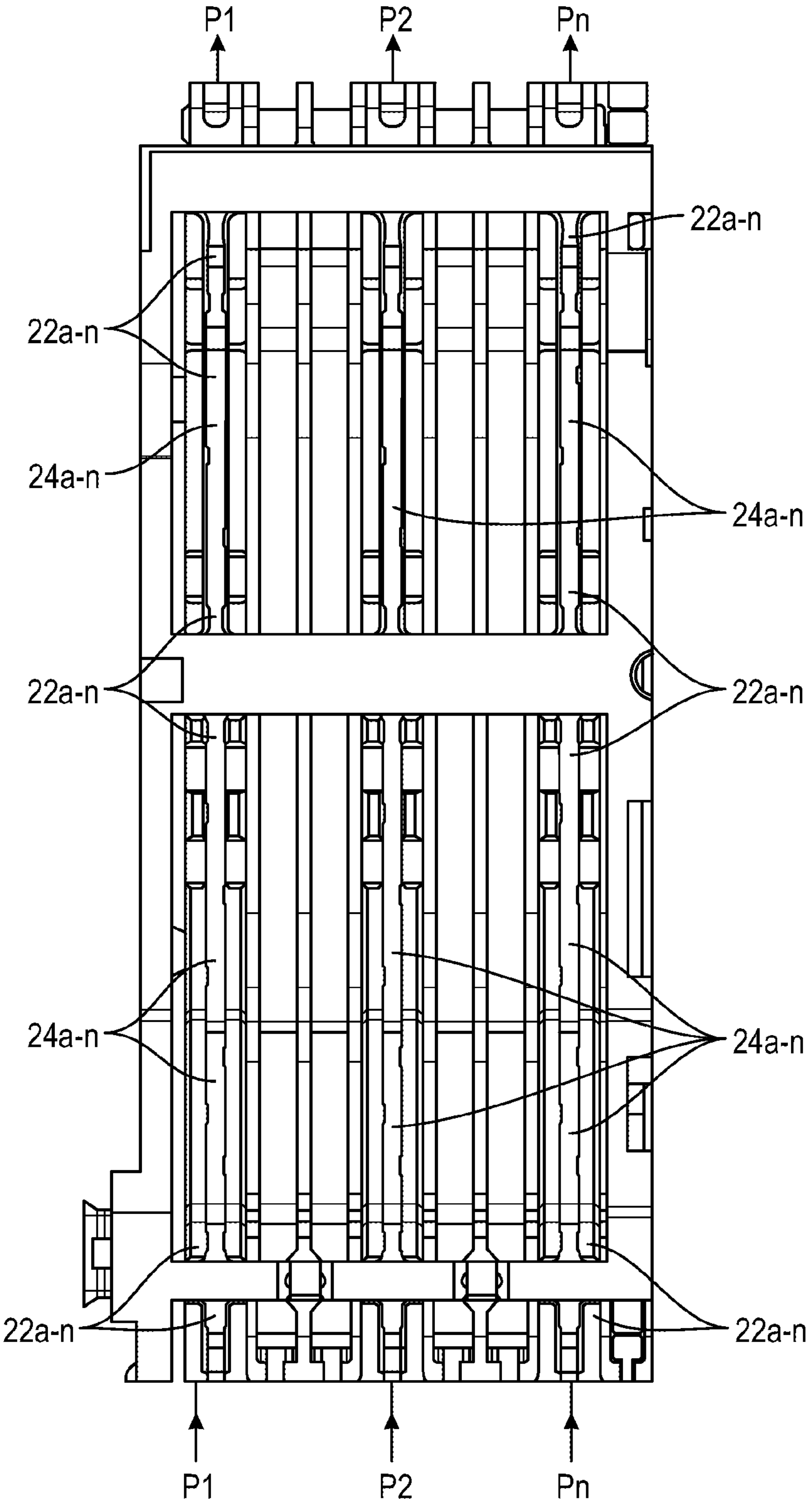
FIG. 3N illustrates another exemplary, inventive stitching of ground terminals to conductive ground shields according to an embodiment of the invention.
Figure 3P:
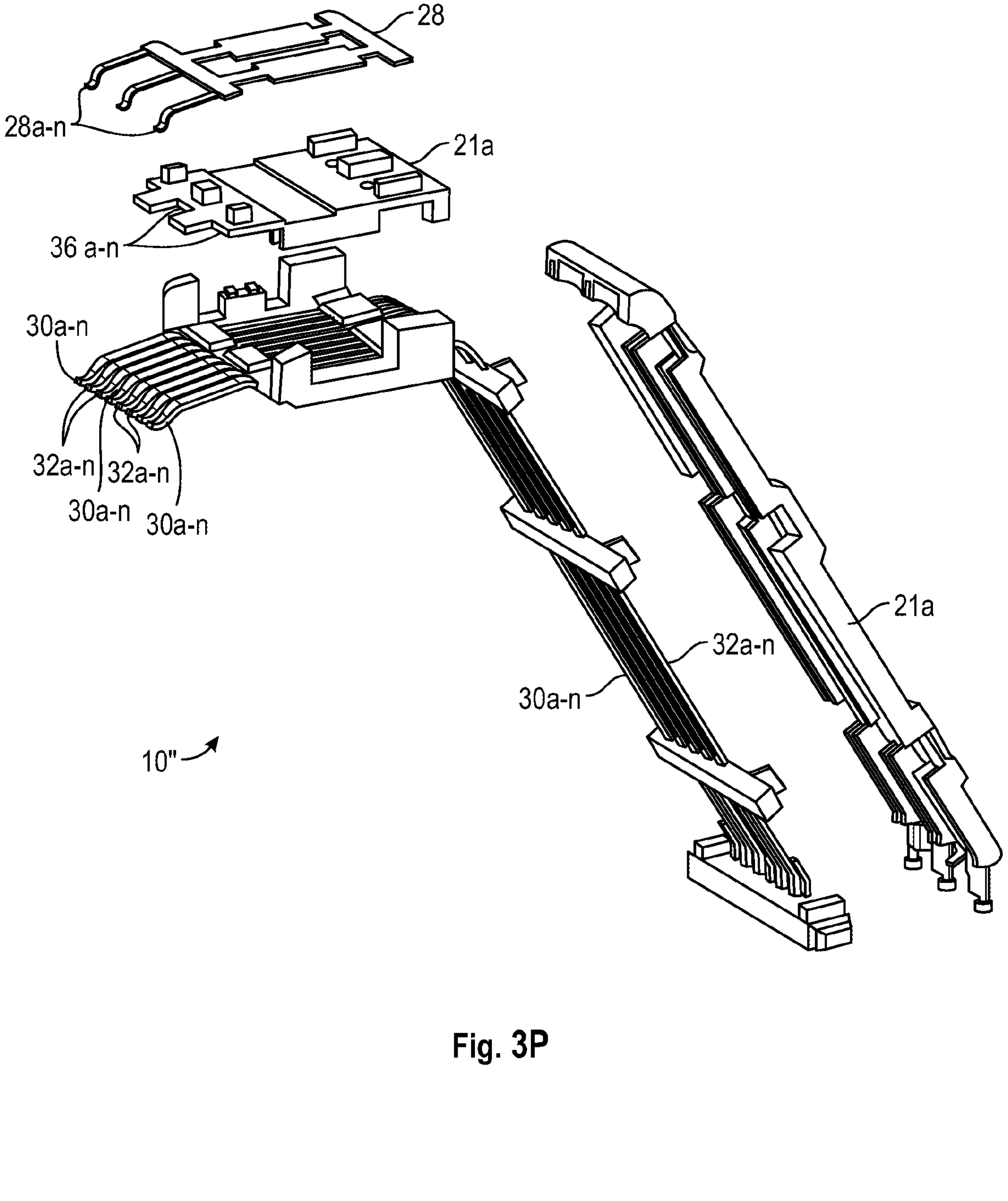
FIG. 3P depicts an exemplary, inventive ground path configurations according to an embodiment of the invention.
Figure 3Q:
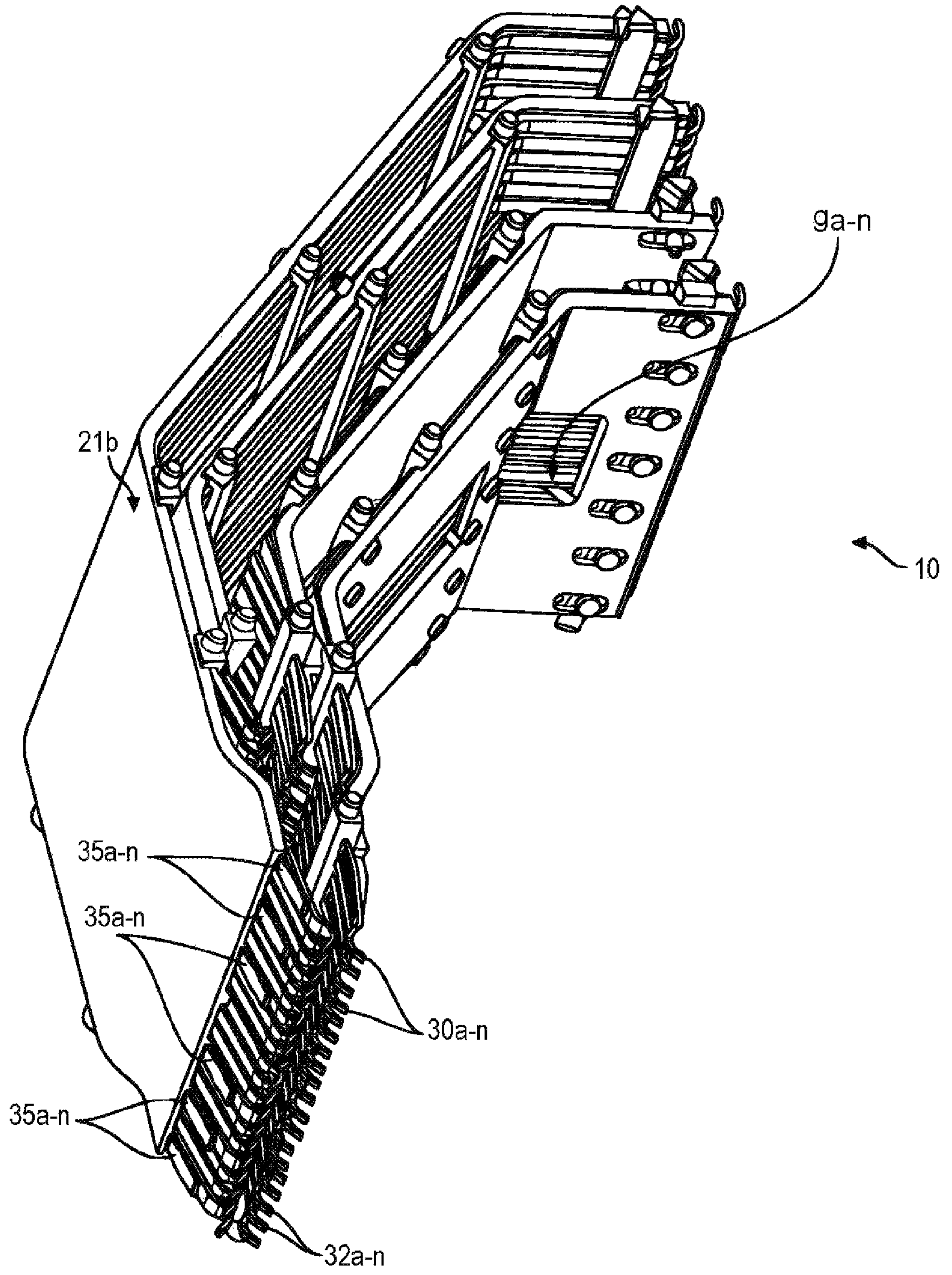
FIG. 3Q depicts an exemplary, inventive ground path configurations according to an embodiment of the invention.
Figure 3R:
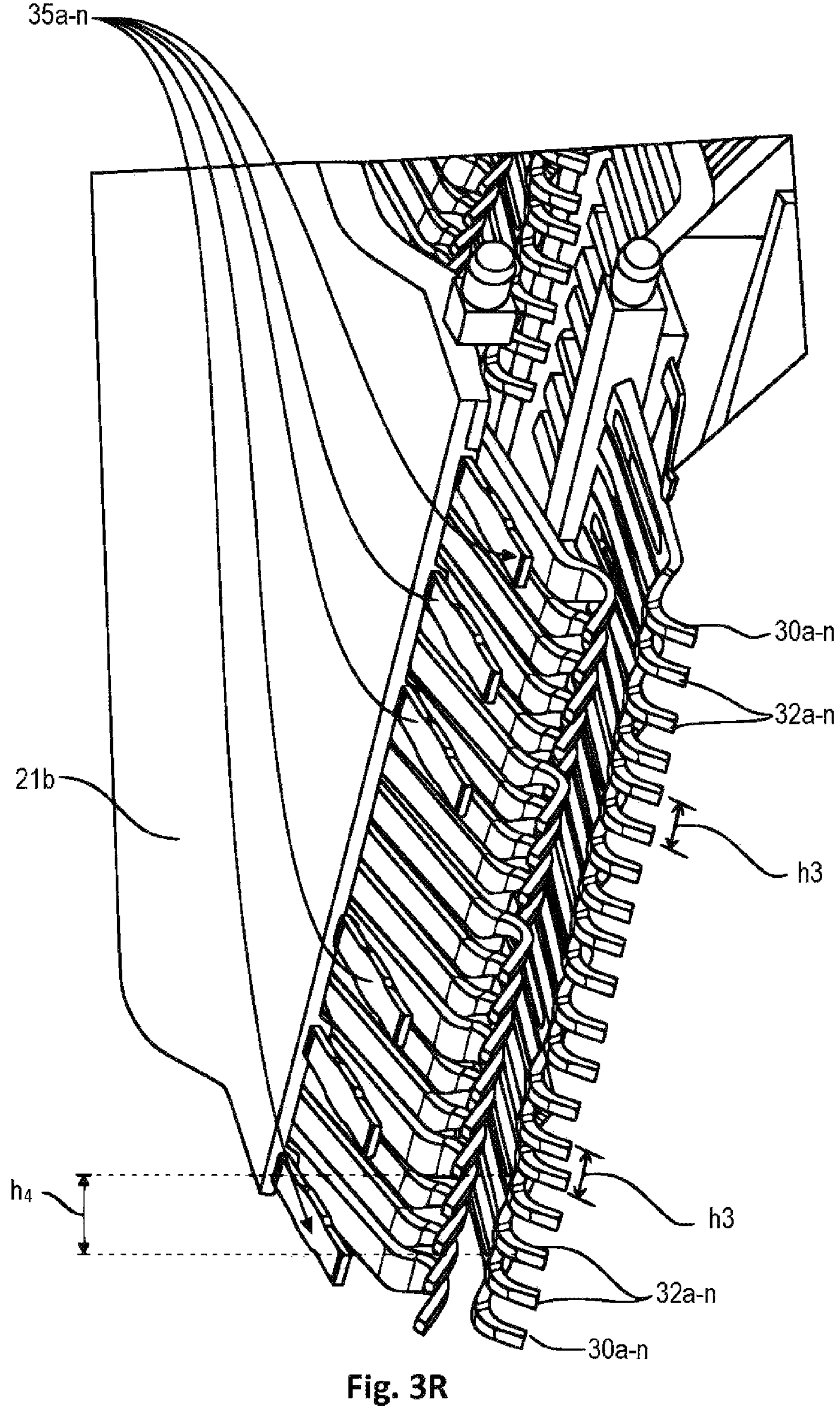
FIG. 3R depicts an exemplary, inventive ground path configurations according to an embodiment of the invention.
Figure 3S:
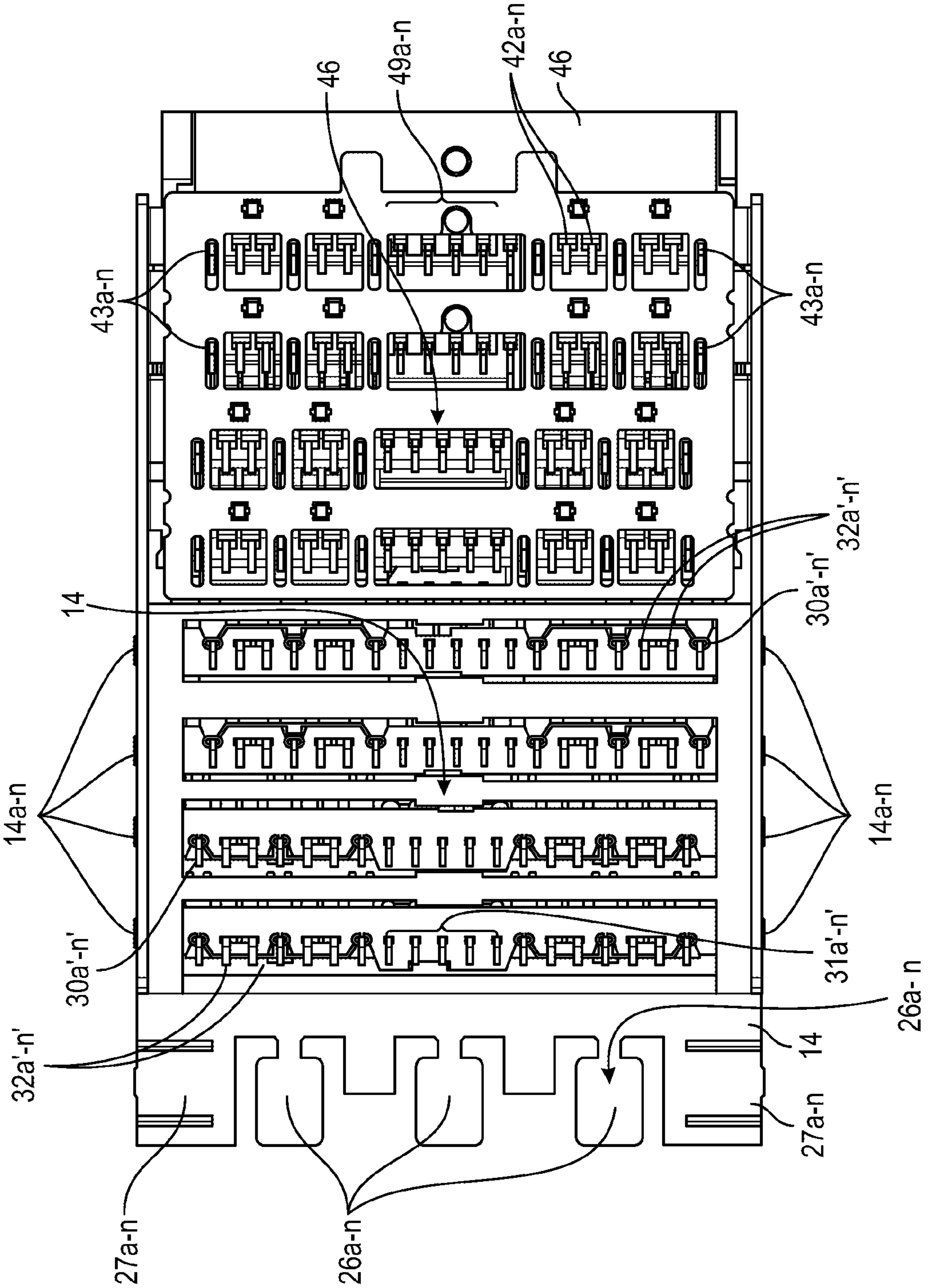
FIG. 3S depicts an exemplary, inventive tail alignment and support structure according to an embodiment of the invention.
Figure 3T:
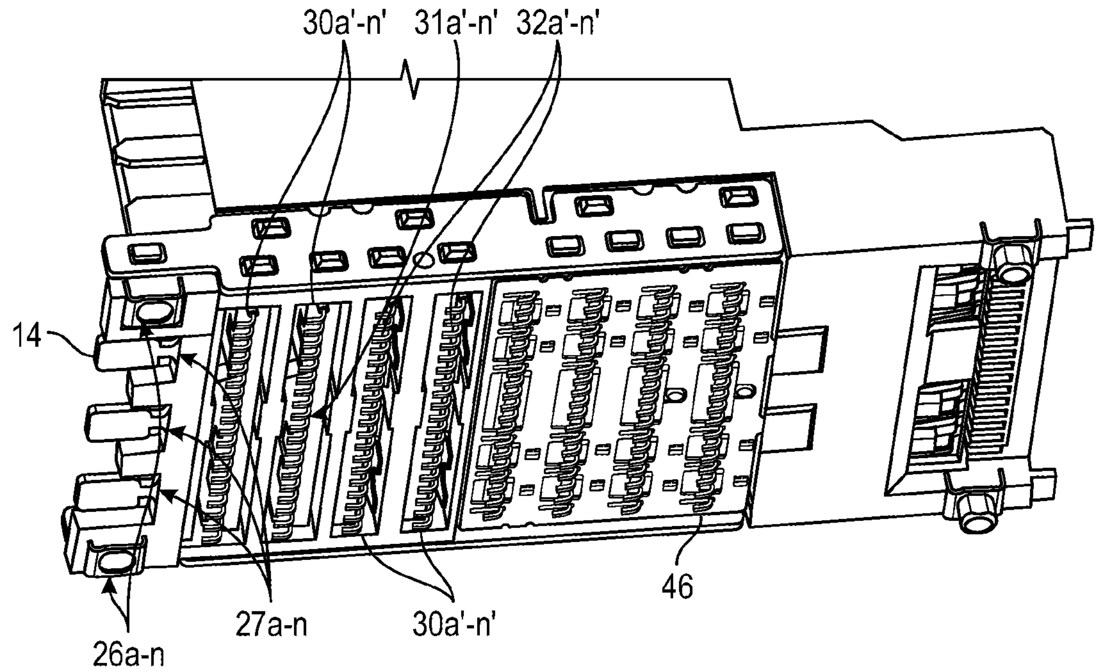
FIG. 3T depicts an exemplary, inventive tail alignment and support structure according to an embodiment of the invention.
Figure 3U:
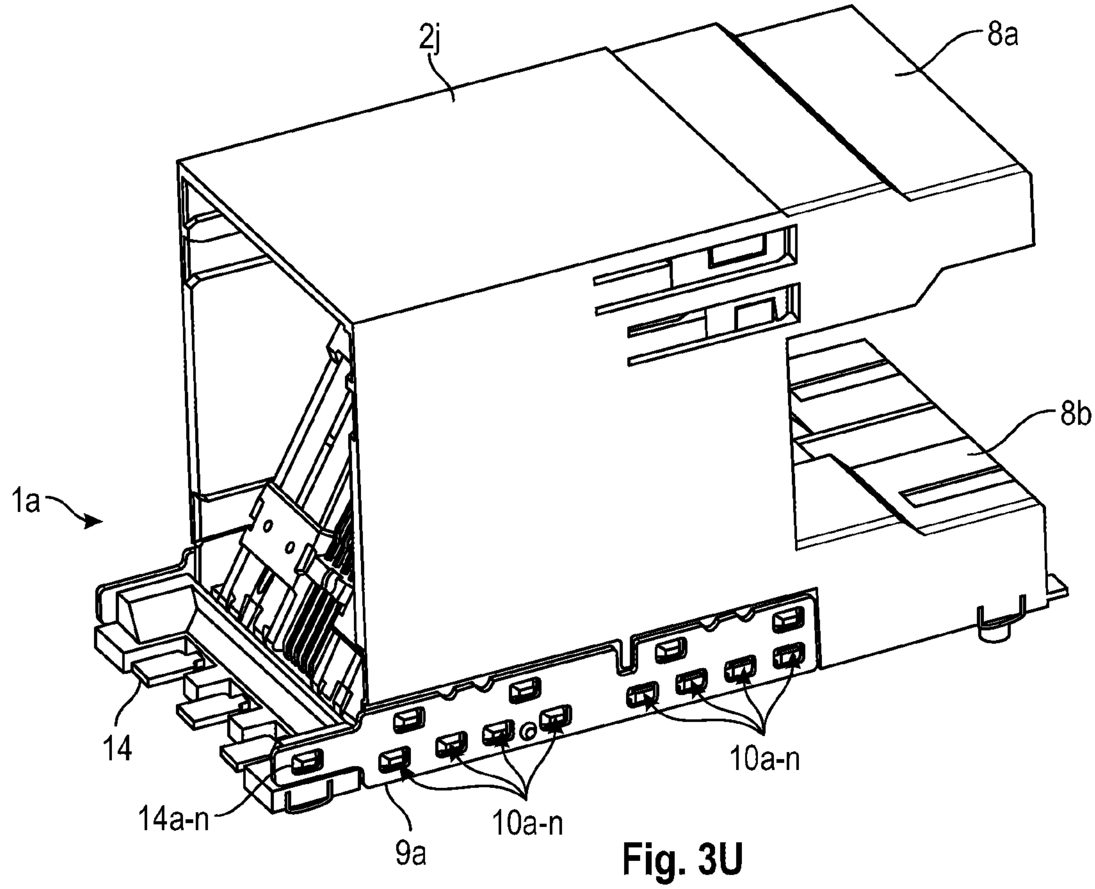
FIG. 3U depicts a perspective view of an exemplary, inventive connector according to an embodiment of the invention.

Referring now to FIGS. 3A and 3U there is shown a view of the connector 1*a*. In an embodiment, the connector comprises a central, internal housing 2*j* that is substantially within the shielded cage 2 and may be composed of a plastic, such as a high-temperature Liquid Crystal Polymer (LCP), The housing 2*j* may be configured to enclose a portion of both the top and bottom ports 8*a*, 8*b* and respective one or more wafers (not shown) within the connector 1*a*.

Also shown in FIGS. 3A and 3U is a first supporting side plate 9*a* on one side of the internal housing 2*j* that may be configured with features to connect to, and fix, the positions of wafers within the internal housing 2*j* with respect to one another. For example, side plate 9*a* (as well as a second side plate 9*b* that is hidden from view in FIG. 3A on a second, opposite side of the housing 2*j*) may be configured to receive and hold "tail" portions of terminals of each wafer in order to align tail edges of each tail portion (see the description for FIG. 3C; e.g., one to eight wafers) within the same geometrical plane (i.e., the geometric plane where the tail edges terminate are in the same plane as the PCB 3), by, for example, receiving one or more posts or protrusions 14*a* to 14*n* (collectively "protrusions") of a top port tail alignment and support structure 14 as well as wafer protrusions or posts 10*a* to 10*n* (collectively "protrusions"). In embodiments, side plates 9*a*, 9*b* may be composed of a metal (e.g., a stainless steel). Because side plates 9*a*, 9*b* are connected to the housing 2*j*, it can be said that the housing 2*j* is configured to control the center-to-center positioning between each wafer.

As depicted, in an embodiment the connector 1*a* may be configured as a shielded high-speed, multi-level, multi-port connector with temperature and alignment control features. In one embodiment, the connector 1*a* may comprise an input/output (I/O) connector, such as those that may be used for small form-factor pluggable applications or double density small form-factor pluggable applications (e.g., QSFP, SFP, QSFP-DD, SFP-DD, OSFP, CDFP applications). As configured, the assembly 1 that includes the connector 1*a* may be referred to as a shielded high speed, multi-port, multi-level connector assembly 1 with temperature and alignment controls, among other features.

In more detail, referring now to FIG. 3C the connector 1*a* may comprise a plurality of wafers 15*a* to 15*n* (e.g., 4 to 8 wafers, though only 4 are shown) within the internal housing 2*j* that are aligned at their tips or tops with the card slot of a port, such as port 8*a*, 8*b*. In an embodiment, each wafer 15*a* to 15*n* may support a set of terminals, where such terminals comprise terminals overmolded with a plastic or a plated plastic structure described in more detail elsewhere herein. (e.g., differential high-speed, low-speed, power and ground terminals, for example; not shown for clarity). More particularly, unless otherwise indicated, terminals of each wafer may comprise a high-speed portion, where the high-speed portion includes differential high-speed signal terminals and ground terminals extending side-by-side through the wafer, each respective differential high-speed signal terminal configured to have another differential high-speed signal terminal on one side and a ground terminal on the other side of the respective differential high-speed signal terminal (see FIG. 3K for example).

Further, each terminal may have three sections: a tip, top or contact portion (collectively "contact portion") that makes contact with a pluggable card, such as cards 7*a*, 7*b*, an opposite tail portion and a central body portion between the contact and tail portions. As shown in FIG. 3C each tail portion of terminal of a wafer 15*a* to 15*n* may include a number of tail edges 30*a*' to 30*n*' (ground conductor tail edges), 31*a*' to 31*n*' (low-speed or power terminal tail edges) and 32*a*' to 32*n*' (high-speed tail edges) that are aligned in the same geometric plane.

As will be seen throughout the drawings herein, terminals of each wafer may be arranged in one or more rows to make contact with a pluggable card (see FIGS. 3Q and 3R for example).

In embodiments, the contact portions of one or more terminals of a wafer may be arranged to form a top row of terminals in contact with the card slot or a bottom row of terminals in contact with the card slot, for example (again see FIGS. 3Q and 3R for example).

The conductive terminals that are a part of wafers 15*a* to 15*n* may be configured to conduct electrical signals. Additionally, in an alternative embodiment, the terminals may also be configured to feed electrical signals to E/O conversion circuitry or receive electrical signals from O/E conversion circuitry, for example. In the latter case, such O/E or E/O conversion circuitry may be included in a mated plugged-in module or card (e.g., component 7*b*) and then connected to respective conductive wafers of connector 1*a*.

In many instances, the signals being conducted through terminals of a wafer, or through additional O/E and E/O conversion circuitry may generate a substantial amount of heat during operation. Thus, as described herein, the inventors provide inventive solutions to control such temperatures.

Referring to FIG. 3B there is depicted an illustrated view of connector 1*a* and, separately, its components that may comprise connector 1*a* removed from the housing 2*j* for ease of explanation, it being understood that the components shown in FIG. 3B are typically connected to, or within, the housing 2*j*. Such components include a first supporting side plate 9*a*, second supporting side plate 9*b*, tail alignment and support structure 14 and top port wafer assembly 10 (the bottom port wafer assembly is not shown, but indeed is within the connector 1*a*). In an embodiment the composition of the internal housing 2*j*, top side plates 9*a*, 9*b* and alignment and support structure 14 may be composed of a plastic (e.g., an LCP material). In embodiments, structure 14 may be a non-conductive material that may be fully or partially plated.

In embodiments of the invention, the side plates 9*a*, 9*b* may be configured with one or more apertures 11*a* to 11*n*, where one or more of the apertures may be configured to receive the before-mentioned one or more wafer protrusions of each wafer 15*a* to 15*n* of the top port wafer assembly 10 (see elements 10*a* to 10*n* in FIG. 3C configured at the tail portions of terminals of wafers 15*a* to 15*n*). As configured, the protrusions help control the alignment and positioning of a respective wafer 15*a* to 15*n* to ensure tail portions of the terminals of each wafer 15*a* to 15*n* are held and the corresponding tail edges are aligned within the same plane (i.e., the tail edges of each terminal are co-planar to the plane of the PCB 3). Though FIGS. 3B and 3C only depict protrusions (e.g., 10*a* to 10*n*) on one side of each wafer 15*a* to 15*n* (i.e., into side plate 9*a*), it should be understood that both sides of each wafer may be configured with protrusions that extend into (are received by) apertures 11*a* to 11*n* in each side plate 9*a*, 9*b*. In an embodiment, the protrusions may be insert molded protrusions.

Further, the housing 2*j* may comprise one or more latches 12*a* to 12*n* on either side of the housing 2*j* (see FIGS. 3A and 3B). In an embodiment, each set of latches 12*a* to 12*n* (e.g., at least one on each side) may be configured to substantially fix or lock the top of each wafer 15*a* to 15*n* in position to prevent the top port wafer assembly 10 from backing out of the housing 2*j* (i.e., moving away from the front of the port 8*a*). Though only one latch on one side of the housing 2*j* is shown, it should be understood that both sides of the housing 2*j* may include such latches. In an embodiment, each latch 12*a* to 12*n* may be configured as an integral part or separately connected section of the housing 2*j* that may be operable to deflect outwards (for example) as the top port wafer assembly 10 comprising one or more wafers is being inserted into the housing 2*j*. As the wafer assembly 10 makes contact with the latches 12*a* to 12*n*, the latches 12*a* to 12*n* may be deflected inward (for example) as the wafers 15*a* to 15*n* pass the latches 12*a* to 12*n* and reach a determined position within the housing 2*j* that secures the one or more wafers 15*a* to 15*n*. Alternatively, housing posts that fit into additional apertures of the enclosure 2*j* may be substituted for the latches 12*a* to 12*n*.

FIG. 3D depicts an enlarged view of the wafer protrusions 10*a* to 10*n* inserted within apertures 11*a* to 11*n* of side plate 9*a* (the same would be true of side plate 9*b*), for example. Also shown are tail edges 30*a*' to 30*n*' (ground conductor tail edges), 31*a*' to 31*n*' (low-speed or power terminal tail edges) and 32*a*' to 32*n*' (high-speed tail edges) aligned in the same geometric plane.

FIG. 3E depicts an enlarged view of a single, exemplary protrusion 10*n* having side surfaces $S_A$ to $S_D$ inserted with an aperture 11*n* of the side plate 9*a* having side surfaces $s_1$ to $s_4$. In an embodiment, each protrusion 10*a* to 10*n* and aperture 11*a* to 11*n* may be configured (i.e., in this case, shaped) such that the distance between side surfaces $S_A$ to $s_1$, and $S_B$ to $s_2$ of the top left corner $c_1$ is smaller than the distance between side surfaces $S_c$ to $s_3$, and $S_D$ to $s_4$ respectively, of the bottom right corner $c_2$.

In more detail, side surfaces $s_2$ and $S_B$ are line-to-line (i.e., non-overlapping) as are side-surfaces $s_1$ and $S_A$. On the other hand side-surfaces $s_3$ and $S_C$ overlap one another, as do side surfaces $s_4$ and $S_D$. In an embodiment, the overlapping side surfaces create an interference fit/compression fit force that is exerted on protrusion 10*n* and directs the protrusion 10*n* towards the upper left corner $c_1$. Therefore, the surfaces near $c_1$ (e.g., $s_2$ and $S_B$ and $s_1$ and $S_A$) will be forced closer to the corner $c_1$, and surfaces (e.g., $s_3$ and $S_C$ and $s_4$ and $S_D$) will be forced farther away from corner $c_2$. In an exemplary embodiment, surfaces $s_3$ and $S_C$ and $s_4$ and $S_D$ may be 0.03 millimeters farther away from corner $c_2$ than surfaces $s_2$ and $S_B$ and $s_1$ and $S_A$ are from corner $c_1$, for example.

Thus, it can be said that the protrusions 10*a* to 10*n* are "biased" to the top left corner $c_1$, for example. It should be understood, however, that biasing towards the top left corner is merely exemplary. In alternative embodiments, the protrusion 10*n* may be biased towards any one of the four corners provided the overlapping side surfaces are correctly configured, and the same or similar distance differences are achieved.

Such exemplary, biased protrusions are among one of the inventive alignment control features discovered by the present inventors because the such biased protrusions control the planarity and position of the tail portions of the wafers 15*a* to 15*n* as the wafers are connected to the main PCB 3 using surface mount technology (SMT), for example. More particularly, such biased protrusions help control the tail portions of terminals of each wafer 15*a* to 15*n* to allow the tail edges of each tail portion of a terminal to be aligned in the same plane (i.e., within the same geometric plane as the PCB 3). Absent such biasing, a tail height of one or more of the terminals of wafers 15*a* to 15*n* may vary and, thus, the tail edges may not be co-planar (i.e., would be mis-aligned).

Yet further, FIGS. 3B and 3D depict additional alignment control features. In FIG. 3B, an inventive, non-conductive tail alignment and support structure 14 that may comprise one or more tail alignment protrusions 14*a* to 14*n* is shown. In FIG. 3D, in an embodiment, one or more of the apertures 11*a* to 11*n* in each of the side plates 9*a*, 9*b* may be configured to receive one or more of the protrusions 14*a* to 14*n* to further fix the tail portions of each wafer 15*a* to 15*n* to a common datum (i.e., fixed, reference structure) and to allow the side plates 9*a*, 9*b* to be connected. Though only four wafers are shown connected to the side plate 9*a*, 9*b* in FIG. 3D it should be understood that more than four wafers may be connected to a side plate. For example, eight wafers may be connected to a side plate (see FIG. 3X).

In sum, each exemplary side plate 9*a*, 9*b* may be configured to receive protrusions 14*a* to 14*n* of a tail alignment and support structure 14 and wafer protrusions 10*a* to 10*n* to hold each of the plurality of wafers 15*a* to 15*n* in order to align tail edges 30*a*' to 30*n*', 31*a*' to 31*n*' and/or 32*a*' to 32*n*' of each tail portion within the same geometrical plane as a PCB, like PCB 3.

Figure 3V:
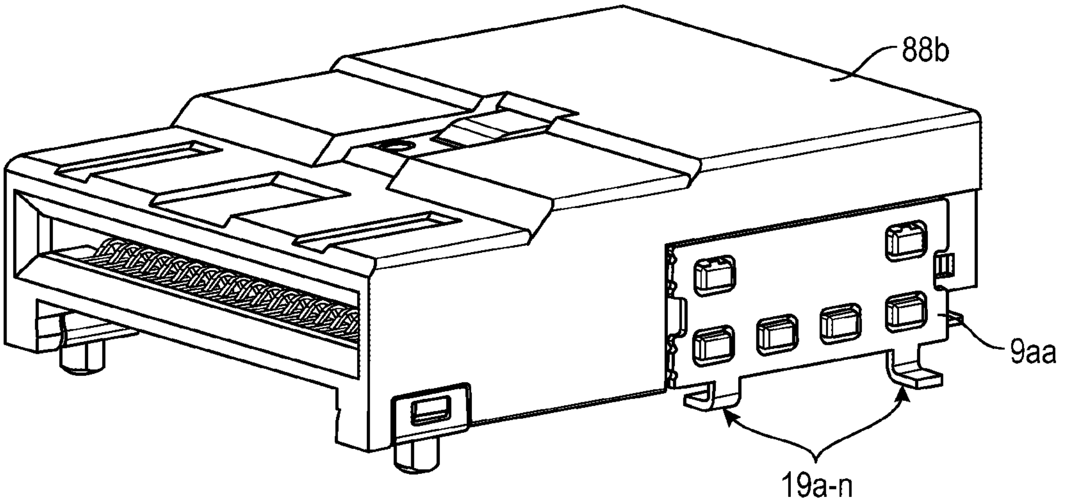
FIG. 3V depicts a perspective view of an embodiment of an inventive alignment control feature according to an embodiment of the invention.
Figure 3W:
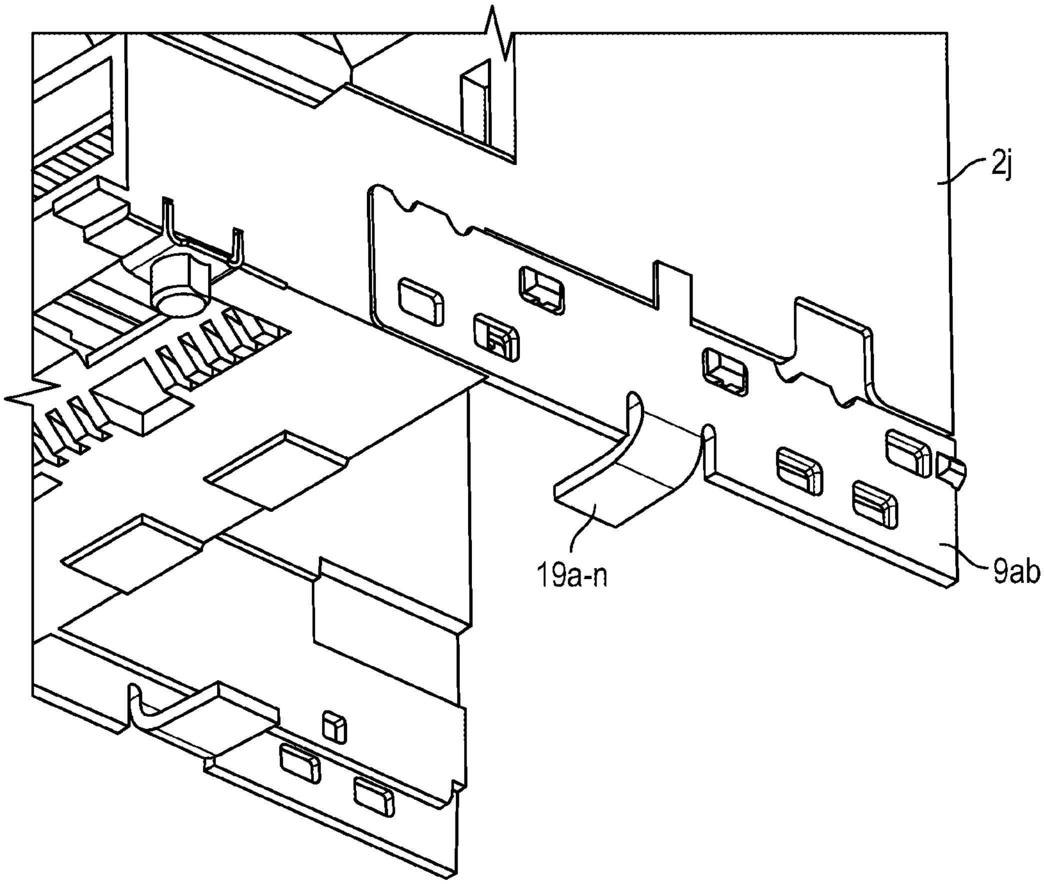
FIG. 3W depicts a perspective view of an embodiment of an inventive alignment control feature according to an embodiment of the invention.
Figure 3X:
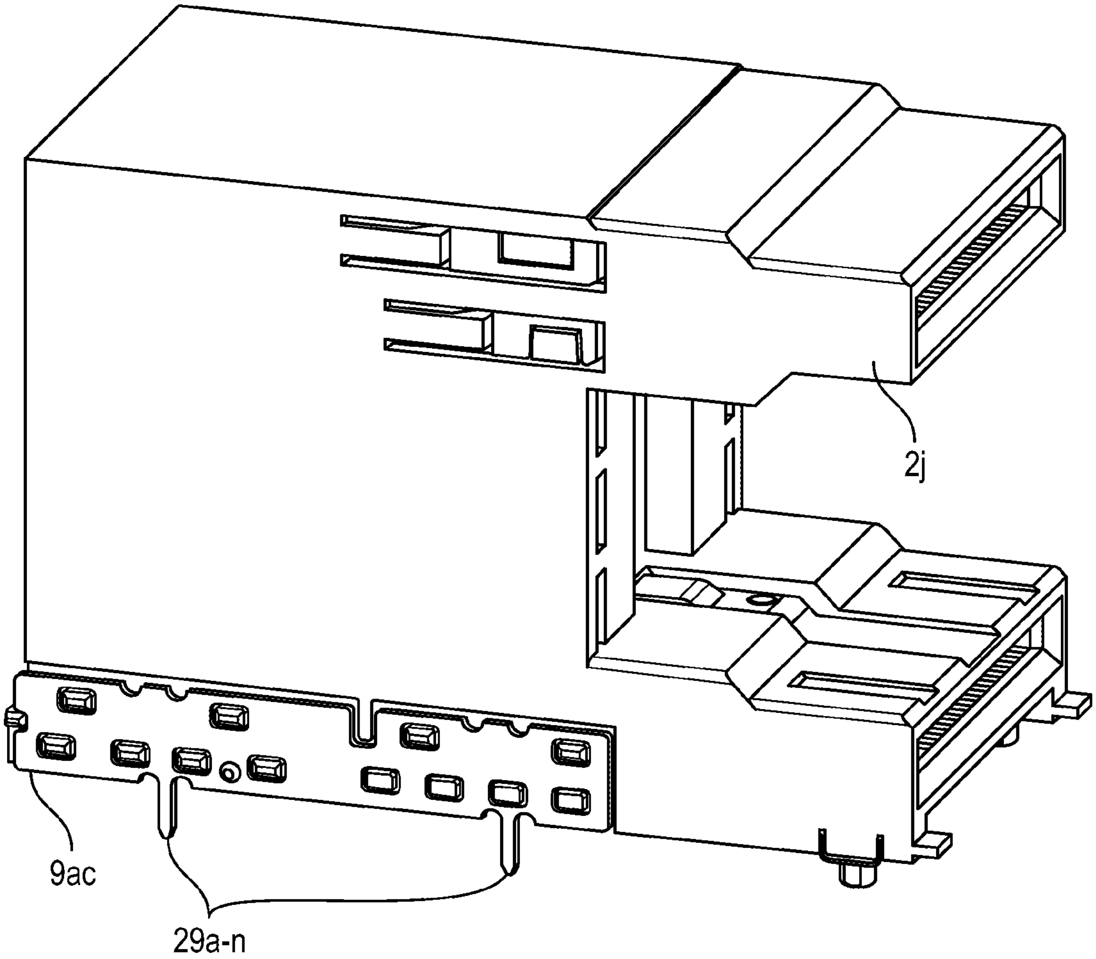
FIG. 3X depicts an exemplary, inventive tail alignment and support structure according to an embodiment of the invention.
Figure 3Y:
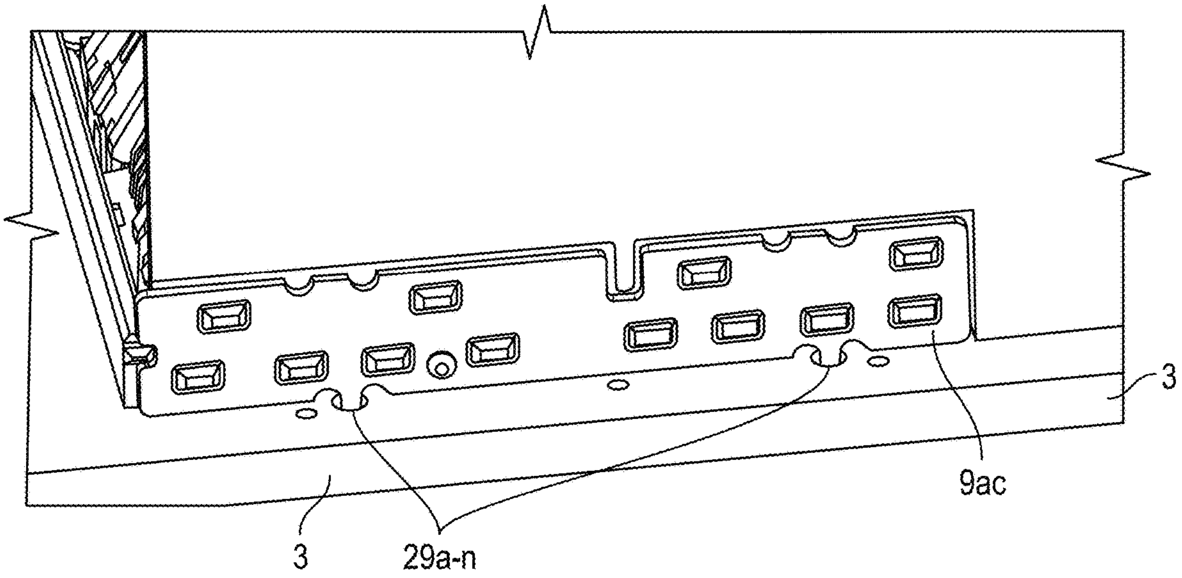
FIG. 3Y illustrates another view of the inventive tail alignment and support structure depicted in FIG. 3X.
Figure 3Z:
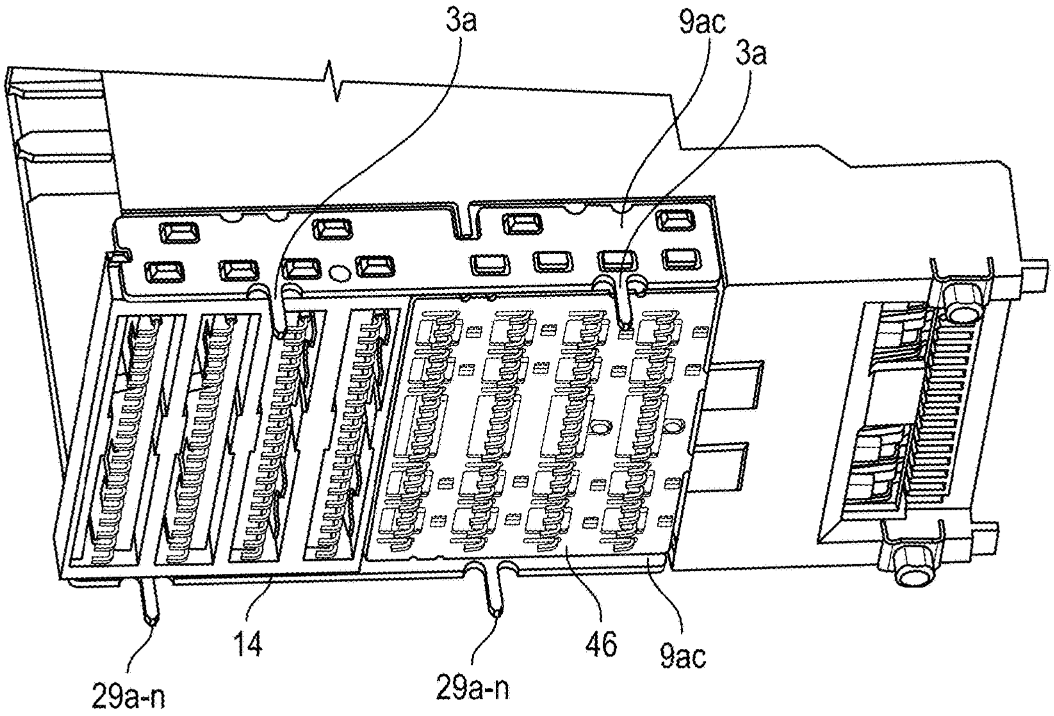
FIG. 3Z illustrates another view of the inventive tail alignment and support structure depicted in FIG. 3X.

FIGS. 3V, 3W and 3X depict alternative side plates 9*aa*, 9*ab* and 9*ac*, respectively. Though only one side and side plate may be shown, it should be understood that each side of a housing may comprise a similar side plate 9*aa*, 9*ab* and 9*ac*.

As shown in FIGS. 3V and 3W, side plates 9*aa*, 9*ab* may comprise one or more inwardly or outwardly bent or configured hook-like tabs 19*a* to 19*n*. In an embodiment, the tabs 19*a* to 19*n* may be connected to a PCB, such as PCB 3, by soldering. In these embodiments, side plate 9*ab* in FIG. 3W is shown connected to housing 2*j* while side plate 9*aa* in FIG. 3V is shown connected to a bottom port 88*b* (see FIGS. 5A through 5E for bottom port 88*b*) though these are merely exemplary configurations.

In the series of figures making up FIG. 3X, side plate 9*ac* is shown connected to housing 2*j* using protrusions and apertures as described elsewhere herein. In this embodiment, side plate 9*ac* may be configured with integral one or more solder nails 29*a* to 29*n*. As shown, each solder nail 29*a* to 29*n* may be received in an opening in a PCB 3 in order to secure the side plate 9*ac* and housing 2*j* to the PCB 3, for example. In addition the solder nails 29*a* to 29*n* may be configured to make frictional contact with the tail alignment and support structures 14, 46 at locations 3*a*, for example, in order to further hold the structures 14, 46 in a fixed position.

Similar to before, each side plate 9*aa*, 9*ab* and 9*ac* may be configured to receive protrusions of a tail alignment and support structure and wafer protrusions to hold or fix each of the plurality of wafers and to help align tail edges of each tail portion of terminals of each wafer within the same geometrical plane as the PCB 3.

For ease of understanding the inventors will now set forth a discussion of the inventive features of a top port wafer assembly (e.g., assembly 10) that may be incorporated into an inventive connector assembly, such as assembly 1. Further on herein, the inventors will set forth a discussion of a bottom port wafer assembly. That said, it should be understood that one or more features of an inventive top port wafer assembly may be utilized in an inventive bottom port wafer assembly, and vice-versa.

In an embodiment, the top port wafer assembly 10 may comprise one or more separate power, high-speed and low speed communication signal conductors and ground conductors (sometimes referred to as "terminals") that form a part of separate ground, power and communication signal paths. In embodiments, each high-speed conductor/terminal may be configured to transport signals up to at least 100 Gigabits per second (Gbps) and, in alternative embodiments, exceeding 100 Gbps may be transported by the high-speed signal terminals of the assembly 10 (as well as the bottom port assembly). In alternative embodiments, communication signals up to 160 Gbps may be transported by the high-speed terminals of an assembly.

In one embodiment, top port wafer assembly 10 may comprise differential high-speed terminals, centrally positioned low-speed/power terminals and ground terminals, respectively. Said another way, differential high-speed terminals may be positioned on the left and right side of each wafer of the top port connector assembly 10 while the low-speed or power terminals may be positioned centrally between the high-speed terminals, for example (i.e., "on-center"). In an embodiment, this "on-center" section of each wafer in assembly 10 that corresponds with the positioning of low-speed terminals and power terminals may electrically isolate differential high-speed terminals on opposite sides of the low-speed terminals and power terminals from deleterious electrical interference. In more detail, this section may function to isolate or "block" one set of high-speed terminals configured to conduct communication (data) signals on one side of the low-speed terminals and power terminals from deleterious electrical interference caused by communication (data) signals being conducted by a second set of high-speed terminals on the opposite side of the same low-speed terminals and power terminals. This "blocking" or isolation section may reduce deleterious electrical crosstalk between the opposed differential high-speed terminals as well as improve the signal-to-noise performance for the respective high-speed data signals being transported by the high-speed terminals.

Referring now to FIG. 3F there is depicted one or more separate, conductive ground shield elements 16*a* to 16*n*. In an embodiment one or more elements, in this case element 16*a* (a "first element") may be configured to cover one or more differential high-speed terminals of a wafer of atop port wafer assembly 10 (terminals not shown—are covered) while another element 16*n* (a "second element") may be configured to cover different differential high-speed terminals of the same wafer. In an embodiment, together the elements 16*a* to 16*n* may comprise a multi-piece, conductive ground shield. It should be understood that each wafer of the wafer assembly 10 may have its own conductive ground shield elements (see elements 16*aa* to 16*an* in FIG. 3H, for example).

Further, as depicted, there is no conductive ground shield covering the low-speed and power terminals 31*a* to 31*n* within gap "$g_1$". Said another way, in an embodiment, first and second conductive ground shields 16*a*, 16*n* may be configured with a gap $g_1$ there between, the dimensions of the gap $g_1$ corresponding to an area of a total number of low-speed and power terminals 31*a* to 31*n* plus one terminal multiplied by a required pitch of the terminals (length times width) (e.g., if the area of 4 terminals is "X" then the dimensions of gap $g_1$ would be equal to the (area of X plus the area of ¼X) times the terminal pitch. For the reader's benefit, if an exemplary terminal pitch is 0.8 millimeters and there are five exemplary low-speed and power terminals then the gap $g_1$ may be 4.0 millimeters, for example.

Because the exemplary conductive, multi-piece ground shield does not cover all of the terminals of the wafer, heat generated and dissipated by at least the uncovered low-speed and power terminals 31*a* to 31*n* during operation of at least the low-speed and power terminals 31*a* to 31*n* may be cooled by air that flows through and over the terminals, for example. Said another way, air that flows over the terminals may remove heat that is generated by such terminals, for example. In addition, in embodiments where one of the conductive ground shields 16*a* is configured to cover high-speed transmission/transmitter terminals and the other 16*n* is configured to cover high-speed reception/receiver terminals the separation of the ground shields may function to electrically isolate the transmission terminals from the reception terminals, for example, in order to reduce the effect of deleterious, electrical interference and/or noise. The separate conductive ground shield(s) 16*a* to 16*n* is just one of the inventive temperature and electrical controls discovered by the present inventors. The use of multiple, separated (e.g., two) elements 16*a*, 16*n* may be referred to herein as a "split, conductive ground shield" or simply as a "split-shield".

Though the shield in FIG. 3F is separated into two elements 16*a*, 16*n* with one gap $g_1$ there between it should be understood that an alternative, exemplary shield may comprise additional shields (e.g., two or more separate shields with a gap between each may be configured to cover the high-speed transmission terminals and two or more separate shields with a gap in between each may be configured to cover the high-speed reception terminals).

Yet further, the two shields 16*a*, 16*n* may be combined into a single shield having an opening, vent or aperture in its central portion to allow for air flow and temperature control. Said another way, one (or more) conductive ground shield elements may be configured to cover some or all of the differential high-speed terminals of a wafer.

FIGS. 3F and 3G also depict another feature of the inventive assembly. In more detail, one or more of the low-speed/power terminals 31*a* to 31*n* in a row of a wafer of the top port assembly 10 (i.e., the same row) may be configured with offsets 18*a* to 18*n* from low-speed/power terminals in another row of another wafer (i.e., shifted from a vertical axis "Y").

FIG. 3G depicts a close-up view of the offsets 18*a* to 18*n*. As can be seen within gap $g_1$ there may be multiple rows of terminals (e.g., the terminals 31*a* to 31*n* in FIG. 3F) nested one underneath the other (except for the top row) within gap $g_1$. For ease of understanding, the rows of terminals have been labelled 1*z* to 4*z* in FIG. 3G representing four wafers within an exemplary top port for example.

As shown the low speed/power terminals in rows 3*z* and 4*z* may be offset to the left by ½ pitch, while the terminals in rows 1*z* and 2*z* may be offset to the right by ½ pitch. In embodiments, the offsets allow the terminals in each row 1*z* to 4*z* to line up and allow air to pass through. In an embodiment, the distance a terminal (e.g., 31*a* to 31*n*) may be offset from the vertical axis Y" may be ½ pitch, for example.

In addition, by configuring one set of terminals in a row offset from a vertical axis "Y" the terminals (e.g., low-speed and power terminals) may be more easily aligned.

Referring now to FIG. 3H there is depicted another view of exemplary wafers 15*a* to 15*n* (i.e., here the labeled lines in FIG. 3H point to tail edges and contact points of wafers 15*a* to 15*n*). In an embodiment of the invention, it should be understood that each of the one or more wafers 15*a* to 15*n* may support one or more differential high-speed terminals, one or more low-speed terminals, one or more power terminals and one or more ground terminals. Further, a conductive ground shield (e.g., a split shield or a unitary shield) described elsewhere herein may be configured between some of the one or more wafers in order to, among other things, reduce deleterious cross-talk between the respective conductors making up each wafer. However, in a particular embodiment, no shield may be configured between certain wafers. For example, FIG. 3H depicts wafers 15*a* to 15*n* where a conductive ground shield 16*aa* to 16*an* may be configured between wafers 15*a* and 15*b*, between 15*c* and 15*n*, and over wafers 15*a* and 15*d*, but no shield may be configured between wafers 15*b* and 15*c*, for example, because of the field affinity created between shield 16*ac* and terminals of wafer 15*c*, for example In more detail, each of the one or more wafers 15*a* to 15*n* supporting one or more differential high-speed terminals may have a conductive ground shield positioned at a first distance proximal to its respective differential high-speed terminals in order to generate a field affinity between the respective ground shield and the differential high-speed terminals. In an embodiment, the differential high-speed terminals of each wafer 15*a* to 15*n* may be configured to conduct a communication data signal at a particular power level. Accordingly, a corresponding, respective ground shield 16*aa* to 16*an* may function as a conductive ground reference structure that is positioned in close proximity to respective terminals of a given wafer 15*a* to 15*n* to generate a field affinity. That is to say, the close proximal positioning of a respective ground shield 16*aa* to 16*an* to its respective wafer 15*a* to 15*n* and included terminals functions to electrically couple the signals (e.g., high-speed data signals) being conducted within the terminals to a respective shield 16*aa* to 16*an* (referred to as signal or field "affinity").

To create such a field affinity in an inventive connector assembly, in an embodiment, an exemplary respective shield, for example shield 16*ac* in FIG. 3H, may be positioned at a first distance, $h_1$, from respective signal terminals of a wafer, for example wafer 15*c*, that is smaller than a second distance, $h_2$, from the same terminals of wafer 15*c* to the terminals of another wafer, for example, wafer 15*b*. Said another way, the shield 16*ac* may be positioned at a smaller distance that is closer to the terminals of wafer 15*c* as compared to the positioning of the terminals of wafer 15*b*.

In embodiments, this field affinity may be generated between each wafer 15*a* to 15*n* and its respective, positioned shield 16*aa* to 16*an*. Because of this field affinity no shielding is required between wafers 15*b* and 15*c*.

Exemplary, non-limiting distances $h_1$ and $h_2$ may be 0.30 millimeters and 2.40 millimeters, respectively.

Yet further, in an embodiment, the first distance $h_1$ should be smaller than a third distance between any two differential signal terminals of a given wafer (e.g., in FIG. 3R, the third distance $h_3$ represents the distance between adjacent high-speed, differential signal 1 terminals of the same wafer, so $h_1$ should be smaller than $h_3$). Still further, in embodiments that include a ground terminal between sets of differential signal terminals (e.g., one of the terminals 30*a* to 30*n* between sets of differential terminals 32*a* to 32*n* in FIG. 3R), the distance $h_1$ should be much smaller than the distance formed between one of the differential signal terminals 32*a* to 32*n* of one set of terminals and the nearest adjacent, differential signal terminal 32*a* to 32*n* of an adjacent, second set of differential signal terminals as indicated by $h_4$ in FIG. 3R.

Referring to FIG. 3I there is depicted an alternative embodiment that includes further temperature control features. This figure shows the rear of housing 2*j*. As depicted the housing 2*j* may comprise one or more gaps or openings $g_{2a\ to\ 2n}$. In an embodiment, the dimensions (i.e., area) of the central gap of gaps $g_{2a\ to\ 2n}$ may be at least equal to the dimensions of gap $g_1$ described elsewhere herein. In an embodiment, by including openings $g_{2a\ to\ 2n}$ in the rear of the housing 2*j* air may flow through and remove heat that is generated by at least the low-speed and power terminals 31*a* to 31*n* of each wafer within the housing 2*j*, for example. In FIGS. 3B, 3F and 3I the conductive, split ground shield was separated into multiple elements along a vertical axis "Y". Also shown in FIG. 3I are pegs 17*a* to 17*n* for securing the housing to a PCB, for example.

Referring now to FIG. 3J, in an alternative embodiment an exemplary conductive, split ground shield may comprise two or more separate elements 20*a* to 20*n*, for example that are separated along an axis other than a vertical or Y axis, e.g., "X" or "Z" axis, in order to cover sections of terminals of a wafer 15*nn*, for example.

It should be understood that while the description above has described split-shields, this is merely exemplary. Alternatively, an inventive conductive ground shield for a wafer (e.g., top port wafer or bottom port wafer) may comprise a single element (i.e., single piece). Accordingly, in an alternative embodiment a conductive ground shield element may be configured to cover one or more differential high-speed terminals, one or more low-speed terminals, one or more power terminals and one or more ground terminals of a respective wafer (e.g., one shield per respective wafer).

For example, referring now to FIG. 3K there is depicted a single element, conductive ground shield 21 that is configured to cover to cover all of the terminals of one or more of the one or more wafers (e.g., low-speed and power terminals 31*a* to 31*n* as well as high speed terminals 32*a* to 32*n* and ground conductors or terminals 30*a* to 30*n*). As shown, each differential high-speed terminal 32*a* to 32*n* may be configured such that another differential high-speed signal terminal 32*a* to 32*n* is positioned on one side and a ground terminal 30*a* to 30*n* is positioned on the other side.

In addition to temperature and alignment control features, the inventors also provide inventive methods and structures that combine metal ground conductors/terminals and plastic conductive ground shields.

Referring now to FIGS. 3L to 3N, stitched insert molded ground conductors or terminals are illustrated. In one embodiment, by "stitching" is meant that one or more insert molded. metal ground conductor 22*a* to 22*n* in FIGS. 3L and 3M for example, may be mated with a respective ground conductive section that is a part of a plastic, ground shield element 16*a*", 16*n*" (referred to as "stitchably mated") by (typically) applying an interference fit force that forces the respective elements together.

In these embodiments the ground conductive sections 23*a* to 23*n* may comprise a conductive plastic operable to function as a ground path segment that may connect one conductive metal section 22*a* to another metal section 22*n* for example.

Though FIG. 3L depicts the metal, conductive ground sections 22*a* to 22*n* illustrated separately from a respective ground conductor sections 23*a* to 23*n* of a respective plastic, conductive ground shield it should be understood that all of the components in FIG. 3L may comprise a single, stitchably mated structure when combined as shown in FIG. 3M, for example. In embodiments, the exemplary metal section 22*a* to 22*n* may be composed of a copper, a copper alloy or another conductive metal (e.g., a gold, a platinum).

It should be noted that stitching conductors/terminals of a wafer is one method of connecting conductors. Alternatively, conductors/terminals may include a support structure to connect the terminals of a wafer to a top port module nose-piece, for example.

Ground conductive sections 23*a* to 23*n* of aground shield element 16*a*", 16*n*" may be composed of a metal or a conductive or plated plastic or a hybrid laminate with dielectric and conductive elements such as PCB sections.

For example, in FIG. 3M the ground conductive sections 23*a* to 23*n* are made of a plated-plastic. Alternatively, in FIG. 3N the ground conductive sections 24*a* to 24*n* may be metal. Accordingly, electrical ground paths $P_1$ to $P_N$ may be formed as a continuous metal conductor (e.g. as in FIG. 3N) or some combination of metal and plastic conductive sections (as in FIG. 3M).

It should be noted that sections 22*a* to 22*n* may be a continuous conductive structure rather than be separated into sections, for example.

In addition to providing inventive temperature and alignment control features the inventive connection assembles provided by the inventors may also include features that reduce an impedance of a respective ground path as well as reduce deleterious electrical crosstalk. For example, in embodiments of the invention the inventors provide for inventive connector assemblies that include electrical ground structures that function to maintain substantially the same voltage gradient (i.e., voltage difference) along substantially the length of the ground structure. While a zero-voltage gradient along an entire ground structure may not be practically achievable, in embodiments of the invention the ground structures discovered and provided by the present inventors minimize such a gradient along substantially the entire structure at operating temperatures. The ability to minimize such voltage gradients along substantially the entire ground structure provides the inventive connector assemblies with high quality ground reference structures that in-turn may reduce conducted crosstalk and even reduce coupled crosstalk between terminals providing a reduction of shared voltages as well as providing an effective ground drain for any induced or coupled voltages due to electrical noise.

For example, the inventors provide connectors that include structures that are configured to form dual ground paths. Referring now to FIG. 3P there is depicted a dual ground path configuration according to an embodiment of the invention. For ease of explanation FIG. 3P does not include any low-speed or power terminals.

As shown, a view of a top port ground path assembly 10" may comprise dual ground paths, where one ground path may be formed by the individual ground conductors 30*a* to 30*n* and the other ground path may be formed by conductive, deflectable, spring "fingers" or tabs 28*a* to 28*n* (collectively "fingers") of an insert-molded, conductive ground plate 28 and conductive, plated plastic shield 21*a*. In more detail, each of the fingers 28*a* to 28*n* may be inserted into channels 36*a* to 36*n* formed in the shield 21*a*.

In an embodiment, each of the ground conductors 30*a* to 30*n* may function as a first ground path that comprises a structure that is connected to a terminal of an input/output module (e.g., card 7*b*) on one end, is positioned parallel and inline to respective differential signal conductors, and is connected on an opposite end to the surface of a PCB (e.g., PCB 3).

When assembled, each of the fingers 28*a* to 28*n* may be electrically and galvanically connected to (i.e., in contact with) a respective contact portion of a ground conductor 30*a* to 30*n* (i.e., a tip of conductor 30*a* to 30*n*), thereby functioning to provide a portion of a second ground path. The second ground path may pass from such a contact point, through a respective finger 28*a* to 28*n* and conductive plate 28 and then through the conductive, plated plastic 21*a*.

Though the figures and description herein describes a second ground path formed with respect to differential high-speed terminals 32*a* to 32*n*, it should be understood that similar additional ground paths may be formed with respect to low-speed terminals 31*a* to 31*n* as well. In either case (high-speed and low speed applications) the inventors discovered that the formation of dual or multiple ground paths provides an overall improvement in the integrity of an assembly's ground path structure. This ensures that the electrical impedance of the ground structure and steady-state resistance along the length of the ground path is controlled. The ability to control impedances and resistances further allows the control of the temperature of ground-associated power terminals/conductors where the dual ground path shares an electrical current (i.e., the lower the resistance, the less power may be lost or dissipated) when such power conductors are conducting higher currents, for example.

As noted herein, the shield 21*a* may be a plated plastic. Alternatively, shield 21*a* may be composed of a plated ceramic (i.e., ceramic with a conductive flashing), plated metal or another conductive material with a dielectric coating such as a nickel, tin, gold or copper coating, for example. Though the conductive, deflectable fingers are shown as part of an overall plate, it should be understood that this is merely exemplary. Alternatively, each of the fingers may be insert molded into a respective plastic, ground shield structure, for example.

It should be note that in an embodiment that includes a discrete finger type of structure, terminals that can be supported by a redundant isolated ground path, could take advantage of the overall lower longitudinal resistance along the path to board termination and thus share in the advantage of reduced path resistance and have lower heat generation in a power delivery function.

Other dual ground path structures/configurations may also be included in an inventive assembly. For example, FIGS. 3Q and 3R depict a configuration that includes conductive, deflectable spring fingers or tabs 35*a* to 35*n* (collectively "fingers") that may be insert molded as part of a conductive, plated-plastic shield 21*b* and not as a part of a conductive plate. In this embodiment, a first ground path may be formed by each of the ground conductors 30*a* to 30*n* while a second ground path may be formed by each of the fingers 35*a* to 35*n* contacting a respective contact portion of a ground conductor 30*a* to 30*n* (i.e., tip or top of conductor 30*a* to 30*n*), thereby functioning to provide a second ground path that passes from such a contact point, through a respective finger 35*a* to 35*n* and conductive plastic shield 21*b*. FIG. 3Q also shows optional gaps $g_{a-n}$ in intermediate shields (hidden from view) of the top port wafer assembly 10 for temperature control.

In each of the dual ground paths described herein, each path has an associated voltage difference that can be measured between opposite ends of the path (e.g., a path from the tip of each finger 28*a* to 28*n* to a PCB 3 or from the top of each conductor 30*a* to 30*n* to a PCB 3) due to the impedance of each path. In embodiments, the existence of dual ground paths substantially reduces a shared, composite impedance along the length of each path. For example, if the first path has an impedance of Z1 and the second path has an impedance of Z2, then the shared, composite impedance Z3 would be less than Z1 or Z2 and may be given by the relationship: $Z3=1/[(1/Z1)+(1/Z2)]$.

Referring now to FIGS. 3S and 3T there is depicted views of exemplary tail alignment and support structures 14, 46 according to embodiments of the invention. In an embodiment, structure 14 is configured as a non-conductive, top port tail alignment and support structure that may be connected to tail edges 30*a*' to 30*n*' of the ground terminals 30*a* to 30*n*, tail edges 32*a*' to 32*n*' of differential high-speed terminals 32*a* to 32*n* as well as tail edges 31*a*' to 31*n*' of low-speed and power terminals 31*a* to 31*n* at the bottom of a connector assembly while structure 46 is configured as a conductive, bottom port tail alignment and support structure that may be connected to tail edges of the ground terminals 43*a* to 43*n*, differential high-speed terminals 42*a* to 42*n* as well as low-speed and power terminals 49*a* to 49*n* at the bottom of a connector assembly, for example.

The structure 14 may comprise tail alignment protrusions 14*a* to 14*n*, each of which may be inserted into apertures of, or affixed to, a side plate 9*a*, 9*b* (see FIG. 3A or 3D). In addition, such an exemplary structure 14 may comprise one or more attachment structures 26*a* to 26*n* and 27*a* to 27*n*. In one embodiment, structures 26*a* to 26*n* may compose a non-conductive plastic that may be covered with a glue, for example, to attach the structure 14 to a PCB, such as PCB 3 in FIG. 1A, and may be further combined with one or more structures 27*a* to 27*n* composed of a solderable, plated, non-conductive plastic or a metal that may be soldered to further attach the structure 14 to a PCB. Alternatively, all of the structures 26*a* to 26*n* and 27*a* to 27*n* may compose a non-conductive plastic that may be covered with a glue or all may compose a solderable, plated, non-conductive plastic or a metal, for example.

The inventors now turn their attention to a bottom port wafer assembly. Recall that assembly 1 in FIG. 1B depicts both a top port 8*a* and a bottom port 8*b*. Each port has a corresponding wafer assembly that may comprise a plurality of wafers which in turn may comprise a plurality of terminals.

Figure 4A:
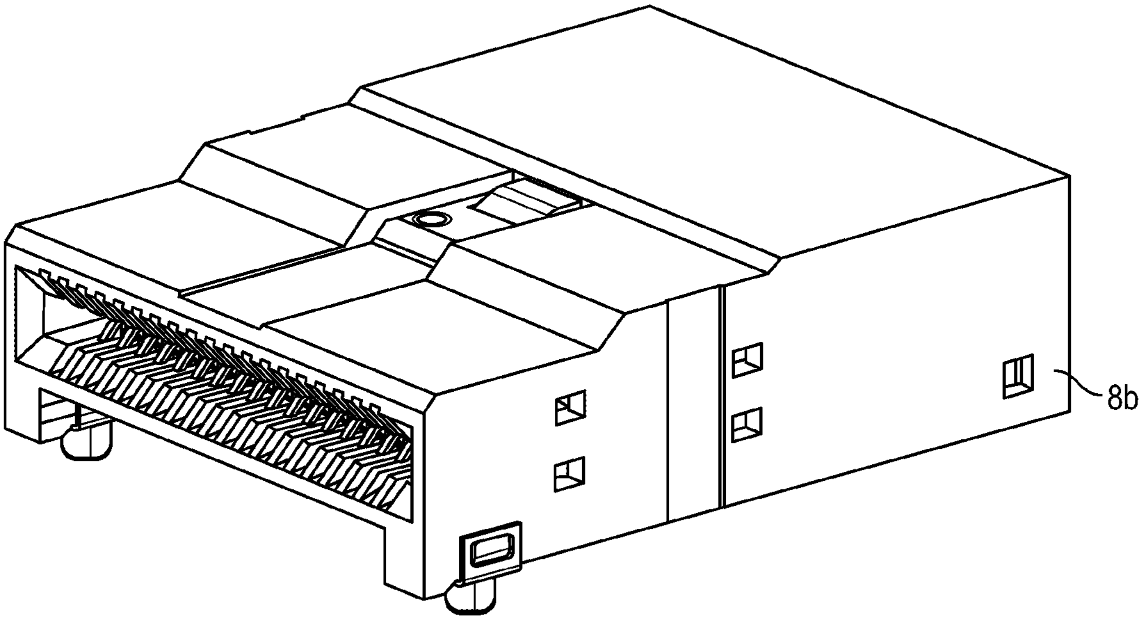
FIG. 4A illustrates exemplary, inventive features of a bottom port wafer assembly according to an embodiment of the invention.
Figure 4B:
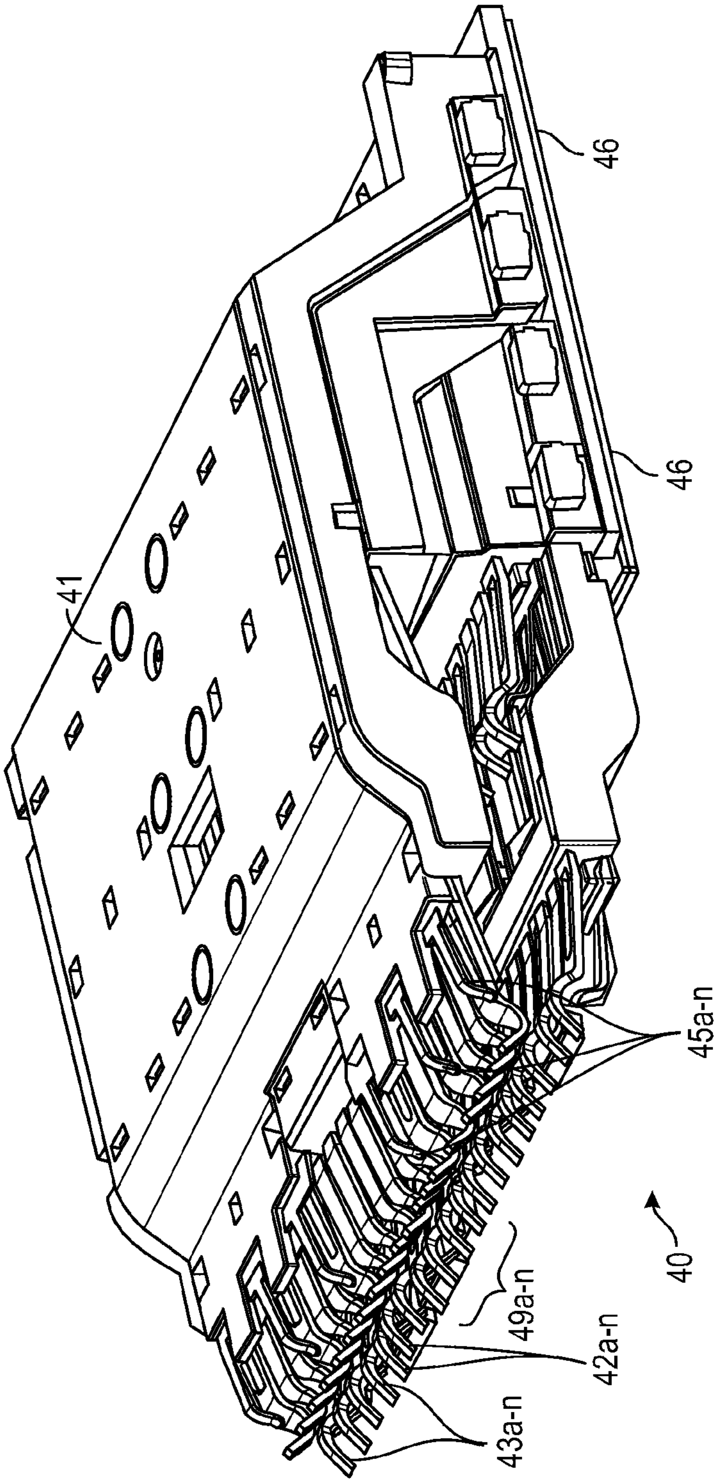
FIG. 4B illustrates the bottom port wafer assembly of FIG. 4A with the housing removed.

FIG. 4A depicts an enlarged view of bottom port 8*b* while FIG. 4B depicts an enlarged view of an exemplary bottom port wafer assembly 40 within port 8*b*. It should be understood that some of the features of a top port wafer assembly may be incorporated into a bottom port wafer assembly. For example, a bottom port wafer assembly may include side plates for holding tail portions of terminals of wafers in order to align tail edges of terminals of the wafers though such plates are not shown in FIGS. 4A and 4B.

In one embodiment the bottom port wafer assembly 40 may be configured to be connected to the PCB 3 using SMT, for example. In alternative embodiments, the bottom port wafer assembly 40 may be connected to the PCB 3 using a ball grid array, solder charge, press-fit, SMT, an optical fiber technique or a combination of such techniques, for example.

Similar to the top port wafer assembly, each wafer of the bottom port wafer assembly 40 may comprise one or more separate power and low-speed communication signal conductors/terminals, one or more differential high-speed conductors/terminals and one or more ground conductors. In embodiments, at least exemplary high-speed communication signals up to, and exceeding, 100 gigabits Gbps may be transported by the high-speed signal conductors of the assembly 40. In alternative embodiments, communication signals up to 160 Gbps may be transported by the high-speed conductors.

In one embodiment, the low-speed/power terminals may be positioned in the center of a wafer, for example. Further, each differential high-speed terminal may be configured such that another differential high-speed signal terminal is positioned on one side and a ground terminal is positioned on the other side.

In FIG. 4B, bottom port wafer assembly 40 may comprise a conductive, ground plastic shield element 41 that is configured to cover lead frames and their respective wafers. Similar to the top port wafer assembly described previously, the shield 41 may comprise a plated plastic. Alternatively, shield 41 may be composed of a plated ceramic (i.e., ceramic with a conductive flashing), plated metal, a hybrid laminate with dielectric and conductive elements such as PCB sections or another conductive material with a dielectric coating, such as a nickel, tin, gold or copper coating, for example. Though shown as a single unitary piece, it should be understood that shield 41 may comprise multiple, separate elements (e.g., two elements) where, dual or redundant paths may be created to take advantage of an overall lower longitudinal resistance and thus share in the advantage of reduced path resistance and have lower heat generation in a power delivery function.

The bottom port wafer assembly may also comprise dual ground path configurations similar to those described previously. For example, one ground path may be formed by the individual ground conductors 43*a* to 43*n* and the other ground path may be formed by conductive, deflectable "fingers" 45*a* to 45*n*. In more detail, each of the ground conductors 43*a* to 43*n* may function as a ground path to a PCB, such as PCB 3. In an embodiment, when assembled each of the fingers 45*a* to 45*n* may be electrically and galvanically connected to a respective contact portion of a ground conductor 43*a* to 43*n* (i.e., tip or top portion), thereby functioning to provide a second ground path that passes from such a contact point, through a respective finger 45*a* to 45*n* and then through the conductive, plated plastic 41 to a PCB. Also shown are high-speed terminals 42*a* to 42*n* and low-speed and power terminals 49*a* to 49*n*.

Other dual ground path configurations may also be utilized. For example, rather than provide fingers 45*a* to 45*n* that are insert molded into shield 41, the fingers may be a part of a plate, similar to plate 28 described previously. In each of the dual ground path embodiments, the dual ground path configurations may provide the features as set forth previously herein.

Figure 4C:
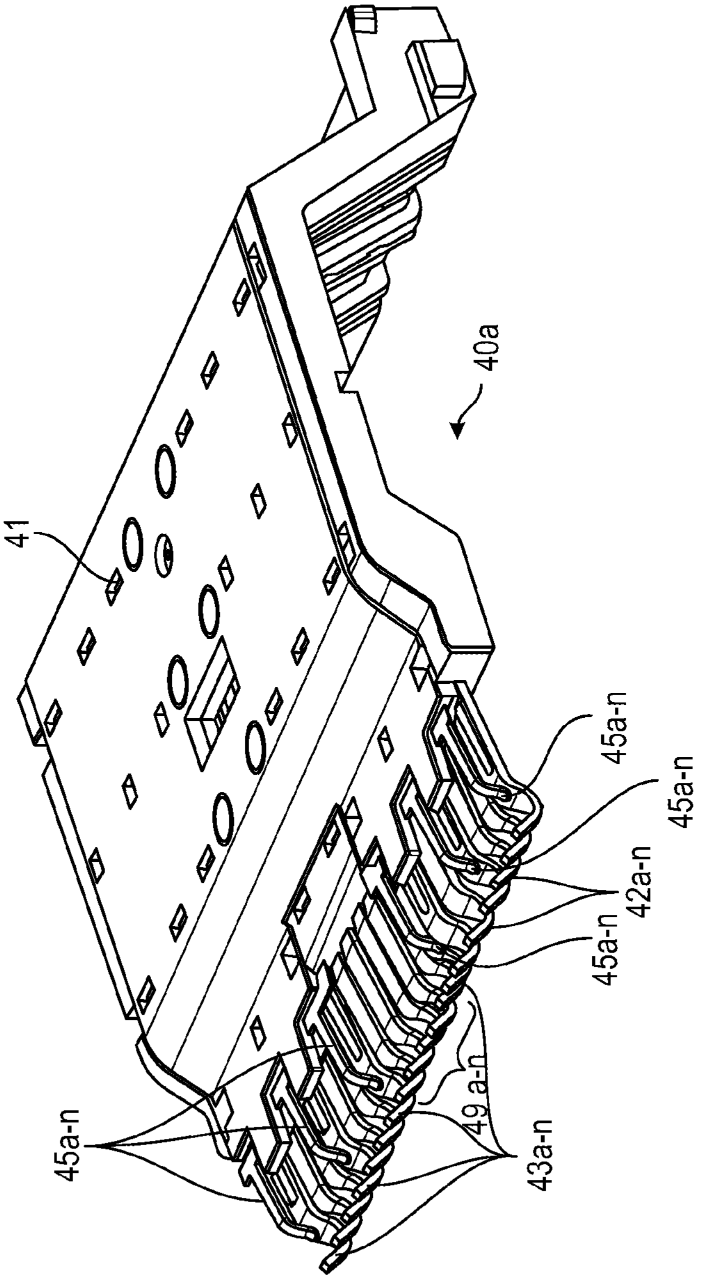
FIG. 4C illustrates a perspective view of an embodiment of a wafer according to an embodiment of the invention.

Referring to FIG. 4C there is depicted an enlarged view of an exemplary wafer 40*a* of assembly 40. As shown, wafer 40*a* illustrates dual ground paths formed by individual ground conductors 43*a* to 43*n* and by conductive, deflectable "fingers" 45*a* to 45*n* and shield 41.

Figure 4D:
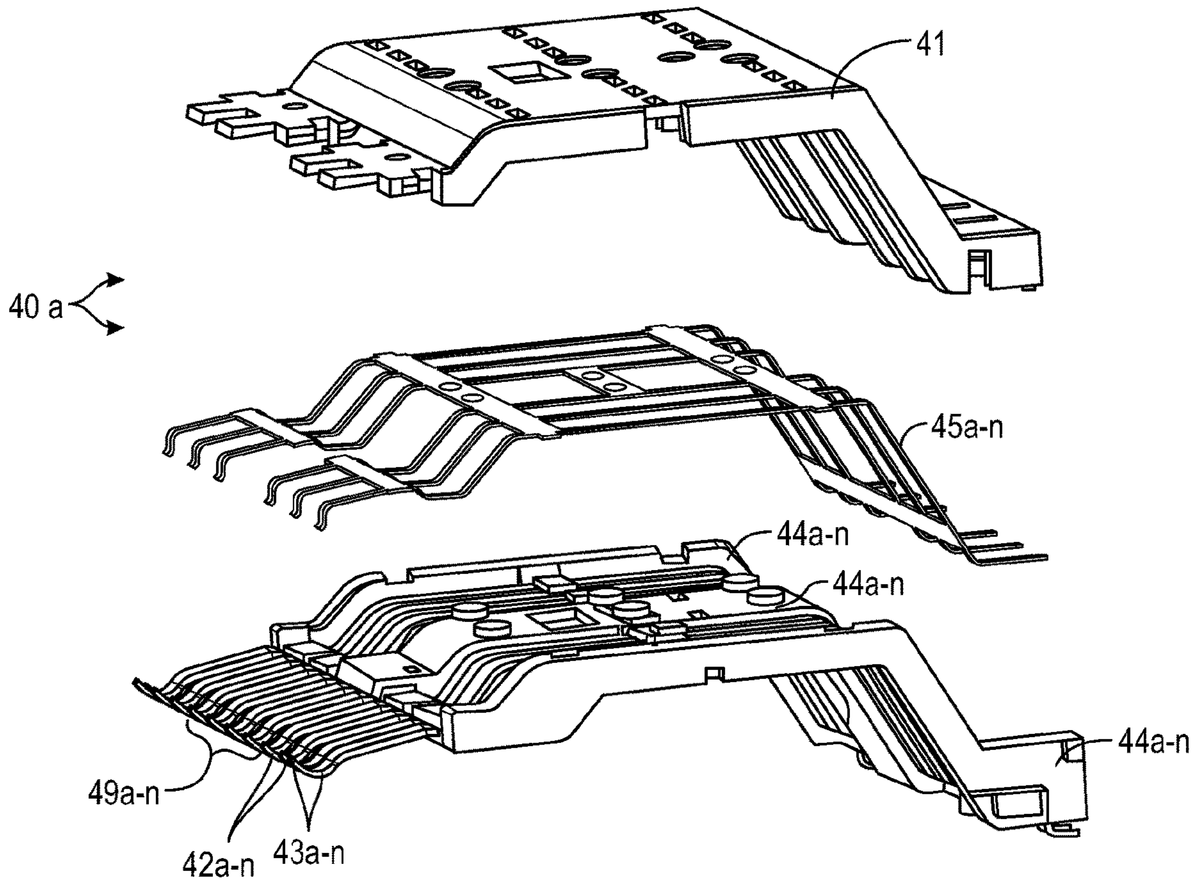
FIG. 4D illustrates an exploded perspective view of the embodiment depicted in FIG. 4C.

FIG. 4D depicts an exploded view of the exemplary wafer 40*a*. In an embodiment, deflectable metal "fingers" 45*a* to 45*n* may be welded or otherwise conductively affixed to dielectric lead frame support structures 44*a* to 44*n* that also supports primary ground conductors 42*a* to 42*n* (e.g., high-speed conductors/terminals), for example.

Figure 4E:
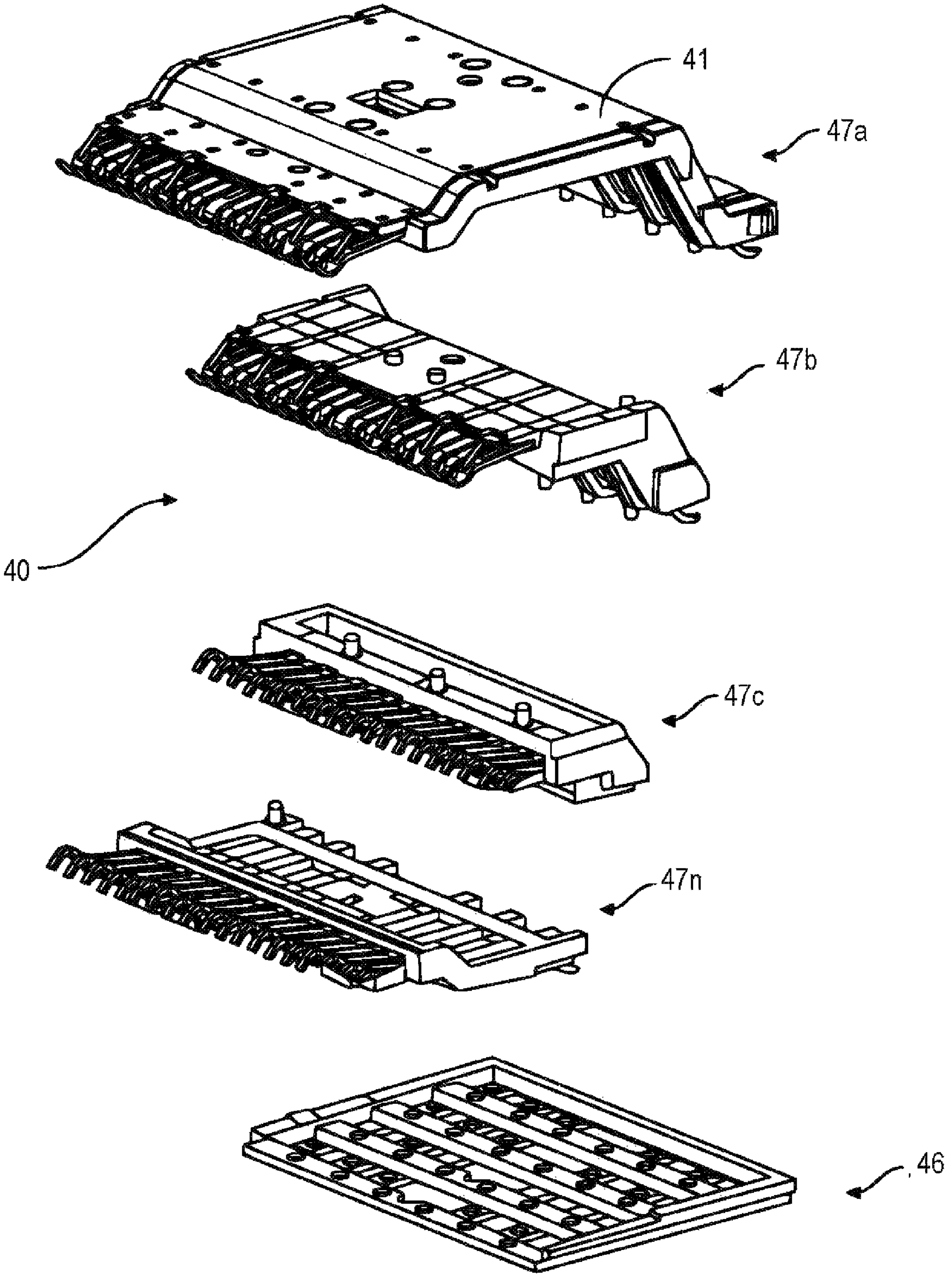
FIG. 4E illustrates an exploded view of wafers used in the embodiment depicted in FIG. 4A.

FIG. 4E depicts an exploded view of the bottom port wafer assembly 40. As shown assembly 40 may comprise a plurality of dielectric lead frame support structures 47*a* to 47*n*, each for supporting and electrically isolating one or more wafers having one or more conductors (e.g., high-speed terminals, low-speed terminals, power terminals and ground conductors). Also shown is a conductive, bottom port tail alignment structure 46 for holding tail portions of terminals of each wafer and for helping to align tail edges of each terminal of bottom port wafers. In an embodiment, structure 46 may comprise a plated plastic or stainless steel (e.g., stainless steel SUS301, copper C70250, etc. for example).

Figure 4F:
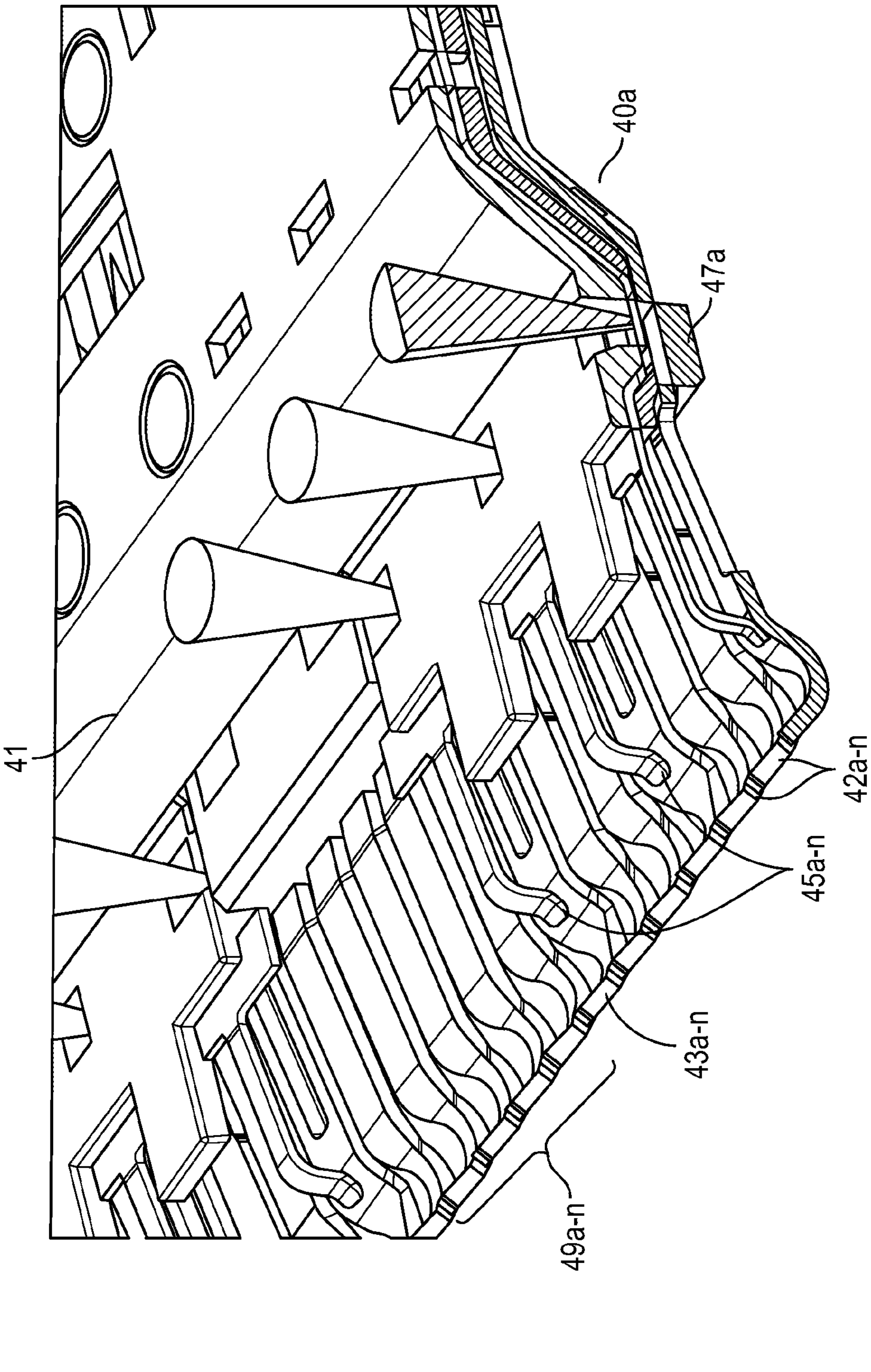
FIG. 4F illustrates a perspective view of a cross section of a wafer depicted in FIG. 4E.
Figure 4G:
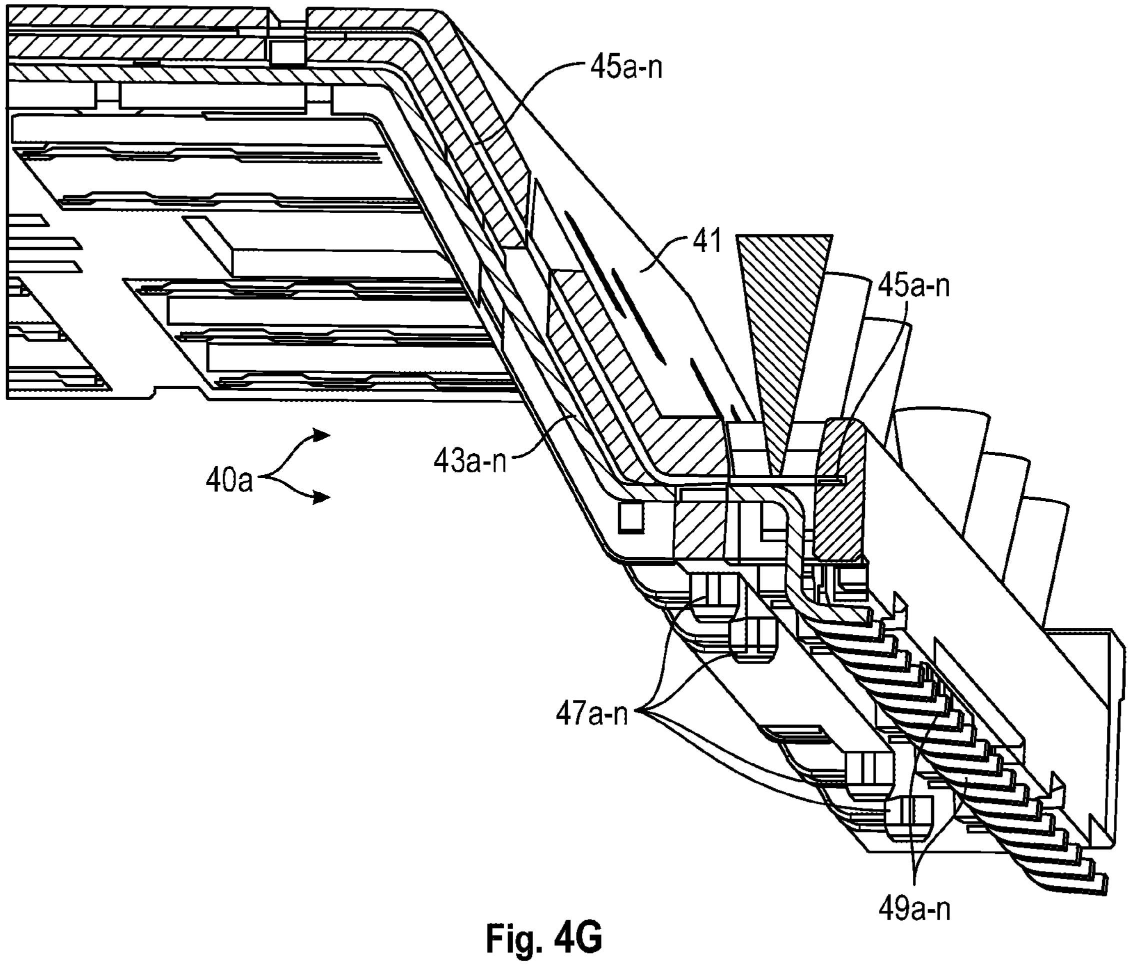
FIG. 4G illustrates another perspective view of the embodiment depicted in FIG. 4F.
Figure 4H:
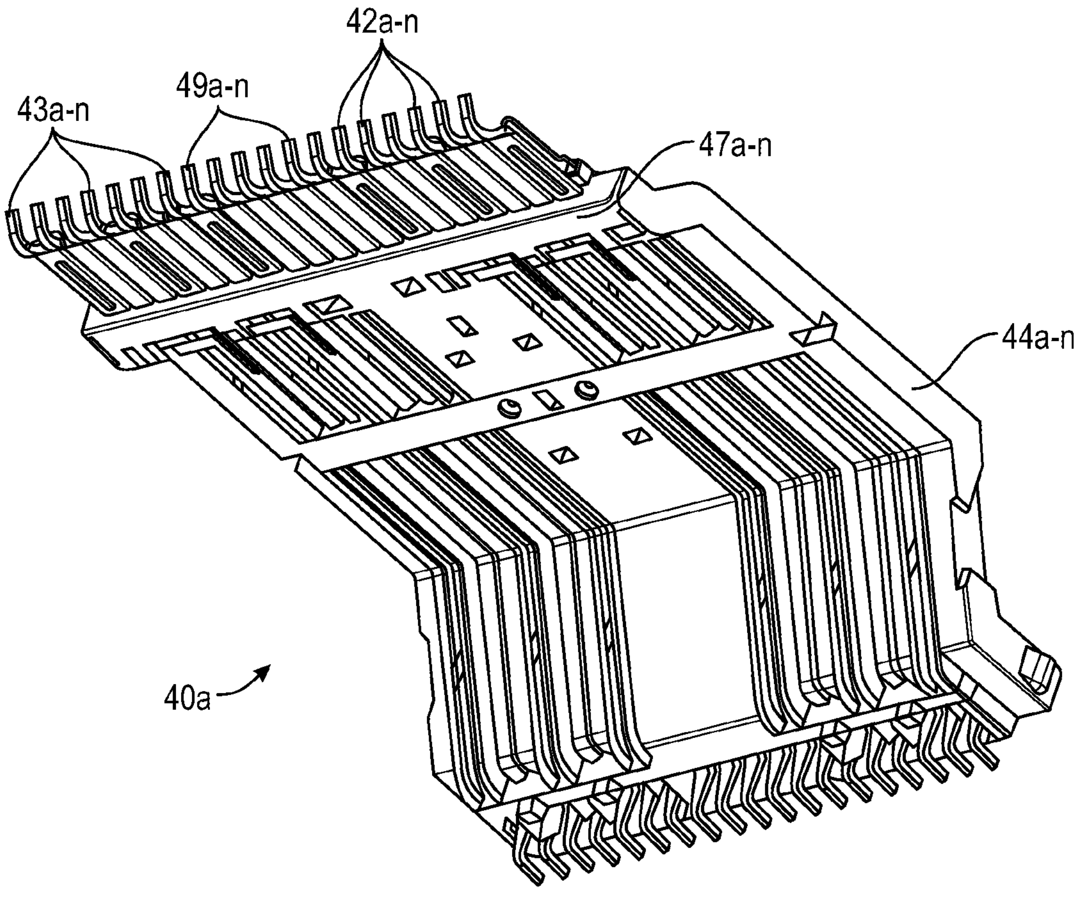
FIG. 4H illustrates another view of an exemplary inventive tail alignment and support structure.

Enlarged views of the exemplary wafer 40*a* are depicted in FIGS. 4F and 4G while a view from underneath bottom port wafer 40*a* is depicted in FIG. 4H. To illustrate one exemplary method of connecting the conductive fingers 45*a* to 45*n* to the lead-frame 47*a* green cones are shown in FIGS. 4F and 4G, it being understood that such cones are only illustrative of connection points and are not physical structures. In one embodiment, at a respective connection point illustrated by a green cone an exemplary conductive finger 45*a* to 45*n* may be welded to make a connection with the lead frame 47*a*, for example.

Figure 4I:
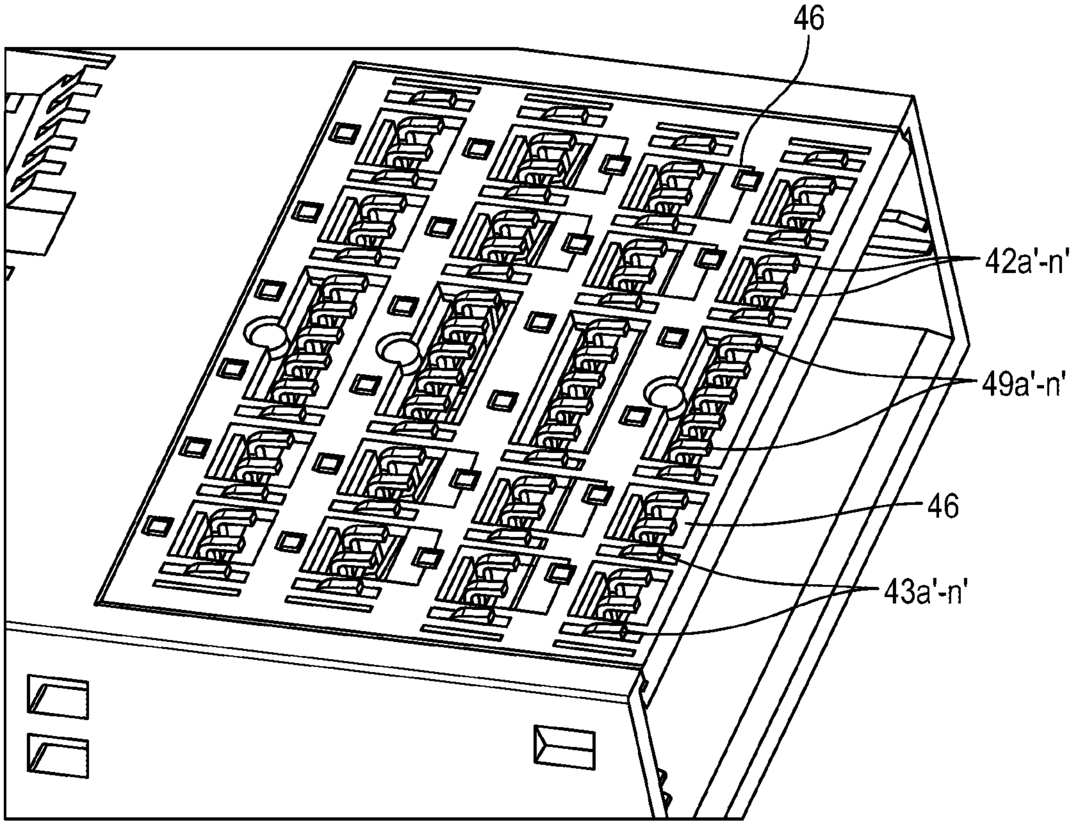
FIG. 4I depicts an exemplary tail alignment and support structure for at least a bottom port wafer assembly according to embodiments of the invention.

Referring now to FIG. 4I there is depicted an enlarged view of the exemplary conductive, bottom port tail alignment and support structure 46 according to embodiments of the invention viewed from underneath port 8*b*. In one embodiment, as mentioned previously, unlike the tail alignment and support structure 14 of the top port wafer assembly, structure 46 may be composed of a conductive material (e.g., metal, plated plastic). To provide alignment control, the tail edges 42*a*' to 42*n*' of one or more high speed terminals 42*a* to 42*n*, the tail edges 49*a*' to 49*n*' of one or more low-speed and power terminals 49*a* to 49*n* and the tail edges 43*a*' to 43*n*' of one or more ground conductors 43*a* to 43*n* of wafers may be connected to the structure 46. Further, the bottom port tail alignment and support structure may comprise a plurality protrusions that may be inserted into a side plate (e.g., apertures similar to 11*a* to 11*n* and protrusions similar to 14*a* to 14*n*, for example).

In addition to alignment control, structure 46 may provide control of undesirable electrical interference (e.g., noise). For example, structure 46 may be configured as a ground reference plane structure surrounding differential high-speed terminals 42*a* to 42*n* and their tail edges 42*a*' to 42*n*', for example. Such a ground reference plane structure may be configured to electrically "mirror" (i.e., be configured similar to) an electrical ground plane structure formed on the surface of a mated PCB (e.g., PCB 3). In embodiment, it should be understood that the "mirrored", conductive ground structures (e.g., structure 46 and surface of the PCB 3) and conductive surfaces need not be in direct galvanic contact with one another to electrically isolate the differential signals being conducted in the high-speed terminals 32*a* to 32*n* from the differential signals being conducted by terminals/conductors on the surface of the PCB, for example. In an embodiment, to provide such electrical isolation the structure 46 may be separated from the surface of the PCB by 0.25-0.50 mm to name just one non-limiting distance. Though not in direct galvanic contact, the two facing, mirrored structures/surfaces may function as an electrical capacitor; i.e. two conductive structures/surfaces separated by a dielectric (in this case, generally air).

In an embodiment, structure 46 may be an integral part of a bottom port wafer assembly.

In our earlier discussion the assembly 1 included a central housing 2*j* that encloses portions of both the top and bottom ports 8*a*, 8*b*. In an embodiment, an alternative housing may enclose a single port.

Figure 5A:
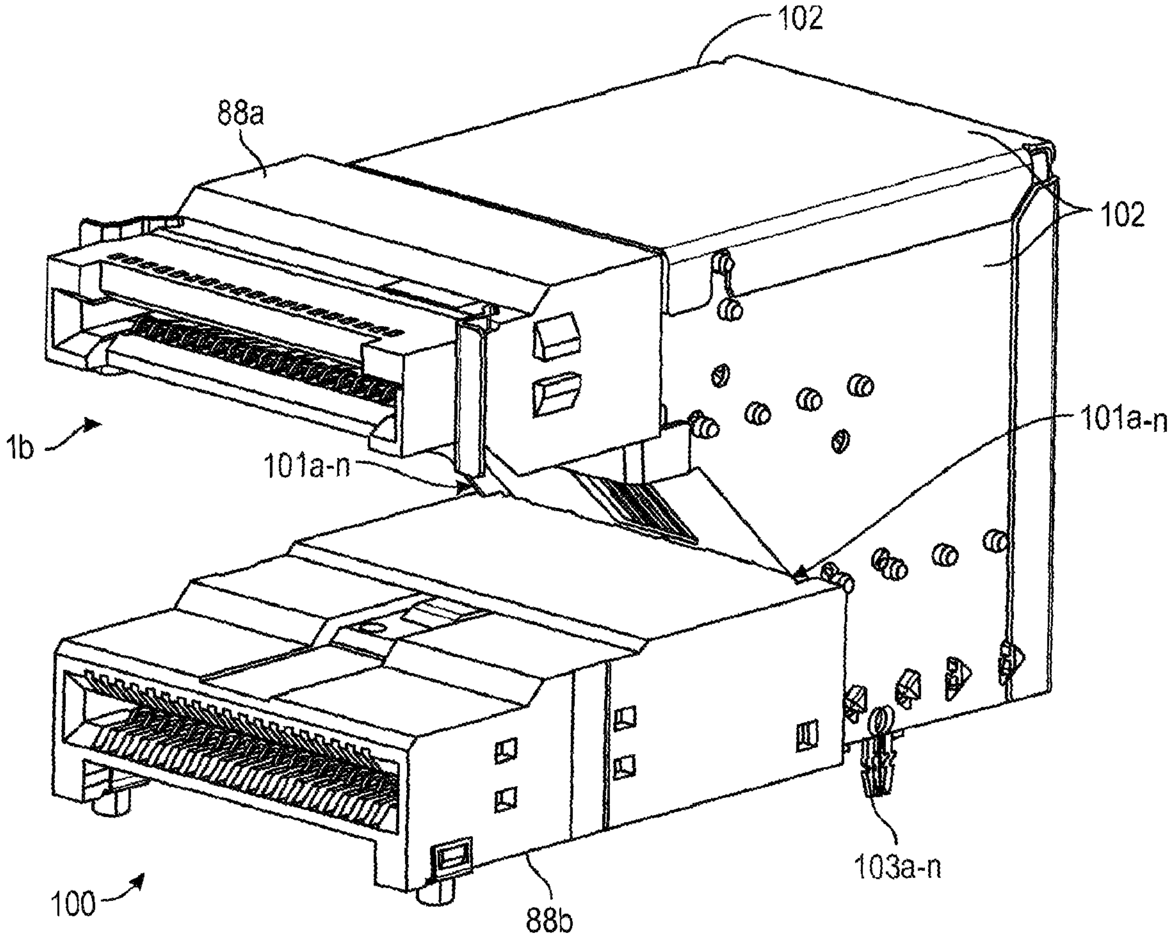
FIG. 5A depicts a perspective view of another, exemplary connector according to embodiments of the invention.

Referring now to FIG. 5A there is depicted a connector 1*b* that may be part of an alternative high-speed, shielded multi-level, multi-port connector assembly 100. As depicted, connector 1*b* may comprise a central housing 102. Similar to housing 2*j*, the central housing 102 may be within the cage 2 and may be composed of a plastic (e.g., LCP). Unlike the housing 2*j*, housing 102 may be able to enclose a portion of a top port 88*a* but not a bottom port 88*b*. Housing 102 may be configured to protect one or more conductive wafers (not shown) within the housing 102.

In an embodiment, housing 102, ports 88*a*, 88*b*, internal wafers and their respective terminals as well as additional components within the housing 102 may form a high-speed, shielded, multi-level, multi-port connector with temperature and alignment controls, among other features. In one embodiment, the connector 1*b* may comprise an input/output (I/O) connector, such as those used for quad small form-factor pluggable applications or quad-double density small form-factor pluggable applications (e.g., QSFP, OSFP, CDFP applications). Accordingly, the assembly 100 that includes housing 102 may be referred to as high-speed, shielded multi-port, multi-level connector assembly with temperature and alignment controls, among other features.

The conductive terminals that are a part of wafers within the connector 1*b* may be configured to conduct electrical signals. Additionally, in an alternative embodiment, the terminals may also be configured to feed electrical signals to E/O conversion circuitry or receive electrical signals from O/E conversion circuitry, for example. In the latter case, such O/E or E/O conversion circuitry may be included and connected to respective conductive wafers where a cage is mated to the active electronic circuitry, for example.

In many instances, the signals being conducted through the conductive wafers, the O/E, E/O conversion circuitry, active devices and retiming circuitry may generate a substantial amount of heat during operation. Thus, as described herein, the inventors provide inventive solutions to control such temperatures.

Housing 102 may be configured with one or more notches 101*a* to 101*n* on both sides to make contact with the bottom port 88*b*. Alternatively, pillars or trusses may also be used (see FIG. 5D for example) to support the housing over the bottom port 88*b*. In comparison with the housing 2*j*, housing 102 provides added degrees of freedom (i.e., the upper port 88*a* and lower port 88*b* are independent of each other and can be manipulated freely without affecting one another) within an assembly process because it does not enclose a portion of the bottom port 88*b* unlike housing 2*j*, for example, which does enclose a portion of a bottom port 8*b*.

Figure 5B:
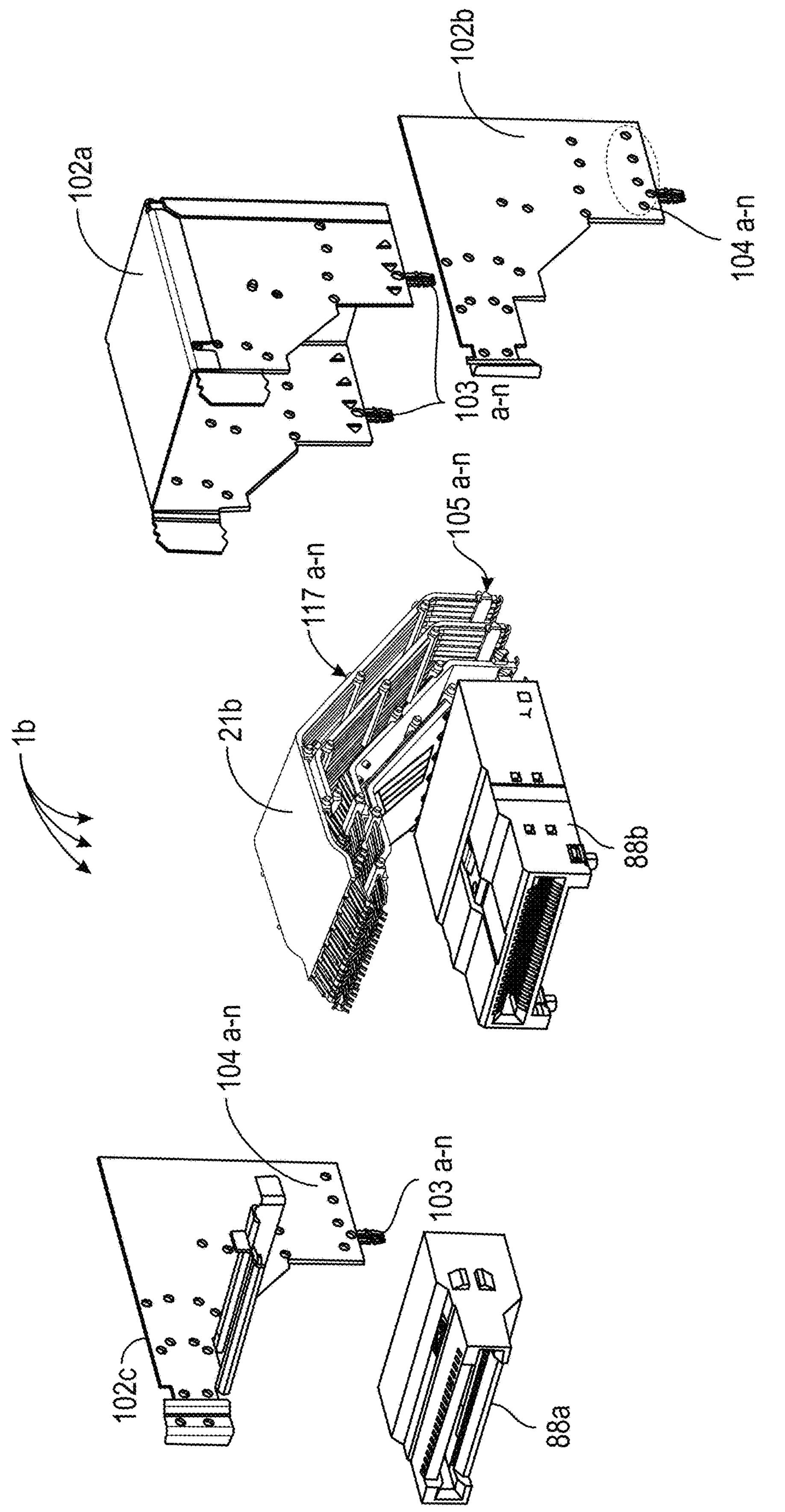
FIG. 5B depicts an exploded perspective view of the embodiment depicted in FIG. 5A.
Figure 5C:
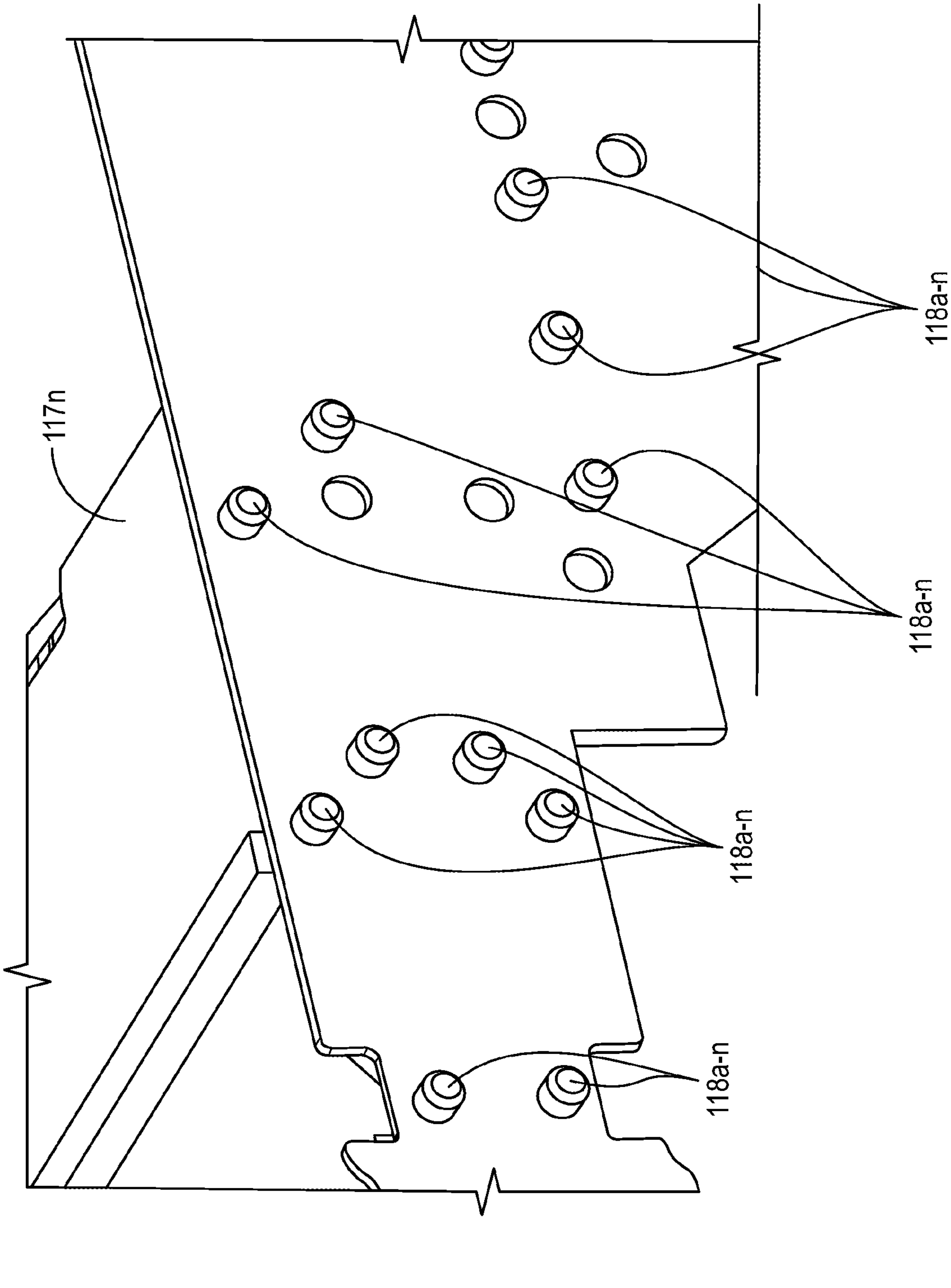
FIG. 5C illustrate a perspective view of heat stakes according to embodiments of the invention.

FIG. 5B depicts an exploded view of the connector 1*b*. As shown, housing 102 may comprise a central structure 102*a*, first supporting side plate 102*b* and second supporting side plate 102*c* opposite the first supporting side plate 102*b* (e.g., metal side plates). In embodiments of the invention, each side plate 102*b*, 102*c* may be configured to connect to, and fix, the positions of wafers within the internal housing 102 with respect to one another (i.e., wafer to wafer). In more detail, side plates 102*b*, 102*c* may be configured with one or more apertures 104*a* to 104*n*, each aperture 104*a* to 104*n* configured to receive a respective first protrusion 105*a* to 105*n* of the top port wafer assembly to control the positioning of the terminals of the wafers within the top port so that the wafers may be held and tail edges of respective terminal tail portions may be aligned within the same plane. Further, to secure the central structure 102*a* and each side plate 102*b*, 102*c* to an underlying PCB (e.g., PCB 3 in FIG. 1A), the central structure 102*a* and each side plate 102*b*, 102*c* may be configured with one or more integral, deformable board locks 103*a* to 103*n* which may be composed of a deformable metal or plastic, for example.

FIG. 5B also depicts a plurality of dielectric lead-frame support structures or hangars 117*a* to 117*n* that may be composed of aplastic, such as an LCP ("hangars" for short). In an embodiment, each hangar 117*a* to 117*n* may be configured to provide physical support and alignment for each upper lead-frame. Each hangar 117*a* to 117*n* may further be configured with heat stake posts 118*a* to 118*n* (see FIG. 5C), where each post may be configured to be received by an alignment opening in a respective side plate 102*b*, 102*c*.

Figure 5D:
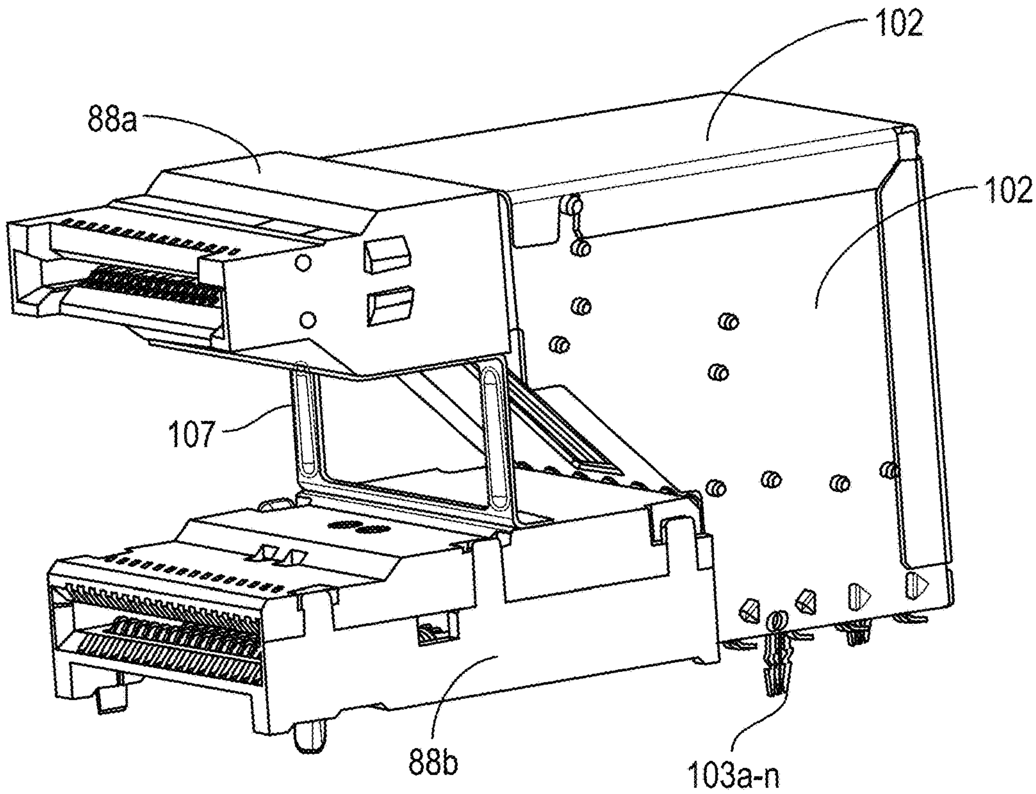
FIG. 5D illustrates a perspective view of another embodiment of a connector according to embodiments of the invention.
Figure 5E:
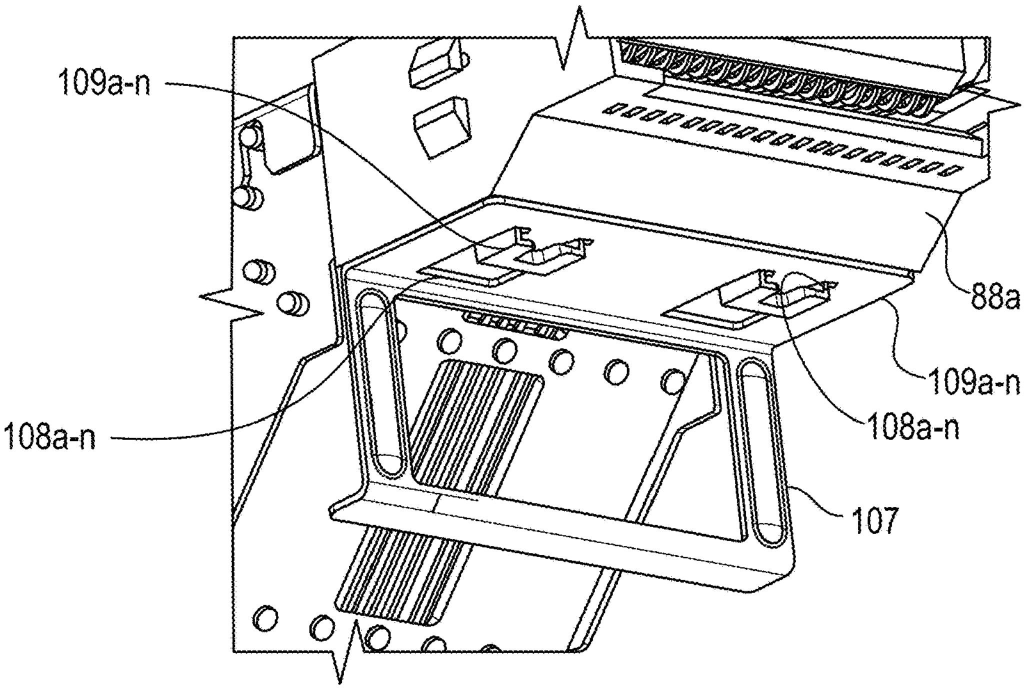
FIG. 5E illustrates a perspective view of an alignment feature according to embodiments of the invention.

Referring now to FIGS. 5D and 5E there is shown an alternative, top port support structure 107 fixably configured between the top port 88*a* and bottom port 88*b*. In an embodiment structure 107 may comprise one or more apertures 108*a* to 108*n*, each aperture configured to receive a respective top port protrusion 109*a* to 109*n* to fixably position the structure 107. As configured, the structure 107 may be operable to support the top port 88*a* and the wafers within the top port 88*a*. Though shown as an open rectangle, it should be understood that this is merely one exemplary shape and structure for the top port support structure 107. Other shapes and structures may be used, such as an open or filled in square-shaped structure for example.

Figure 5F:
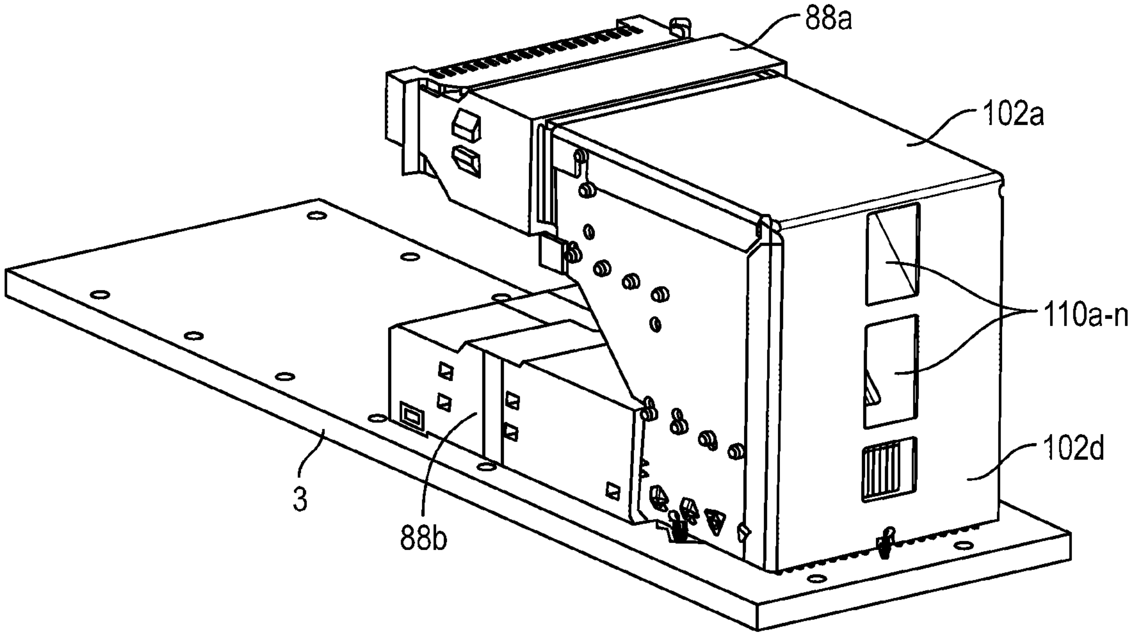
FIG. 5F illustrates another perspective view of a connector according to embodiments of the invention, showing an opening in the cage.

In a further embodiment, the top port 88*a* may be separately connected to the PCB 3 using an SMT technique, for example. Such an exemplary top port assembly is depicted in FIG. 5F. In addition to SMT type connections, as noted previously the assembly may be connected to the PCB 3 using one or more board locks 103*a* to 103*n* that may be inserted into corresponding apertures in the PCB 3 (e.g., pin-in-paste holes, or compliant pin (press fit) holes) to provide alignment control of the wafers and their respective terminals making up the top port assembly board during reflow operations, for example.

FIGS. 5G to 5N depict views of connector 1*b* that includes temperature controls.

Figure 5G:
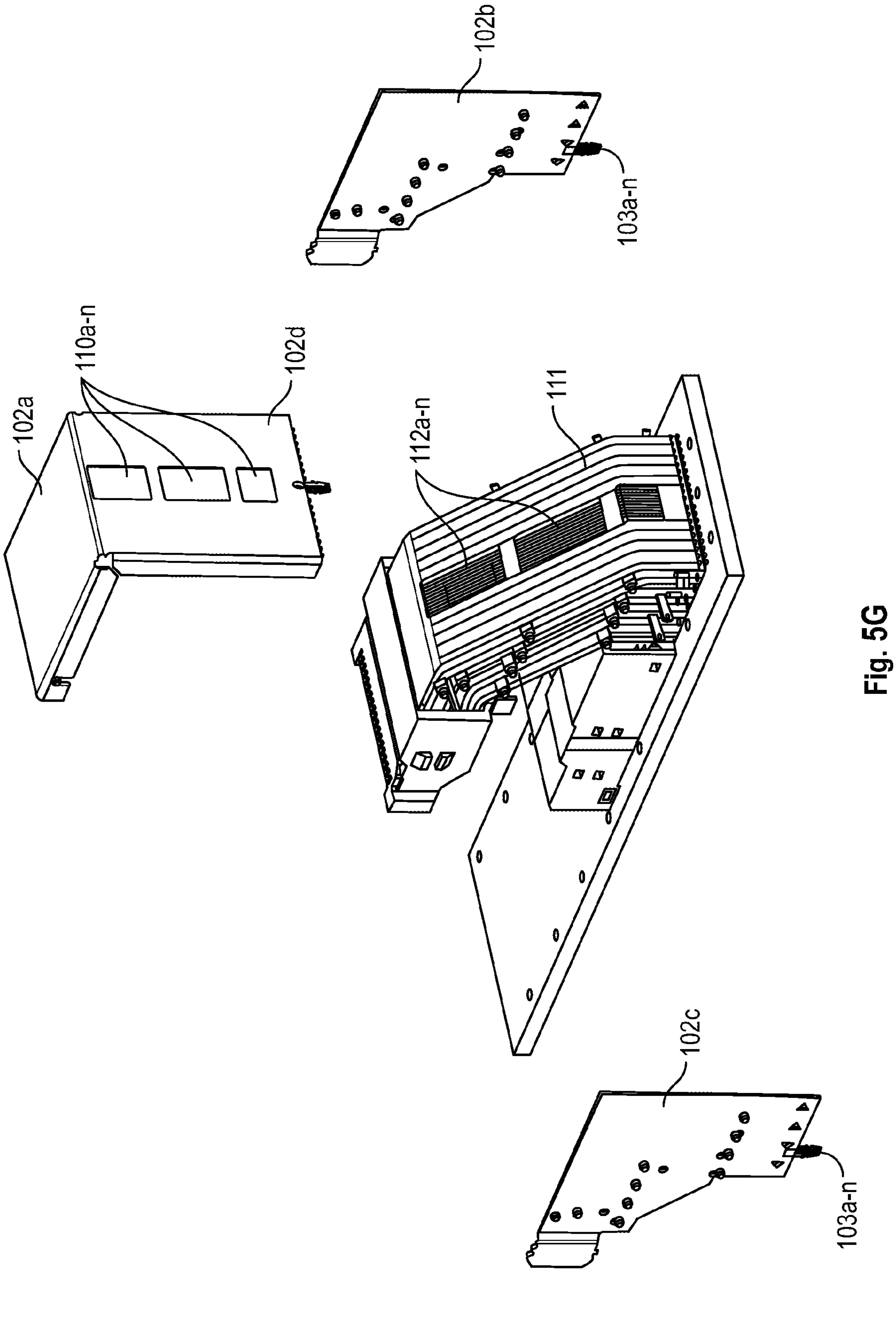
FIG. 5G illustrates a perspective exploded view of the embodiment depicted in FIG. 5F.

In FIG. 5G a back cover 102*d* of internal top port housing 102 may include one or more openings 110*a* to 110*n* where the openings allow air to flow over terminals (e.g., low speed signal and power terminals) within wafers of the connector 1*b*.

Figure 5H:
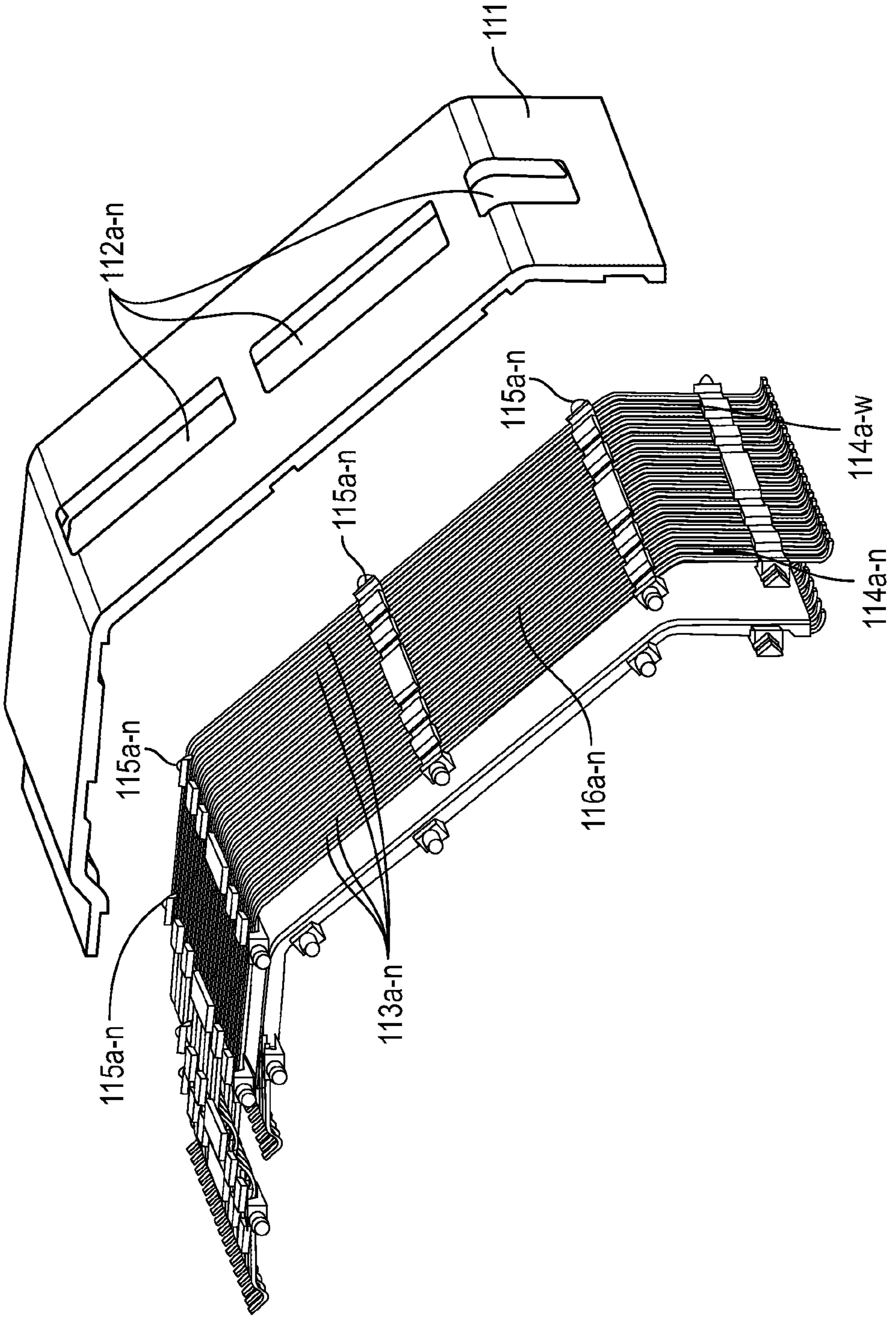
FIG. 5H illustrates a wafer suitable for use in the embodiment depicted in FIG. 5F.
Figure 5I:
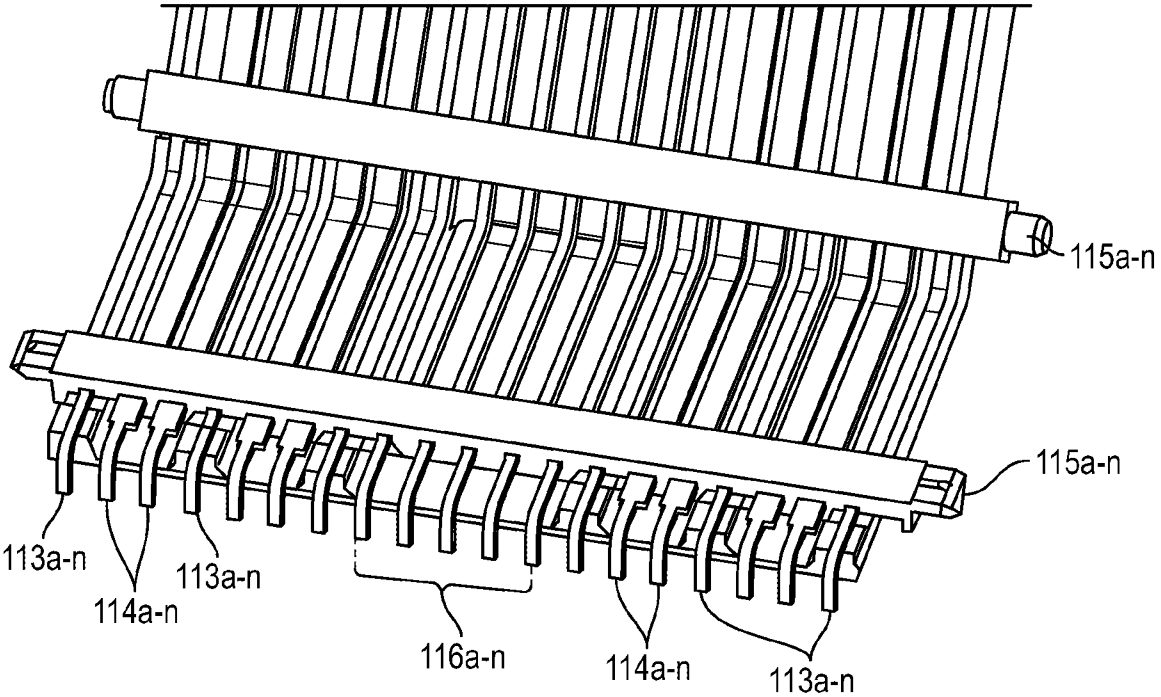
FIG. 5I illustrates an enlarged perspective view of tails of a wafer according to embodiments of the invention.

Referring now to FIGS. 5H and 5I there is shown views of a top port, lead frame ground shield 111. Shield 111 may comprise temperature control features to control the temperature of conductors/terminals. For example, one or more openings 112*a* to 112*n* may be configured in the lead frame ground shield 111 to allow air to flow over low speed signal and power terminals 116*a* to 116*n*, for example. Also shown are high speed signal terminals 114*a* to 114*n* (e.g., differential signal pairs) that may be nested between ground conductors 113*a* to 113*n*. As configured, this configuration provides enhanced shielding. It should be noted that the top port wafer assembly configurations shown in FIGS. 5G and 5H may also be incorporated by top port wafer assembly 10 previously described herein.

FIGS. 5H and 5I also depict exemplary dielectric, lead frame support structures 115*a* to 115*n* of a top port assembly, for example. Lead frame support structures 115*a* to 115*n* may be configured to align and support a plurality of ground conductors 113*a* to 113*n*, a plurality of high-speed conductors or terminals 114*a* to 114*n*, and a plurality of low-speed and power conductors or terminals 116*a* to 116*n*, for example.

Though the terminals of the ground conductors, high speed conductors, low-speed conductors and power conductors are illustrated as down-facing, it should be understood that assembly may also comprise lead frame structures that comprise up-facing terminals that may be supported by similar lead-frames and may be covered by a similar ground shield. That is to say, a top port assembly may comprise a plurality of lead frame structures.

In embodiments of the invention, the signal and field affinity between terminals of each lead-frame structures of assembly 115*a* to 115*n* and its respective ground shield may be sufficient to limit deleterious lead-frame to lead-frame coupling and crosstalk, for example, as explained previously herein.

Figure 5N:
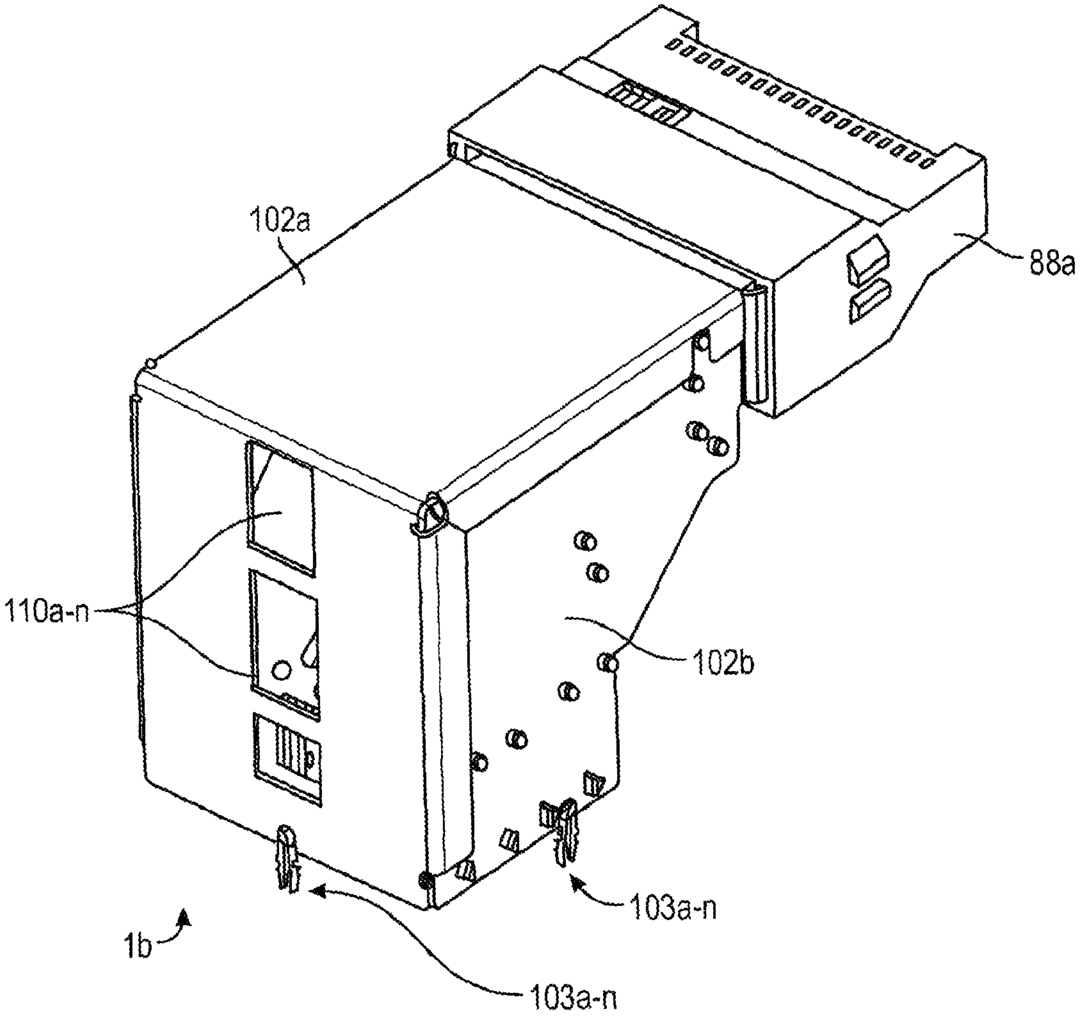
FIG. 5N illustrates a simplified perspective view of the embodiment depicted in FIG. 5F.

FIG. 5N depicts a view of connector 1*b* with top port 88*a* before a bottom port 88*b* is connected. Also shown are board locks 103*a* to 103*n* that secure the top port assembly to a PCB (e.g., PCB 3) during reflow operations, for example.

Figure 6A:
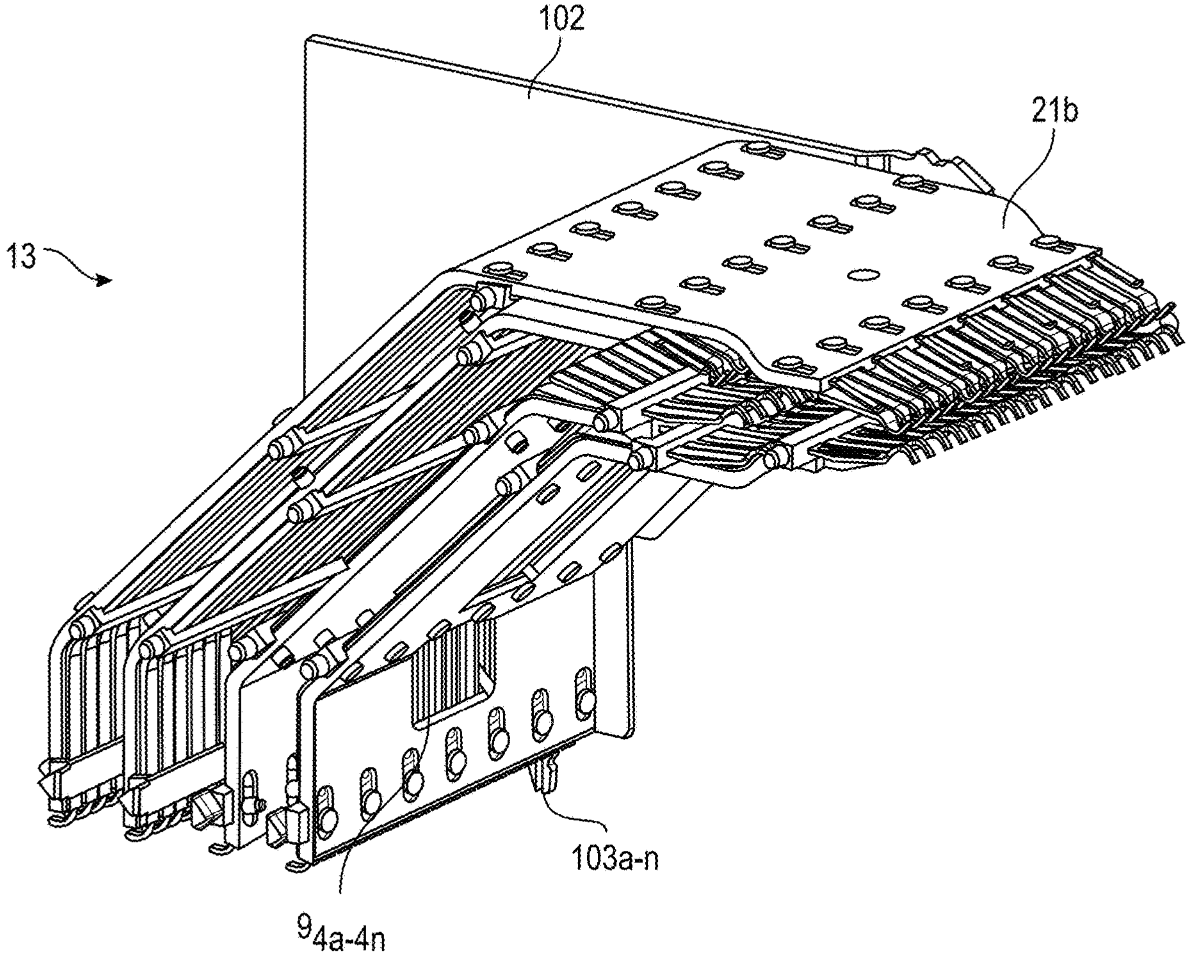
FIG. 6A depicts a simplified perspective view of an embodiment of a top port wafer assembly configuration according to an embodiment of the invention.
Figure 6B:
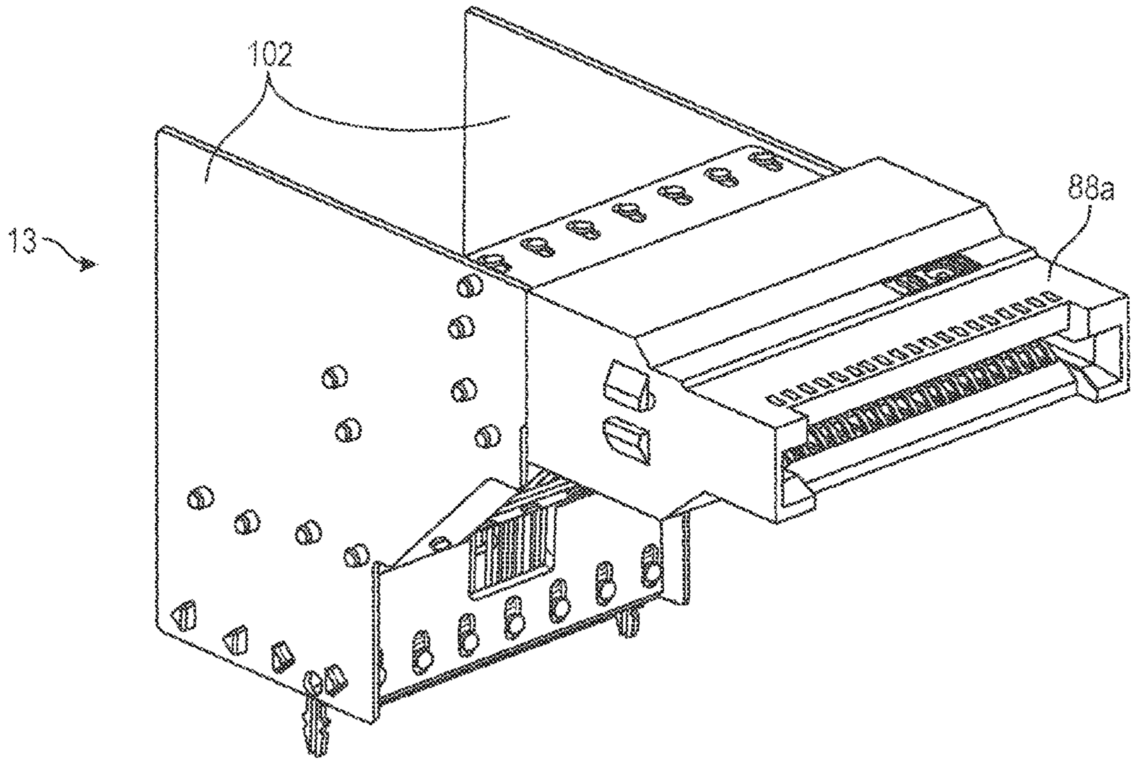
FIG. 6B depicts a perspective view of the embodiment depicted in FIG. 6A.

Referring now to FIGS. 6A and 6*b* there is depicted views of a top port wafer assembly 13. As shown the assembly may include opposing, metal side plates (only one is shown) of an internal housing 102. In an embodiment the assembly may be aligned and connected to a PCB, such as PCB 3, using SMT and board locks 103*a* to 103*n*, for example. The assembly 13 may further include one or more gaps $g_{4a\ to\ 4n}$ in each of its intermediate, conductive shields (e.g., plated plastic shields) to provide air flow over terminals.

As described herein, the inventors have discovered inventive connector assemblies and related methods that include multiple alignment controls, both to a mated device (e.g., high-speed, active plug modules) as well as internal conductor and ground wafer alignment. Further, the temperature controls included in the inventive connector assemblies allow such connectors to control the temperatures generated by electronic circuitry within connected plug-in modules (up to 20+ watts, for example) enabling the effective transport of communications (data) signals at least up to 100 Gbps.

It should be understood that while certain inventive features and functions have been described with respect to one inventive embodiment or illustrative figure, this is merely exemplary. That is to say, some features and functions may be applicable and incorporated into many embodiments other than the embodiment or figure specifically described.

The claim language included below is incorporated herein by reference in expanded form, that is, hierarchically from broadest to narrowest, with each possible combination indicated by the multiple dependent claim references described as a unique standalone embodiment.

While benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

We claim:

1. A wafer assembly, comprising:

a ground path assembly comprising a first ground shield and a second ground shield; and a row of conductors, the row of conductors comprising a plurality of communication signal conductors and a plurality of ground conductors, the plurality of communication signal conductors comprising a plurality of high-speed communication signal conductors and a plurality of low-speed communication signal conductors, wherein:

the first ground shield extends along a first pair of the plurality of high-speed communication signal conductors and the second ground shield extends along a second pair of the plurality of high-speed communication signal conductors with the plurality of low-speed communication signal conductors and a gap separating the first ground shield and the second ground shield.

2. The wafer assembly according to claim 1, wherein each high-speed communication signal conductor is positioned next to a ground conductor among the plurality of ground conductors in the row of conductors.

3. The wafer assembly according to claim 1, wherein:

the row of conductors further comprises a power conductor; and the power conductor is centrally positioned in the row of conductors in the gap between the first ground shield and the second ground shield.

4. The wafer assembly according to claim 1, wherein:

the first ground shield comprises a first plated plastic ground shield; and the second ground shield comprises a second plated plastic ground shield.

5. The wafer assembly according to claim 1, wherein:

the first ground shield comprises a first laminate of dielectric and conductive metal; and the second ground shield comprises a second laminate of dielectric and conductive metal.

6. The wafer assembly according to claim 1, wherein:

the first ground shield comprises a first plated plastic ground shield and a first metal ground shield insert that is stitch mated with the first plated plastic ground shield; and the second ground shield comprises a second plated plastic ground shield and a second metal ground shield insert that is stitch mated with the second plated plastic ground shield.

7. The wafer assembly according to claim 1, wherein:

the row of conductors comprises a row of transmit conductors and a row of receive conductors; and the gap separates the row of transmit conductors from the row of receive conductors.

8. The wafer assembly according to claim 1, further comprising a second row of conductors.

9. The wafer assembly according to claim 8, wherein:

the second row of conductors comprises a plurality of communication signal conductors and a plurality of ground conductors; and a subset of the communication signal conductors of the second row of conductors are offset from a subset of the communication signal conductors of the row of conductors, to form a centrally positioned air gap in the wafer assembly.

10. The wafer assembly according to claim 8, wherein the first ground shield and the second ground shield are positioned between the row of conductors and the second row of conductors.

11. The wafer assembly according to claim 1, further comprising a second row of conductors, a third row of conductors, and a fourth row of conductors.

12. The wafer assembly according to claim 11, wherein:

the first ground shield and the second ground shield extend between the row of conductors and the second row of conductors;

the ground path assembly further comprises a third ground shield and a fourth ground shield; and the third ground shield and the fourth ground shield extend between the third row of conductors and the fourth row of conductors.

13. The wafer assembly according to claim 12, wherein the second row of conductors faces the third row of conductors without a ground shield between the second row of conductors and the third row of conductors.

14. The wafer assembly according to claim 11, wherein the wafer assembly further comprises dielectric lead frame support structures that support and electrically isolate the row of conductors, the second row of conductors, the third row of conductors, and the fourth row of conductors.

15. The wafer assembly according to claim 1, wherein the wafer assembly further comprises a protrusion at one end of the row of conductors.

16. The wafer assembly according to claim 1, wherein the wafer assembly further comprises a first protrusion at one end of the row of conductors and a second protrusion at another end of the row of conductors.

17. The wafer assembly according to claim 1, wherein:

the row of conductors comprises a conductor with an offset from an extension axis; and the conductor with the offset is positioned in the gap between the first ground shield and the second ground shield.

18. The wafer assembly according to claim 1, wherein the gap comprises an air gap for heat dissipation.

19. A wafer assembly, comprising:

a ground path assembly comprising a first ground shield and a second ground shield; and a row of conductors, the row of conductors comprising a plurality of communication signal conductors and a plurality of ground conductors arranged in the row of conductors, with a first pair of communication signal conductors extending along the first ground shield and a second pair of the communication signal conductors extending along the second ground shield, wherein:

the communication signal conductors comprise a plurality of high-speed communication signal conductors and a plurality of low-speed communication signal conductors; and the plurality of low-speed communication signal conductors are centrally positioned in the row of conductors in a gap between the first ground shield and the second ground shield.

20. A wafer assembly, comprising:

a ground path assembly comprising a first ground shield and a second ground shield; and a row of conductors, the row of conductors comprising a plurality of communication signal conductors and a plurality of ground conductors arranged in the row of conductors, with a first pair of communication signal conductors extending along the first ground shield and a second pair of the communication signal conductors extending along the second ground shield, wherein:

the first ground shield comprises a dual ground path for a first ground conductor among the plurality of ground conductors;

the first ground conductor comprises a contact tip portion and a tail portion;

the first ground shield comprises conductive spring fingers inserted into channels in the first ground shield; and the conductive spring fingers contact a top surface of the first ground conductor.

21. A wafer assembly, comprising:

a ground path assembly comprising a first ground shield and a second ground shield; and a row of conductors, the row of conductors comprising a plurality of communication signal conductors and a plurality of ground conductors arranged in the row of conductors, wherein:

the first ground shield extends along a first pair of communication signal conductors among the plurality of communication signal conductors and the second ground shield extends along a second pair of the communication signal conductors among the plurality of communication signal conductors with a gap separating the first ground shield and the first pair of communication signal conductors from the second ground shield and the second pair of communication signal conductors;

the row of conductors comprises a conductor with an offset from an extension axis; and the conductor with the offset is positioned in the gap between the first ground shield and the second ground shield.

* * * * *